United States Patent [19]
Koide et al.

[11] Patent Number: 5,936,312
[45] Date of Patent: Aug. 10, 1999

[54] POWER OUTPUT APPARATUS AND METHOD OF CONTROLLING THE SAME

[75] Inventors: Satoshi Koide, Toyota; Yasutomo Kawabata, Aichi-ken; Eiji Yamada, Owariasahi; Akihiko Kanamori, Okazaki; Masatoshi Uchida; Tetsuya Abe, both of Toyota; Akihiro Yamanaka, Mishima; Takeshi Kotani, Nisshin, all of Japan

[73] Assignee: Toyota Jidosha Kabushiki Kaisha, Toyota, Japan

[21] Appl. No.: 09/031,199

[22] Filed: Feb. 26, 1998

[30] Foreign Application Priority Data

Mar. 24, 1997 [JP] Japan ................................ 9-090267

[51] Int. Cl.⁶ ............................. F02N 11/06; H02P 9/04
[52] U.S. Cl. ................. 290/40 R; 290/38 R; 290/40 A; 290/40 B; 290/40 F; 290/45; 290/46; 322/16; 318/8; 318/9; 318/34; 318/51; 318/52
[58] Field of Search ............................ 290/38 R, 40 A, 290/40 B, 40 C, 40 F; 318/8, 9, 34, 51, 52; 322/16

[56] References Cited

U.S. PATENT DOCUMENTS

| | | | |
|---|---|---|---|
| 3,789,281 | 1/1974 | Shibata | 290/40 R |
| 5,789,877 | 8/1998 | Yamada et al. | 318/9 |
| 5,791,426 | 8/1998 | Yama et al. | 180/65.2 |
| 5,794,439 | 8/1998 | Lisniansky | 60/414 |
| 5,801,497 | 9/1998 | Shamoto | 318/139 |
| 5,804,934 | 9/1998 | Yamada et al. | 318/77 |
| 5,818,116 | 10/1998 | Nakae et al. | 290/38 R |
| 5,823,280 | 10/1998 | Lateur et al. | 180/65.2 |

FOREIGN PATENT DOCUMENTS

| | | |
|---|---|---|
| 0 645 278 A1 | 3/1995 | European Pat. Off. . |
| 0 743 208 A2 | 11/1996 | European Pat. Off. . |
| 53-133814 | 11/1978 | Japan ................ 290/40 R |
| A-7-225869 | 8/1995 | Japan . |

*Primary Examiner*—Elvin G. Enad
*Attorney, Agent, or Firm*—Oliff & Berridge, PLC

[57] ABSTRACT

The object of the present invention is to carry out control and enable an engine to output a desired power, thereby preventing unexpected charge or discharge of storage battery means. A power output apparatus of the present invention sets energy Pe to be output from an engine, in order to cancel a deviation ΔPb of a charge-discharge electric power Pb of a battery from its target value Pb*, and controls operation of the engine to output the energy Pe. The energy Pe output from the engine is subjected to torque conversion by means of a clutch motor and an assist motor and output to a drive shaft as a required power. In case that the converted energy is not equal to the required power, the battery is charged with the surplus electric power or is discharged to supplement the shortage of electric power. Namely regulation of the energy Pe results in controlling the charge-discharge electric power Pb of the battery. When the target value Pb* is set equal to zero, the power output apparatus enables a desired power to be output to the drive shaft without causing unexpected charge or discharge of the battery.

24 Claims, 32 Drawing Sheets

POWER OUTPUT APPARATUS AND METHOD OF CONTROLLING THE SAME

BACKGROUND OF THE INVENTION

1. Field of the Invention

The present invention relates to a power output apparatus and a method of controlling the same. More specifically the present invention pertains to a power output apparatus for outputting power to a drive shaft and a method of controlling such a power output apparatus.

2. Description of the Related Art

In known power output apparatuses mounted on a vehicle, an output shaft of an engine is electromagnetically linked with a drive shaft, which a motor is attached to, by means of an electromagnetic coupling, so that power of the engine is output to the drive shaft (as disclosed in, for example, JAPANESE PATENT LAYING-OPEN GAZETTE No. 53-133814). In this power output apparatus, the vehicle starts driving by the function of the motor. When the revolving speed of the motor reaches a predetermined level, the power output apparatus supplies an exciting electric current to the electromagnetic coupling to crank the engine and carries out supply of a fuel into the engine and ignition with a spark, thereby starting the engine. After the engine starts, part of the power from the engine is output to the drive shaft via the electromagnetic coupling, in order to continue driving the vehicle. The residual power output from the engine is regenerated as electric power according to a slip of the electromagnetic coupling and may be stored into a battery as electric power used at the time of starting the vehicle or be used as electric power required for driving the motor. When the power output via the electromagnetic coupling is insufficient for the power to be output to the drive shaft, the motor is driven to supplement the shortage.

In the prior art power output apparatus, the electric power regenerated through the electromagnetic coupling or the electric power required for driving the motor is regulated by charging and discharging the battery. The efficiency of the whole power output apparatus accordingly depends upon the charge-discharge efficiency of the battery. When the power output from the engine is greater than the power required to the drive shaft, the electric power regenerated through the electromagnetic coupling becomes greater than the electric power consumed by the motor. In this case, the battery is charged with the surplus electric power. When the power output from the engine is smaller than the power required to the drive shaft, on the other hand, the electric power regenerated through the electromagnetic coupling becomes smaller than the electric power consumed by the motor. In this case, the battery is discharged to supplement the shortage of the electric power. When the power output from the engine is equal to the power required to the drive shaft, the electric power regenerated through the electromagnetic coupling becomes equal to the electric power consumed by the motor. In this case, the battery is neither charged nor discharged. The prior art power output apparatus, however, does not carry out such control.

In order to solve this problem, the applicant of the present invention has proposed power output apparatus for controlling operation of the engine to make the power output from the engine coincident with the power required to the drive shaft (for example, JAPANESE PATENT APPLICATION GAZETTE No. 7-225869).

Even under such control, the driving state of the engine, however, varies with the working temperature of the engine, the properties of the fuel supplied, the atmospheric temperature, and the atmospheric pressure. Such variation or an abnormality occurring in the engine may prevent the engine from outputting a desired power and cause the battery to be unexpectedly charged or discharged. This results in lowering the energy efficiency of the whole power output apparatus.

SUMMARY OF THE INVENTION

In order to solve at least part of the above problem, that is, the lowered efficiency of the whole power output apparatus accompanied by the charge and discharge of the battery, one object of the present invention is thus to carry out control and enable an engine to output a desired power.

Another object of the present invention is to lessen the opportunities of causing unexpected charge and discharge of storage battery means and to decrease the charge-discharge electric power even in the case of unexpected charging or discharging.

Still another object of the present invention is to enable the amount of charge or discharge of storage battery means to coincide with a predetermined target level, and to decrease a deviation of the charge-discharged electric power from the target level even if the deviation exists.

At least part of the above and the other related objects is realized by a power output apparatus for outputting power to a drive shaft. The power output apparatus includes: an engine having an output shaft linked therewith; power regulation means connected with the output shaft and the drive shaft for transmitting power output from the engine to the drive shaft and regulating magnitude of the transmitted power via transmission of electric power; a motor linked with either one of the output shaft and the drive shaft for receiving and transmitting power from and to the linked shaft; storage battery means electrically linked with the power regulation means and the motor for receiving and outputting electric power from and to the power regulation means and the motor; first target power setting means for specifying a target power of the drive shaft, which is to be output to the drive shaft; second target power setting means for specifying a target power of the engine, which is to be output from the engine, based on the target power of the drive shaft specified by the first target power setting means; engine control means for driving the engine in a predetermined driving state according to the target power of the engine specified by the second target power setting means; power control means for controlling the power regulation means and the motor, in order to enable a sum of the power output from the engine and charge-discharge electric power, which the storage battery means is charged with and which is discharged from the storage battery means, to be converted to the target power of the drive shaft and output to the drive shaft; deviation detecting means for detecting a deviation of the power output from the engine from the target power of the engine; and correction means for correcting either one of the target power of the drive shaft and the target power of the engine, based on the deviation of the power detected by the deviation detecting means.

In the power output apparatus of the present invention, the power regulation means connected with the output shaft of the engine and the drive shaft regulates the magnitude of power transmitted from the output shaft to the drive shaft via transmission of electric power. The motor receives and transmits power from and to either one of the output shaft of the engine and the drive shaft. The storage battery means is charged with and discharges electric power required for the regulation of the power by the power regulation means, and is charged with and discharges electric power required for the transmission of the power by the motor, according to the requirements. The first target power setting means specifies the target power of the drive shaft that is to be output to the drive shaft, whereas the second target power setting means specifies the target power of the engine that is to be output from the engine, based on the target power of the drive shaft. The engine control means controls operation of the engine, in order to enable the engine to output the preset target power of the engine. The power control means controls the power regulation means and the motor, in order to enable the sum of the power output from the engine and the charge-discharge electric power, which the storage battery means is charged with and which is discharged from the storage battery means, to be converted to the target power of the drive shaft and output to the drive shaft. The correction means corrects either one of the target power of the drive shaft and the target power of the engine, based on a deviation of the power output from the engine from the target power of the engine, which is detected by the deviation detecting means.

The term 'power' generally implies the energy output per unit time, which is expressed by the product of the torque applied to a shaft and the revolving speed of the shaft. In the specification hereof, the term 'power' is used in a narrower sense and implies the energy output per unit time as well as the driving state specified by a certain combination of torque and revolving speed. There are a numerous number of combinations of torque and revolving speed that can output a specific amount of energy per unit time. In the specification hereof, these driving states are referred to as different powers. The term 'power' has the same meaning in the method of controlling the power output apparatus according to the present invention discussed later. The power output apparatus is controlled, based on the transmission of energy at each moment, that is, based on the energy balance per unit time. The term 'energy' thus implies energy per unit time.

The power output apparatus of the present invention controls the engine, the power regulation means, and the motor, based on the deviation of the power output from the engine from the target power of the engine.

By way of example, the correction means may correct the target power of the drive shaft, in order to decrease the deviation of the power. This structure enables the power output to the drive shaft to be corrected via the power regulation means and the motor.

In another example, the correction means may correct the target power of the engine, in order to decrease the deviation of the power. This structure enables the power output from the engine to be corrected.

These structures effectively prevent undesired charge and discharge of the storage battery means and thereby improve the energy efficiency of the whole power output apparatus.

In accordance with one preferable application, the power output apparatus, wherein the correction means corrects the target power of the engine to decrease the deviation of the power, further includes: memory means for storing data representing a relationship between the target power of the drive shaft and the target power of the engine; and data updating means for, when the deviation of the power detected by the deviation detecting means is not greater than a predetermined value, updating the data stored in the memory means in order to relate the target power of the engine corrected by the correction means to the target power of the drive shaft. In this structure, the second target power setting means specifies the target power of the engine, based on the data stored in the memory means. This structure enables the engine to quickly approach a desired driving state, thereby further enhancing the energy efficiency of the whole power output apparatus.

In accordance with another preferable application, the correction means corrects the target power of the drive shaft specified by the first target power setting means, in order to decrease the deviation of the power within a predetermined range of ratio to the target power of the drive shaft. This structure prevents the target power of the drive shaft from being corrected to be out of the predetermined range of ratio.

In accordance with one preferable embodiment, the power output apparatus of the present invention having any one of the above structures may further include charge-discharge electric power detecting means for detecting the charge-discharge electric power, which the storage battery means is charged with and which is discharged from the storage battery means. In this case, the deviation detecting means detects the deviation of the power, based on the charge-discharge electric power detected by the charge-discharge electric power detecting means. This structure controls the operation of the engine based on the charge-discharge electric power of the storage battery means. Controlling the engine to reduce the charge-discharge electric power of the storage battery means enables the target power of the drive shaft to be output to the drive shaft without causing charge or discharge of the storage battery means.

The power output apparatus of this structure preferably has target electric power setting means for specifying a target electric power, which the storage battery means is charged with and which is discharged from the storage battery means. In this structure, the deviation detecting means detects the deviation of the power, based on a deviation of the charge-discharge electric power detected by the charge-discharge electric power detecting means from the target electric power specified by the target electric power setting means. This structure enables the target power of the drive shaft to be output to the drive shaft, while charging the storage battery means with a desired electric power or discharging the storage battery means to supplement a desired electric power.

In accordance with another preferable embodiment, the power regulation means may include torque regulation means for regulating a torque applied to the output shaft, so as to cause the output shaft to be rotated at a target revolving speed corresponding to the target power of the engine. In this structure, the deviation detecting means detects the deviation of the power, based on a difference between the torque regulated by the torque regulation means and a target torque corresponding to the target power of the engine. This structure ensures that the engine is driven in a desired driving state.

In the power output apparatus of the present invention having any one of the above structures, the power regulation means may be a pair-rotor motor that is provided with a first rotor connecting with the output shaft and a second rotor connecting with the drive shaft to be rotatable relative to the first rotor. The pair-rotor motor transmits the power output from the engine to the drive shaft via an electromagnetic coupling of the first rotor with the second rotor, and inputs and outputs electric power based on the electromagnetic coupling of the first rotor with the second rotor and a difference between a revolving speed of the first rotor and a revolving speed of the second rotor.

In the power output apparatus of the present invention having any one of the above structures, the power regulation means may include: three shaft-type power input/output means having a first rotating shaft connected with the output shaft, a second rotating shaft connected with the drive shaft, and a third rotating shaft which are different from the first rotating shaft and the second rotating shaft, the three shaft-type power input/output means determining powers input to and output from a residual one rotating shaft, based on predetermined powers input to and output from any two rotating shafts among the three rotating shafts; and a motor linked with the third rotating shaft for receiving and transmitting power from and to the third rotating shaft.

The present invention is directed to a first controller including an engine, engine control means for controlling operation of the engine, generator means linked with the engine, a motor linked with a drive shaft, and storage battery means electrically connected with the motor and the generator means. The first controller controls operation of a power output apparatus for outputting power to the drive shaft via at least power generation by the generator means and consumption of electric power by the motor. The first controller further includes: input means for inputting a target power of the drive shaft, which is required as power to be output to the drive shaft; target power output means for specifying a target power of the engine, which is to be output from the engine, based on the target power of the drive shaft, so as to enable charge-discharge electric power, which the storage battery means is charged with and which is discharged from the storage battery means, to be within a predetermined range, and outputting the specified target power of the engine to the engine control means; and correction means for, when the target power of the engine output by the target power output means causes the storage battery means to be charged with and discharge electric power that is out of the predetermined range, correcting the target power of the engine according to the electric power that is out of the predetermined range.

The present invention is also directed to a second controller including an engine, engine control means for controlling operation of the engine, generator means linked with the engine, a motor linked with a drive shaft, and storage battery means electrically connected with the motor and the generator means. The second controller controls operation of a power output apparatus for outputting power to the drive shaft via at least power generation by the generator means and consumption of electric power by the motor. The second controller further includes: input means for inputting a target power of the drive shaft, which is required as power to be output to the drive shaft; target power output means for specifying a target power of the engine, which is to be output from the engine, based on the target power of the drive shaft, so as to enable charge-discharge electric power, which the storage battery means is charged with and which is discharged from the storage battery means, to be within a predetermined range, and outputting the specified target power of the engine to the engine control means; and correction means for, when the target power of the engine output by the target power output means causes the storage battery means to be charged with and discharge electric power that is out of the predetermined range, correcting the target power of the drive shaft according to the electric power that is out of the predetermined range.

In the first controller and the second controller according to the present invention, the target power of the engine, which is output to the engine control means, is corrected, in order to make the charge-discharge electric power of the storage battery means to be within a predetermined range. This structure effectively improves the working efficiency of the power output apparatus.

The structures of the first controller and the second controller may be combined with each other. Namely the correction means may have: first correction means for correcting the target power of the engine; and second correction means for, when the target power of the engine corrected by the first correction means causes the storage battery means to be charged with and discharge electric power that is out of the predetermined range, correcting the target power of the drive shaft.

In the controller of this structure, the target power of the drive shaft is corrected only when the corrected target power of the engine fails the charge-discharge electric power of the storage battery means to be within the predetermined range. The controller can drive the power output apparatus at a high efficiency, while outputting the required target power to the drive shaft as much as possible. The corrected target power of the engine fails the charge-discharge electric power of the storage battery means to be within the predetermined range, for example, in case that part of the engine malfunctions or in case that the target power of the engine corrected according to the environmental factors, such as the atmospheric pressure or the atmospheric temperature, exceeds a possible power range that can be output from the engine. These states are detected, for example, by a variation in charge-discharge electric power of the storage battery means or by a time period when the storage battery means is continuously charged with or discharges the electric power out of a predetermined range.

The present invention is directed to a method of controlling a power output apparatus, which includes: an engine having an output shaft linked therewith; power regulation means connected with the output shaft and the drive shaft for transmitting power output from the engine to the drive shaft and regulating magnitude of the transmitted power via transmission of electric power; a motor linked with either one of the output shaft and the drive shaft for receiving and transmitting power from and to the linked shaft; and storage battery means electrically linked with the power regulation means and the motor for receiving and outputting electric power from and to the power regulation means and the motor. The method of the present invention includes the steps of:

(a) specifying a target power of the drive shaft, which is to be output to the drive shaft;

(b) specifying a target power of the engine, which is to be output from the engine, based on the target power of the drive shaft specified in the step (a);

(c) driving the engine in a predetermined driving state according to the target power of the engine specified in the step (b);

(d) controlling the power regulation means and the motor, in order to enable a sum of the power output from the engine and charge-discharge electric power, which the storage battery means is charged with and which is discharged from the storage battery means, to be converted to the target power of the drive shaft and output to the drive shaft;

(e) detecting a deviation of the power output from the engine from the target power of the engine; and (f) correcting either one of the target power of the drive shaft and the target power of the engine, based on the deviation of the power detected in the step (e).

The method of the present invention controls the engine, the power regulation means, and the motor, based on the deviation of the power output from the engine from the target power of the engine. By way of example, the method may correct the target power of the drive shaft to decrease the deviation of the power, thereby enabling the power output to the drive shaft to be corrected via the power regulation means and the motor. In another example, the method may correct the target power of the engine to decrease the deviation of the power, thereby enabling the power output from the engine to be corrected. These structures effectively prevent undesired charge and discharge of the storage battery means and improve the energy efficiency of the whole power output apparatus.

In accordance with one preferable application, the power output apparatus further includes memory means for storing data representing a relationship between the target power of the drive shaft and the target power of the engine. The step (b) specifies the target power of the engine, based on the data stored in the memory means, and the step (f) corrects the target power of the engine, in order to decrease the deviation of the power. The method further includes the step of:

(g) when the deviation of the power detected in the step (e) is not greater than a predetermined value, updating the data stored in the memory means in order to relate the target power of the engine corrected in the step (f) to the target power of the drive shaft.

This structure enables the engine to quickly approach a desired driving state and further enhances the energy efficiency of the whole power output apparatus.

In accordance with another preferable application, the step (f) corrects the target power of the drive shaft specified in the step (a), in order to decrease the deviation of the power within a predetermined range of ratio to the target power of the drive shaft. This structure prevents the target power of the drive shaft from being corrected to be out of the predetermined range of ratio.

The above and other objects, features, aspects, and advantages of the present invention will become more apparent from the following detailed description of the preferred embodiments with the accompanying drawings.

DESCRIPTION OF THE PREFERRED EMBODIMENTS

Some modes of carrying out the present invention are discussed below as preferred embodiments. The general structure of the vehicle is described first for the convenience of explanation.

Figure 2:
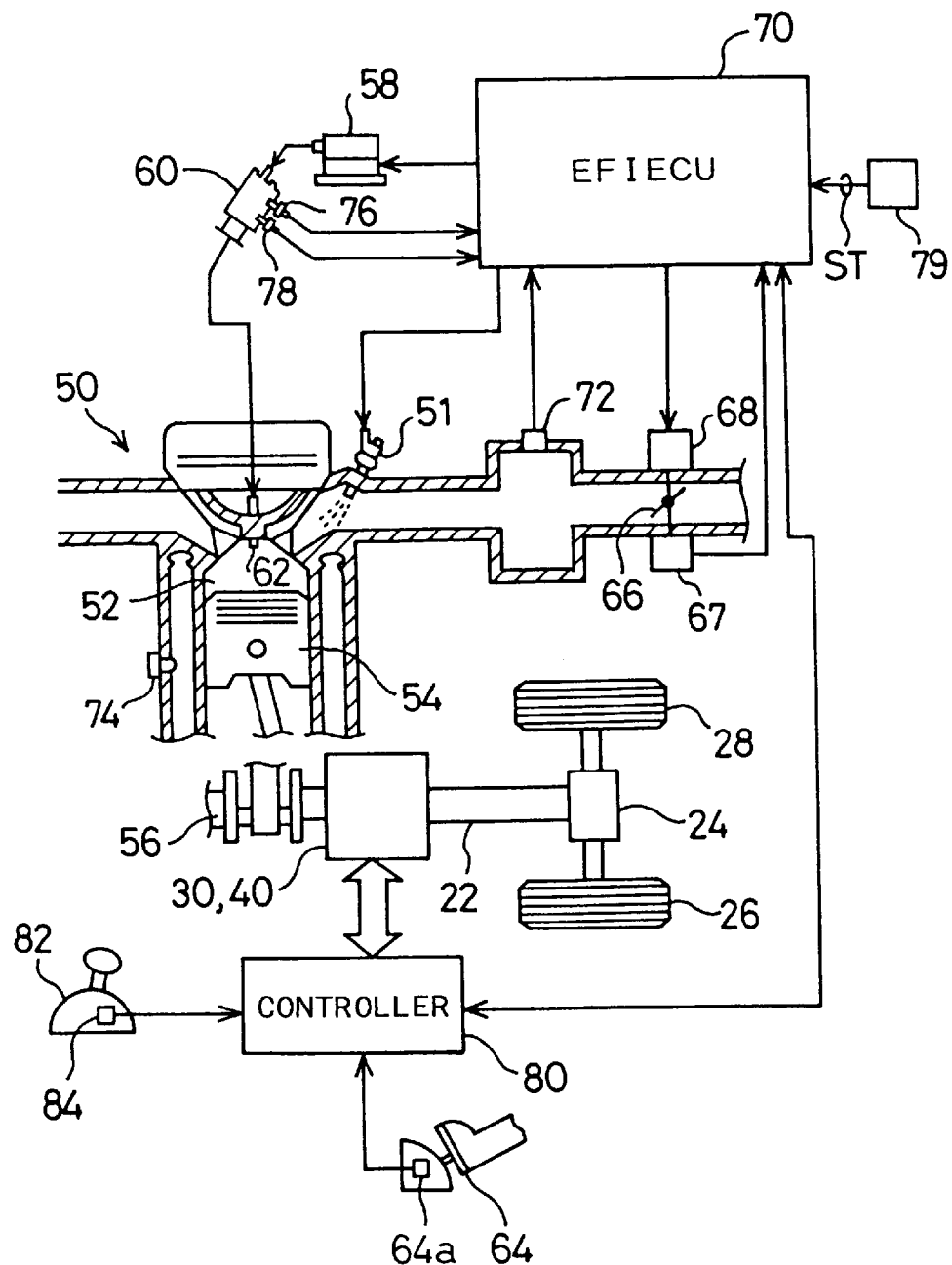
FIG. 2 schematically illustrates general structure of a vehicle with the power output apparatus 20 of the first embodiment incorporated therein.

Referring to FIG. 2, the vehicle is provided with an engine 50 which consumes gasoline as a fuel and outputs power. The air ingested from an air supply system via a throttle valve 66 is mixed with a fuel, that is, gasoline in this embodiment, injected from a fuel injection valve 51. The air/fuel mixture is supplied into a combustion chamber 52 to be explosively ignited and burned. Linear motion of a piston 54 pressed down by the explosion of the air/fuel mixture is converted to rotational motion of a crankshaft 56. The throttle valve 66 is driven to open and close by an actuator 68. An ignition plug 62 converts a high voltage applied from an igniter 58 via a distributor 60 to a spark, which explosively ignites and combusts the air/fuel mixture.

Operation of the engine 50 is controlled by an electronic control unit (hereinafter referred to as EFIECU) 70. The EFIECU 70 receives information from various sensors, which detect operating conditions of the engine 50. These sensors include a throttle valve position sensor 67 for detecting a valve travel or position of the throttle valve 66, a manifold vacuum sensor 72 for measuring a load applied to the engine 50, a water temperature sensor 74 for measuring the temperature of cooling water in the engine 50, and a speed sensor 76 and an angle sensor 78 mounted on the distributor 60 for measuring the revolving speed (the number of revolutions per a predetermined time period) and the rotational angle of the crankshaft 56. A starter switch 79 for detecting a starting condition ST of an ignition key (not shown) is also connected to the EFIECU 70. Other sensors and switches connecting with the EFIECU 70 are omitted from the illustration.

The crankshaft 56 of the engine 50 is linked with a drive shaft 22 via a clutch motor 30 and an assist motor 40 (described later in detail). The drive shaft 22 further connects with a differential gear 24, which eventually transmits the torque output from the drive shaft 22 of the power output apparatus 20 to left and right driving wheels 26 and 28. The clutch motor 30 and the assist motor 40 are driven and controlled by a controller 80. The controller 80 includes an internal control CPU and receives inputs from a gearshift position sensor 84 attached to a gearshift 82, an accelerator pedal position sensor 64a attached to an accelerator pedal 64, and a brake pedal position sensor 65a attached to a brake pedal 65. The detailed structure of the controller 80 will be described later. The controller 80 sends and receives a variety of data and information to and from the EFIECU 70 through communication. Details of the control procedure including a communication protocol will be described later.

Figure 1:
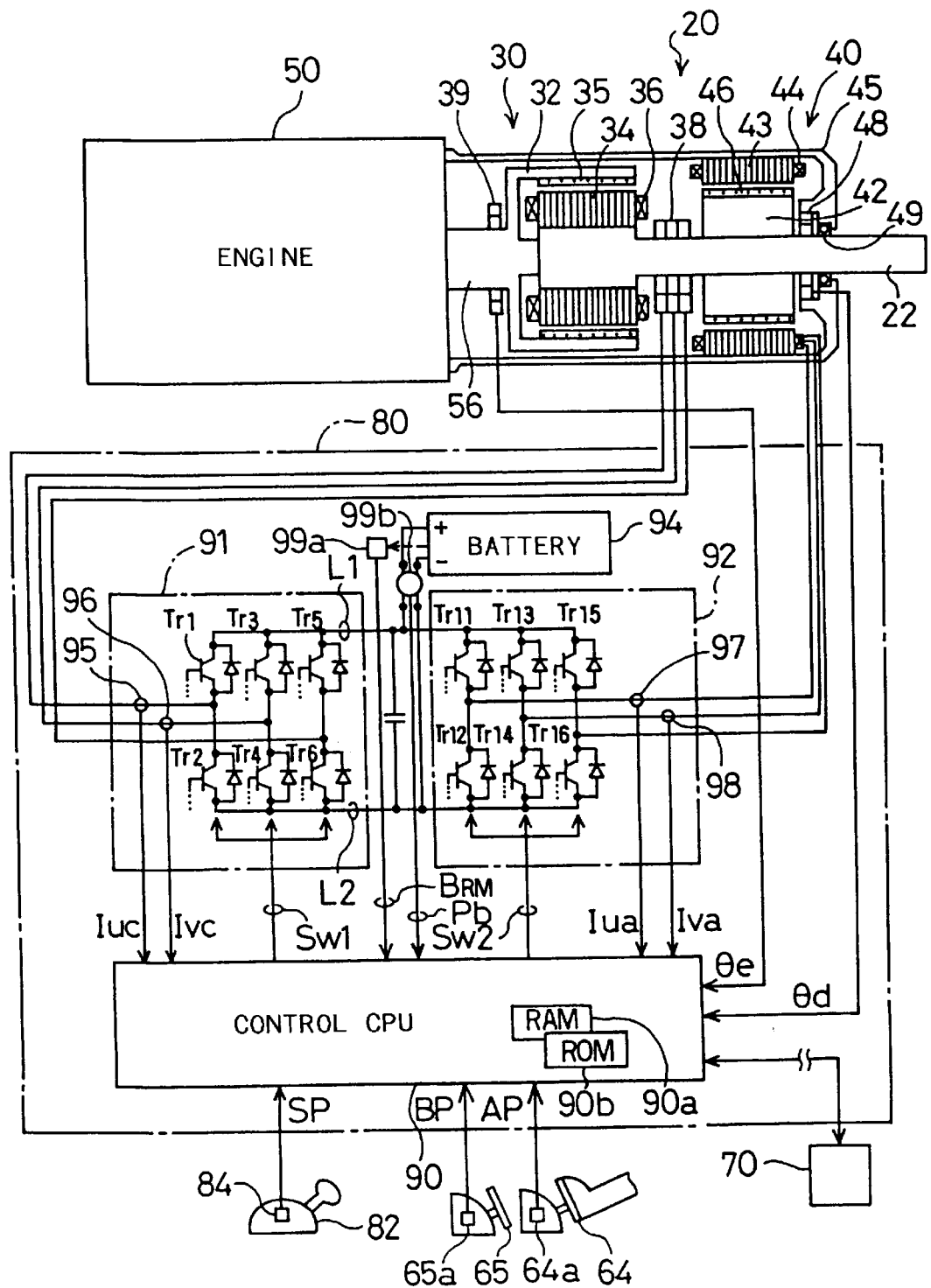
FIG. 1 schematically illustrates structure of a power output apparatus 20 as a first embodiment according to the present invention.

Referring to FIG. 1, the power output apparatus 20 of the embodiment essentially includes the engine 50, the clutch motor 30 having an outer rotor 32 and an inner rotor 34, the assist motor 40 having a rotor 42 linked with the drive shaft 22, and the controller 80 for driving and controlling the clutch motor 30 and the assist motor 40. The outer rotor 32 of the clutch motor 30 is linked with the crankshaft 56 of the engine 50, whereas the inner rotor 34 is linked with the drive shaft 22.

As shown in FIG. 1, the clutch motor 30 is constructed as a synchronous motor having permanent magnets 35 attached to an inner surface of the outer rotor 32 and three-phase coils 36 wound on slots formed in the inner rotor 34. Electric power is supplied to the three-phase coils 36 via a slip ring 38. Laminated sheets of non-directional electromagnetic steel are used to form teeth and slots for the three-phase coils 36 in the inner rotor 34. A resolver 39 for measuring a rotational angle $\theta e$ of the crankshaft 56 is attached to the crankshaft 56. The resolver 39 may also serve as the angle sensor 78 mounted on the distributor 60.

The assist motor 40 is also constructed as a synchronous motor having three-phase coils 44, which are wound on a stator 43 fixed to a casing 45 to generate a revolving magnetic field. The stator 43 is also made of laminated sheets of non-directional electromagnetic steel. A plurality of permanent magnets 46 are attached to an outer surface of the rotor 42. In the assist motor 40, interaction between a magnetic field formed by the permanent magnets 46 and a revolving magnetic field formed by the three-phase coils 44 results in rotations of the rotor 42. The rotor 42 is mechanically linked with the drive shaft 22 working as the torque output shaft of the power output apparatus 20. A resolver 48 for measuring a rotational angle $\theta d$ of the drive shaft 22 is attached to the drive shaft 22, which is further supported by a bearing 49 held in the casing 45.

The inner rotor 34 of the clutch motor 30 is mechanically linked with the rotor 42 of the assist motor 40 and further with the drive shaft 22. The axial torque output from the engine 50 to the crankshaft 56 is accordingly output via the outer rotor 32 and the inner rotor 34 of the clutch motor 30 to the drive shaft 22, while the torque from the assist motor 40 is added to or subtracted from the transmitted axial torque.

While the assist motor 40 is constructed as a conventional permanent magnet-type three-phase synchronous motor, the clutch motor 30 includes two rotating elements or rotors, that is, the outer rotor 32 with the permanent magnets 35 mounted thereon and the inner rotor 34 with the three-phase coils 36 wound thereon. The following describes the detailed structure of the clutch motor 30. As mentioned previously, the outer rotor 32 of the clutch motor 30, on which the permanent magnets 35 are mounted, is linked with the crankshaft 56, and the inner rotor 34 with the drive shaft 22. In this embodiment, a total of eight permanent magnets 35 (four N poles and four S poles) are attached to the inner circumferential surface of the outer rotor 32. The permanent magnets 35 are magnetized in the direction towards the axial center of the clutch motor 30 and have magnetic poles of alternately inverted directions. The three-phase coils 36 of the inner rotor 34 facing to the permanent magnets 35 across a little gap are wound on a total of 12 slots (not shown) formed in the inner rotor 34. Supply of electricity to the respective coils forms magnetic fluxes running through the teeth (not shown), which separate the slots from one another. Supply of a three-phase alternating current to the respective coils rotates this magnetic field. The three-phase coils 36 are connected to receive electric power supplied via the slip ring 38. The slip ring 38 includes rotary rings 38a fixed to the drive shaft 22 and brushes 38b. There are three sets of rotary rings 38a and brushes 38b in the slip ring 38, in order to receive and supply electric currents of three phases (U, V, and W phases).

Interaction between a magnetic field formed by one adjoining pair of permanent magnets 35 and a revolving magnetic field formed by the three-phase coils 36 of the inner rotor 34 leads to a variety of behaviors of the outer rotor 32 and the inner rotor 34. The frequency of the three-phase alternating current supplied to the three-phase coils 36 is generally four times the difference between the revolving speed of the outer rotor 32 directly connected to the crankshaft 56 and the revolving speed of the inner rotor 34.

As mentioned above, the clutch motor 30 and the assist motor 40 are driven and controlled by the controller 80. Referring back to FIG. 1, the controller 80 includes a first driving circuit 91 for driving the clutch motor 30, a second driving circuit 92 for driving the assist motor 40, a control CPU 90 for controlling both the first and the second driving circuits 91 and 92, and a battery 94 including a number of secondary cells. The control CPU 90 is a one-chip microprocessor including a RAM 90a used as a working memory, a ROM 90b in which various control programs are stored, an input/output port (not shown), and a serial communication port (not shown) through which data are sent to and received from the EFIECU 70. The control CPU 90 receives a variety of data via the input port. The input data include a rotational angle θe of the crankshaft 56 of the engine 50 measured with the resolver 39, a rotational angle θd of the drive shaft 22 measured with the resolver 48, an accelerator pedal position AP (step-on amount of the accelerator pedal 64) output from the accelerator pedal position sensor 64a, a brake pedal position BP (step-on amount of the brake pedal 65) output from the brake pedal position sensor 65a, a gearshift position SP output from the gearshift position sensor 84, clutch motor currents Iuc and Ivc from two ammeters 95 and 96 disposed in the first driving circuit 91, assist motor currents Iua and Iva from two ammeters 97 and 98 disposed in the second driving circuit 92, a remaining charge BRM of the battery 94 measured with a remaining charge meter 99a, and a charge-discharge electric power Pb of the battery 94 measured with a wattmeter 99b attached to an output terminal of the battery 94. The remaining charge meter 99a may determine the remaining charge BRM of the battery 94 by any known method; for example, by measuring the specific gravity of an electrolytic solution in the battery 94 or the whole weight of the battery 94, by computing the currents and time of charge and discharge, or by causing an instantaneous short-circuit between terminals of the battery 94 and measuring an internal resistance against the electric current.

The control CPU 90 outputs a first control signal SW1 for driving six transistors Tr1 through Tr6 working as switching elements of the first driving circuit 91 and a second control signal SW2 for driving six transistors Tr11 through Tr16 working as switching elements of the second driving circuit 92. The six transistors Tr1 through Tr6 in the first driving circuit 91 constitute a transistor inverter and are arranged in pairs to work as a source and a drain with respect to a pair of power lines L1 and L2. The three-phase coils (U,V,W) 36 of the clutch motor 30 are connected via the slip ring 38 to the respective contacts of the paired transistors. The power lines L1 and L2 are respectively connected to plus and minus terminals of the battery 94. The first control signal SW1 output from the control CPU 90 thus successively controls the power-on time of the paired transistors Tr1 through Tr6. The electric current flowing through each coil 36 undergoes PWM (pulse width modulation) to give a quasi-sine wave, which enables the three-phase coils 36 to form a revolving magnetic field.

The six transistors Tr11 through Tr16 in the second driving circuit 92 also constitute a transistor inverter and are arranged in the same manner as the transistors Tr1 through Tr6 in the first driving circuit 91. The three-phase coils (U,V,W) 44 of the assist motor 40 are connected to the respective contacts of the paired transistors. The second control signal SW2 output from the control CPU 90 thus successively controls the power-on time of the paired transistors Tr11 through Tr16. The electric current flowing through each coil 44 undergoes PWM to give a quasi-sine wave, which enables the three-phase coils 44 to form a revolving magnetic field.

The power output apparatus 20 of the first embodiment thus constructed works in accordance with the operation principles discussed below, especially with the principle of torque conversion. By way of example, it is assumed that the engine 50 driven by the EFIECU 70 rotates at a revolving speed Ne that is equal to a predetermined value N1. While the transistors Tr1, Tr3, and Tr5 of the first driving circuit 91 are in OFF position and the transistors Tr2, Tr4, and Tr6 are in ON position, the controller 80 does not supply any electric current to the three-phase coils 36 of the clutch motor 30 via the slip ring 38. No supply of electric current causes the outer rotor 32 of the clutch motor 30 to be electromagnetically disconnected from the inner rotor 34. This results in racing the crankshaft 56 of the engine 50.

As the control CPU 90 of the controller 80 outputs the first control signal SW1 to control on and off the transistors Tr1 through Tr6 in the first driving circuit 91, electric current flows through the three-phase coils 36 of the clutch motor 30, based on the difference between the revolving speed Ne of the crankshaft 56 of the engine 50 and a revolving speed Nd of the drive shaft 22 (in other words, a difference Nc (=Ne−Nd) between the revolving speed of the outer rotor 32 and that of the inner rotor 34 in the clutch motor 30). In the clutch motor 30, the outer rotor 32 is electromagnetically connected with the inner rotor 34 via a slip. At this moment, the inner rotor 34 rotates at the revolving speed Nd, which is lower than the revolving speed Ne of the engine 50 (revolving speed of the crankshaft 56). In this state, the clutch motor 30 functions as a generator, that is, carries out the regenerative operation to regenerate electric current via the first driving circuit 91 and charges the battery 94 with the electric power thus regenerated. In order to allow the assist motor 40 to consume the energy that is identical with the electric power regenerated by the clutch motor 30, the control CPU 90 controls on and off the transistors Tr11 through Tr16 in the second driving circuit 92. The on-off control of the transistors Tr11 through Tr16 enables electric current to flow through the three-phase coils 44 of the assist motor 40, and the assist motor 40 consequently carries out the power operation to produce a torque.

Figure 3:
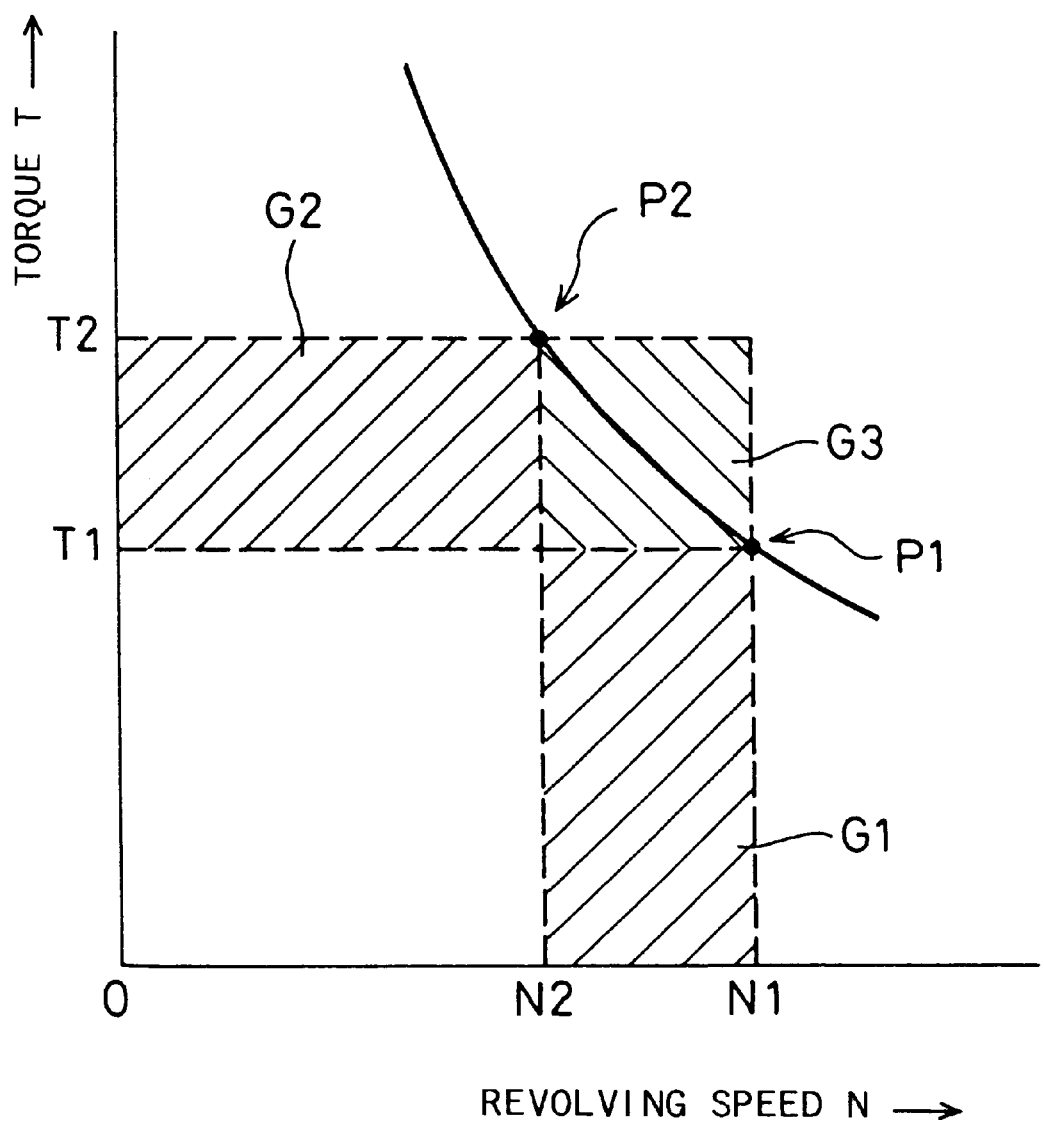
FIG. 3 is a graph showing the operation principle of the power output apparatus 20 of the first embodiment.

Referring to FIG. 3, when the engine 50 is driven at a driving point P1 defined by the revolving speed Ne=N1 and a torque Te=T1, the clutch motor 30 transmits the torque T1 to the drive shaft 22 and regenerates energy expressed as an area G1. The regenerative energy is supplied to the assist motor 40 as energy expressed as an area G2, so that a torque T2 is applied to the drive shaft 22 that is rotated at a revolving speed N2.

In another example, it is assumed that the engine 50 is driven at a driving point P2 defined by the revolving speed Ne=N2 and the torque Te=T2, while the drive shaft 22 is rotated at the revolving speed Nd=N1, which is greater than the revolving speed N2. In this state, the inner rotor 34 of the clutch motor 30 rotates relative to the outer rotor 32 in the direction of rotation of the drive shaft 22 at a revolving speed defined by the absolute value of the revolving speed difference Nc (=Ne−Nd). The clutch motor 30 accordingly functions as a normal motor and consumes electric power supplied from the battery 94 to give the energy of rotational motion to the drive shaft 22. When the control CPU 90 of the controller 80 controls the second driving circuit 92 to enable the assist motor 40 to regenerate electrical energy, a slip between the rotor 42 and the stator 43 of the assist motor 40 makes the regenerative current flow through the three-phase coils 44. In order to allow the clutch motor 30 to consume the electric power regenerated by the assist motor 40, the control CPU 90 controls both the first driving circuit 91 and the second driving circuit 92. This enables the clutch motor 30 to be driven without using electric power stored in the battery 94.

Referring to FIG. 3, when the crankshaft 56 is driven at the driving point P2 defined by the revolving speed Ne=N2 and the torque Te=T2, energy expressed as the sum of the areas G1 and G3 is supplied to the clutch motor 30, which consequently outputs the torque T2 to the drive shaft 22. The energy supplied to the clutch motor 30 is regenerated and supplied by the assist motor 40 as energy expressed as the sum of the areas G2 and G3. This results in applying the torque T1 to the drive shaft 22, which is rotated at the revolving speed N1.

As clearly understood from the above discussion, in the power output apparatus 20 of the first embodiment, all the power output from the engine 50 is subjected to torque conversion and output to the drive shaft 22, whether or not the revolving speed Ne of the engine 50 is greater than the revolving speed Nd of the drive shaft 22. Namely the engine 50 can be driven at any driving point which outputs the energy identical with energy Pd to be output to the drive shaft 22, on the assumption that the efficiency of torque conversion by the clutch motor 30 and the assist motor 40 is equal to 100%. The driving point of the engine 50 can thus be determined arbitrarily irrespective of the revolving speed Nd of the drive shaft 22, as long as the engine 50 can output the energy identical with the energy Pd to be output to the drive shaft 22. A concrete procedure for setting the driving point of the engine 50 will be discussed later. Although the real efficiency of torque conversion by the clutch motor 30 and the assist motor 40 is not equal to 100%, it is regarded as 100% in the embodiment for the clarity of explanation.

As described above, in the power output apparatus 20 of the first embodiment, the basic process enables all the power output from the engine 50 to be subjected to torque conversion and output to the drive shaft 22. Another possible process makes the power output from the engine 50 (that is, the product of the torque Te and the revolving speed Ne) greater than the power required to the drive shaft 22 (that is, the product of the torque Td and the revolving speed Nd) and charges the battery 94 with the surplus electric power. Still another possible process makes the power output from the engine 50 smaller than the power required to the drive shaft 22 and discharges the battery 94 to supplement the shortage of electric power.

Figure 4:
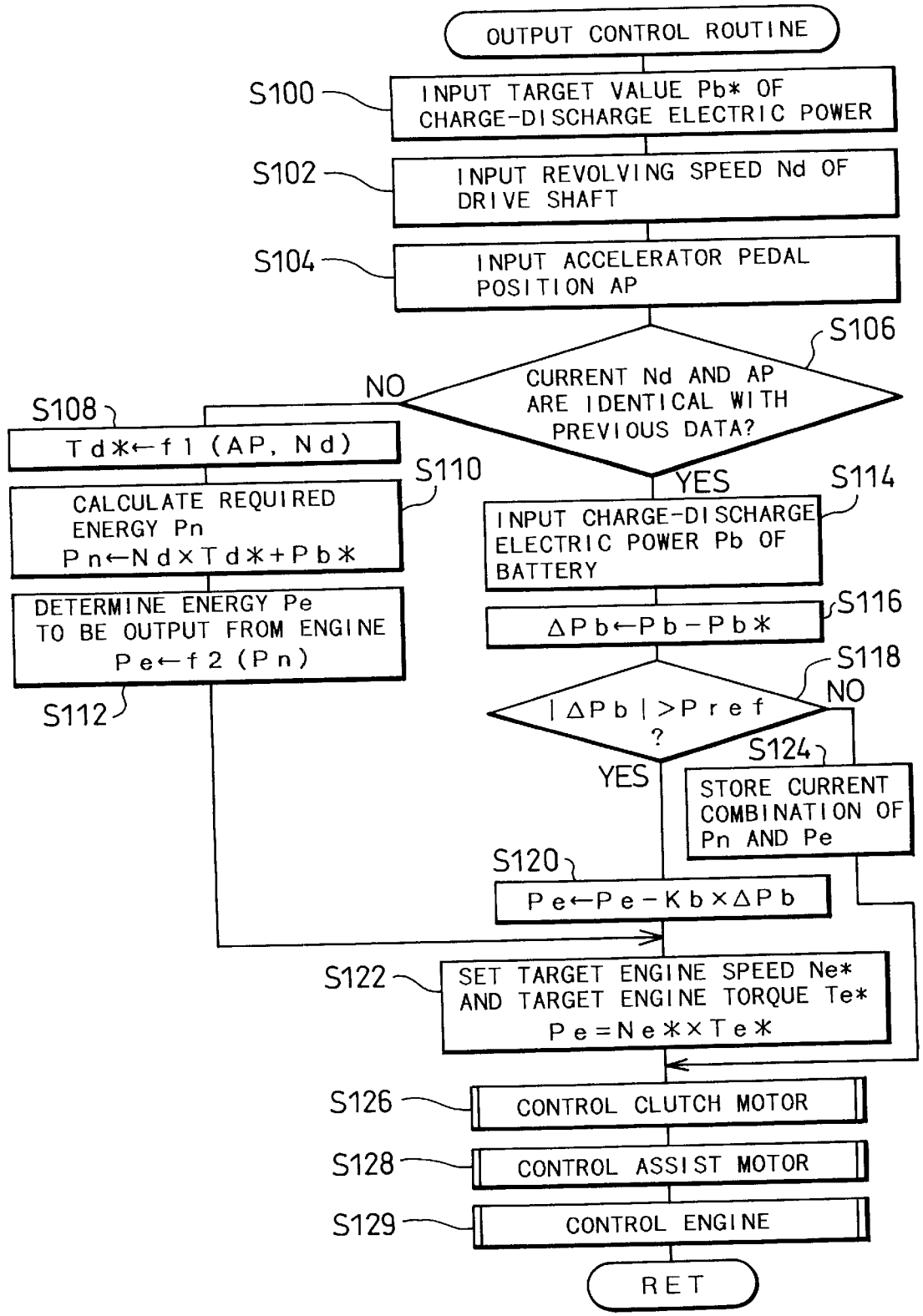
FIG. 4 is a flowchart showing an output control routine executed by the control CPU 90 of the controller 80 in the first embodiment.

The power output apparatus 20 of the embodiment carries out an output control according to an output control routine shown in the flowchart of FIG. 4. The output control routine is repeatedly executed at predetermined time intervals (for example, at every 20 msec) immediately after the power output apparatus 20 is activated. When the program enters the routine of FIG. 4, the control CPU 90 of the controller 80 first reads a target value Pb* of the charge-discharge electric power Pb of the battery 94 at step S100. The target value Pb* of the charge-discharge electric power of the battery 94 is set according to a routine of setting the charge-discharge electric power of the battery 94 (not shown) and registered at a predetermined address in the RAM 90a. The charge-discharge electric power setting routine determines whether the battery 94 is to be charged or discharged, based on the remaining charge BRM of the battery 94, which may be within or out of a desired range, and specifies a charging electric power or discharging electric power, which depends upon the remaining charge BRM of the battery 94, as the target value Pb* of the charge-discharge electric power. The control CPU 90 then reads the revolving speed Nd of the drive shaft 22 at step S102. The revolving speed Nd of the drive shaft 22 may be calculated from the rotational angle θd of the drive shaft 22 read from the resolver 48.

The control CPU 90 then reads the accelerator pedal position AP (that is, the step-on amount of the accelerator pedal 64) detected by the accelerator pedal position sensor 64a at step S104. The driver steps on the accelerator pedal 64 when feeling insufficiency of the output torque. The value of the accelerator pedal position AP accordingly represents the desired output torque (that is, the torque to be output to the drive shaft 22). It is determined at step S106 whether or not the input revolving speed Nd of the drive shaft 22 and the input accelerator pedal position AP are identical with previous data input in the previous cycle of this routine. An initialization routine (not shown) is carried out immediately after the activation of the power output apparatus 20 and initializes the previous data of the revolving speed Nd and the accelerator pedal position AP to zero. When the output control routine of FIG. 4 is executed for the first time after the power output apparatus 20 of the first embodiment is activated, these initialized data are used for the determination at step S106. In case that the driver steps on the accelerator pedal 64 after the activation of the power output apparatus 20, the accelerator pedal position AP input in the current cycle of this routine is different from the previous data. The following describes the procedure carried out when either of the revolving speed Nd of the drive shaft 22 and the accelerator pedal position AP is different from the previous data.

Figure 5:
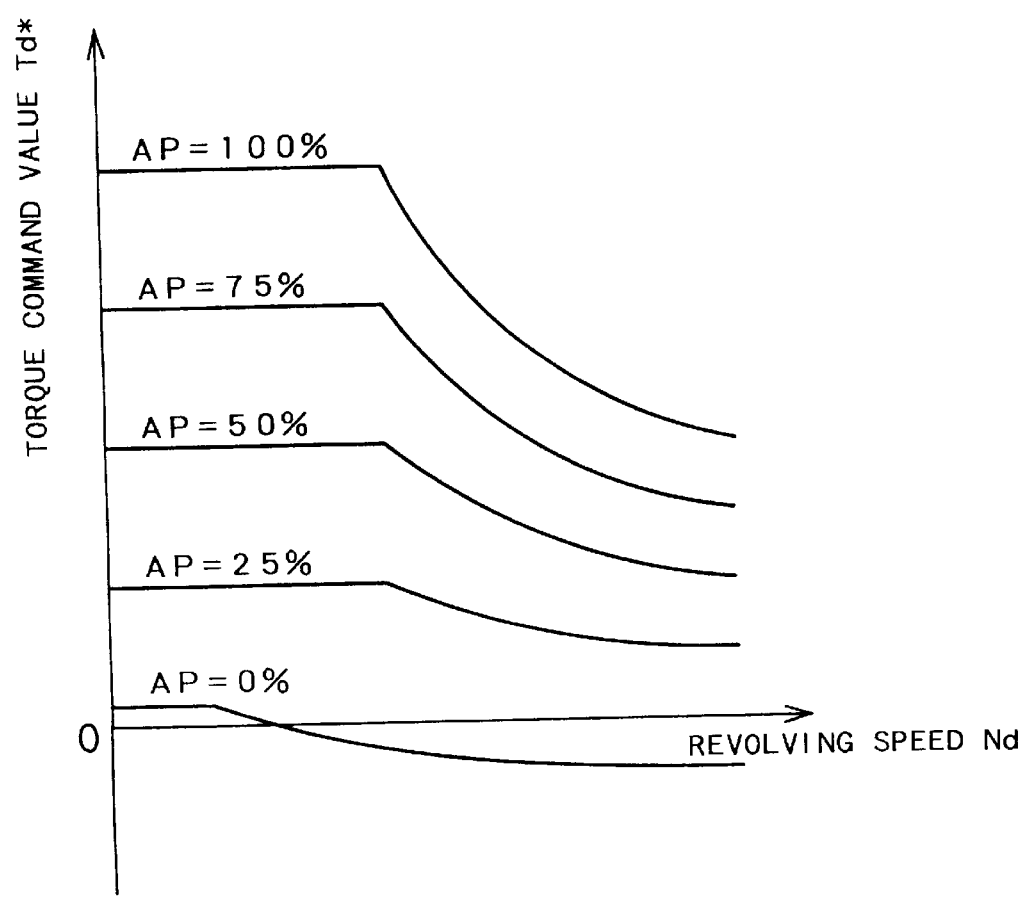
FIG. 5 is a graph showing the relationship between the revolving speed Nd of the drive shaft 22, the accelerator pedal position AP, and the torque command value Td*.

When either of the revolving speed Nd of the drive shaft 22 and the accelerator pedal position AP is different from the previous data at step S 106, the control CPU 90 determines a torque command value Td* based on the input accelerator pedal position AP and the input revolving speed Nd of the drive shaft 22 at step S108. In this embodiment, the torque command values Td* corresponding to various combinations of the accelerator pedal position AP and the revolving speed Nd are determined and stored in advance as a map into the ROM 90b. A concrete procedure of step S108 reads the torque command value Td* corresponding to the input revolving speed Nd of the drive shaft 22 and the input accelerator pedal position AP from the map stored in the ROM 90b. FIG. 5 shows an example of this map.

At step S110, required energy Pn is calculated from the torque command value Td* thus determined, the input revolving speed Nd of the drive shaft 22, and the input target value Pb* of the charge-discharge electric power of the battery 94 (Pn=Nd×Td*+Pb*). The control CPU 90 then sets energy Pe to be output from the engine 50 based on the required energy Pn at step S112. In case that discharge of the battery 94 is required, the target value Pb* is negative and the required energy Pn becomes smaller than energy Pd to be output to the drive shaft 22 (Pd=Nd×Td*). In this embodiment, a map representing the relationship between the required energy Pn and the output energy Pe is prepared and stored into the RAM 90a at step S124 as discussed later. A concrete procedure of step S112 reads the output energy Pe corresponding to the required energy Pn calculated at step S110 from the map stored in the RAM 90a. Preset values are used for some combinations of the required energy Pn and the output energy Pe that are not stored at step S124.

After obtaining the energy Pe to be output from the engine 50, the control CPU 90 subsequently sets a target torque Te* and a target revolving speed Ne* of the engine 50 based on this energy Pe at step S122. The energy Pe output from the engine 50 is equal to the product of the torque Te and the revolving speed Ne of the engine 50, so that the relationship between the energy Pe, the target engine speed Ne*, and the target engine torque Te* can be defined as Pe=Ne*×Te*. There are, however, numerous combinations of the target torque Te* and the target revolving speed Ne* of the engine 50 satisfying the above relationship. In this embodiment, the optimum driving point against each value of the energy Pe is experimentally or otherwise determined as the optimum combination of the target engine torque Te* and the target engine speed Ne*. At the optimum driving point, the engine 50 is driven at the highest possible efficiency and the driving state of the engine 50 smoothly changes with a variation in energy Pe. The relationship between the optimum driving point and the energy Pe is stored in advance as a map into the ROM 90b. A concrete procedure of step S122 reads the optimum combination of the target engine torque Te* and the target engine speed Ne* corresponding to the energy Pe from the map stored in the ROM 90b. The details of the map are discussed below.

Figure 6:
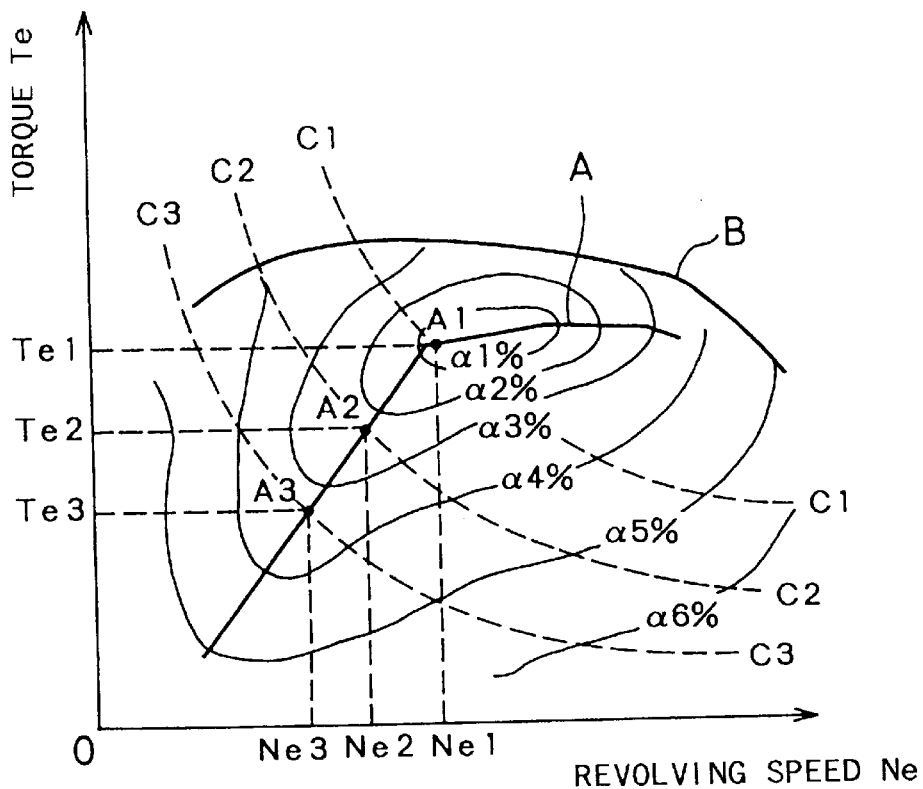
FIG. 6 is a graph showing the driving points of the engine 50 at various efficiencies.

FIG. 6 is a graph showing the relationship between the driving point of the engine 50 and the efficiency of the engine 50. The curve B in FIG. 6 represents a boundary of an engine-operable range, in which the engine 50 can be driven. In the engine-operable range, efficiency curves, such as curves α1 through α6, can be drawn by successively joining the driving points having the identical efficiency according to the characteristics of the engine 50. In the engine-operable range, constant energy curves expressed as the product of the torque Te and the revolving speed Ne, such as curves C1—C1 through C3—C3, can also be drawn. The graph of FIG. 7 shows the efficiency of the respective driving points along the constant energy curves C1—C1 through C3—C3 plotted against the revolving speed Ne of the engine 50.

Figure 7:
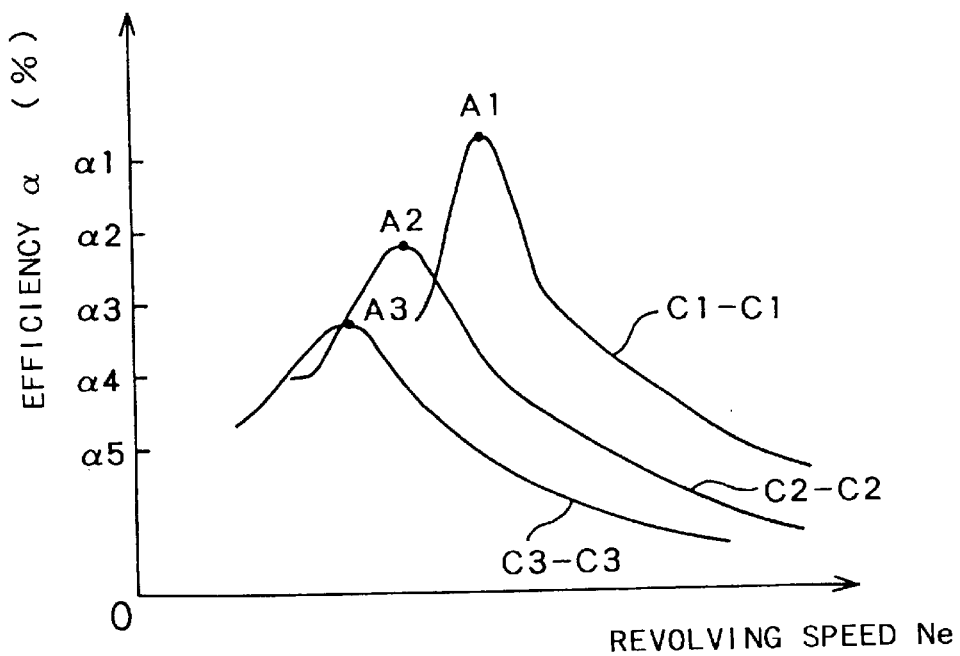
FIG. 7 is a graph showing the efficiency at various driving points of the engine 50 on constant energy curves plotted against the revolving speed Ne of the engine 50.

Referring to FIG. 7, even when the energy Pe output from the engine 50 is constant, the efficiency of the engine 50 is significantly varied by its driving point. On the constant energy curve C1—C1, for example, the efficiency of the engine 50 reaches its maximum when the engine 50 is driven at a driving point A1 (torque Te1 and revolving speed Ne1). Such a driving point attaining the highest possible efficiency exists on each constant energy curve, that is, a driving point A2 on the constant energy curve C2—C2 and a driving point A3 on the constant energy curve C3—C3. The curve A in FIG. 6 is obtained by joining such driving points attaining the highest possible efficiency of the engine 50 for the respective values of energy Pe by a continuous curve. In the embodiment, the map representing the relationship between the driving point (torque Te and revolving speed Ne) on the curve A and the energy Pe is used at step S122 in the flowchart of FIG. 4, in order to set the target torque Te* and the target revolving speed Ne* of the engine 50.

The curve A should be continuous because of the following reason. In case that a discontinuous curve is used to set the driving point of the engine 50 corresponding to the varying energy Pe, the driving state of the engine 50 abruptly changes with a variation in energy Pe over the discontinuous driving points. The abrupt change may prevent the driving state from being smoothly shifted to a target level, thereby causing knock or even an abrupt stop of the vehicle. When the curve A is continuous, each driving point on the curve A may not correspond to the driving point of the highest possible efficiency on the constant energy curve.

After setting the target torque Te* and the target revolving speed Ne* of the engine 50, the program proceeds to steps S126, S128, and S129 to respectively control the clutch motor 30, the assist motor 40, and the engine 50 with the preset values. In this embodiment, as a matter of convenience of illustration, the control operations of the clutch motor 30, the assist motor 40, and the engine 50 are shown as separate steps in the output control routine. In the actual procedure, however, these control operations are carried out in parallel with but independently of one another at a different timing from this routine. By way of example, the control CPU 90 controls the clutch motor 30 and the assist motor 40 in parallel at a different timing from this output control routine by utilizing an interrupting process, while transmitting an instruction to the EFIECU 70 through communication in order to cause the EFIECU 70 to control the engine 50 concurrently.

Figure 8:
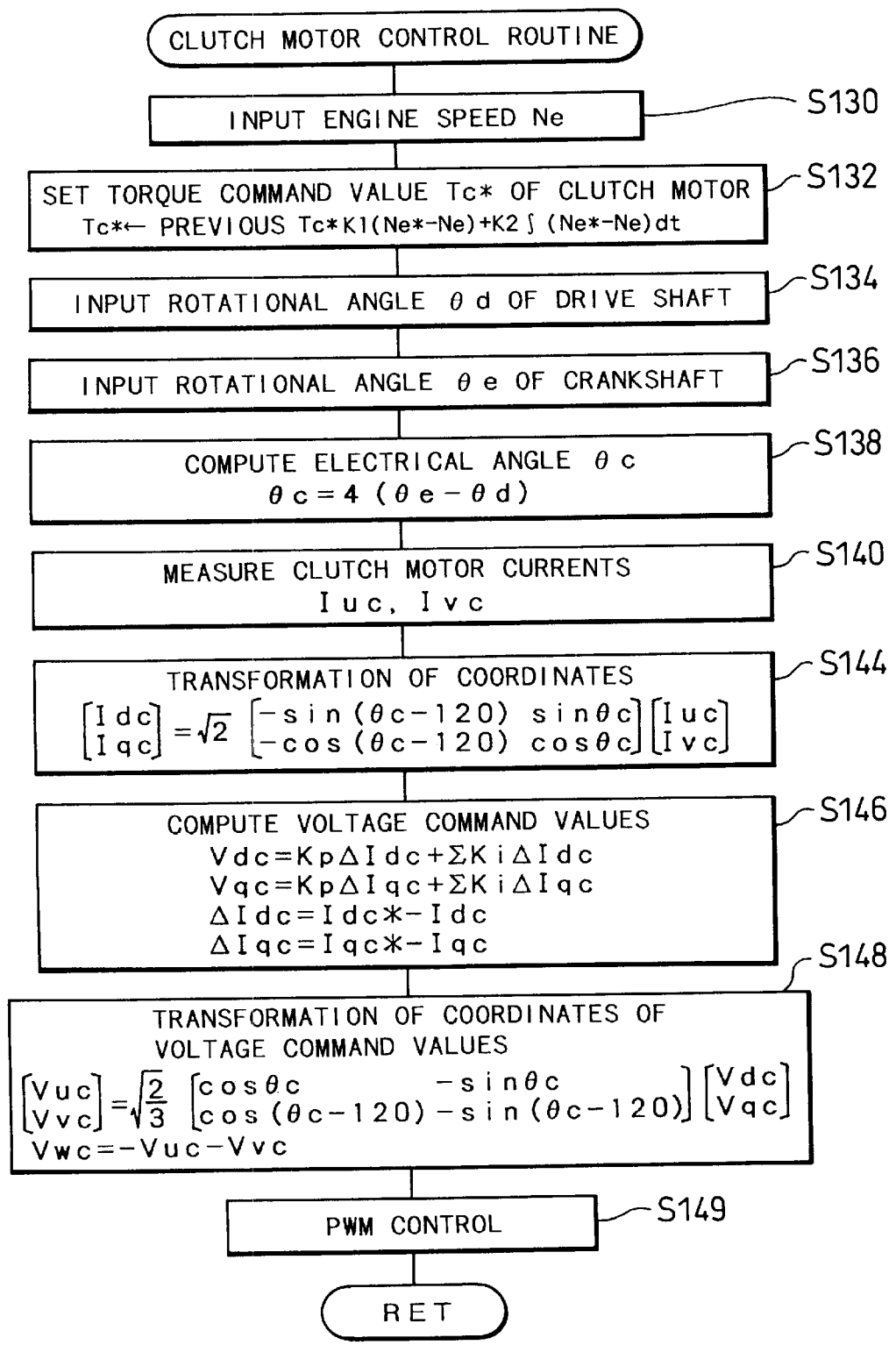
FIG. 8 is a flowchart showing a clutch motor control routine executed by the control CPU 90 of the controller 80 in the first embodiment.

The control procedure of the clutch motor 30 executed at step S126 in the flowchart of FIG. 4 follows a clutch motor control routine shown in the flowchart of FIG. 8. When the program enters the clutch motor control routine, the control CPU 90 of the controller 80 first reads the revolving speed Ne of the engine 50 at step S130. The revolving speed Ne of the engine 50 may be calculated from the rotational angle θe of the crankshaft 56 detected by the resolver 39 or directly measured by the speed sensor 76 mounted on the distributor 60. At subsequent step S132, the control CPU 90 sets a torque command value Tc* of the clutch motor 30 using the input revolving speed Ne of the engine 50 according to Equation (1) given below. The 'previous Tc*' in Equation (1) denotes the torque command value Tc* set in the previous cycle of this routine. The second term on the right side of Equation (1) is a proportional term to cancel the deviation of the actual revolving speed Ne from the target revolving speed Ne*, and the third term on the right side is an integral term to cancel the stationary deviation. K1 and K2 in Equation (1) denote proportional constants. Setting the torque command value Tc* of the clutch motor 30 in this manner enables the engine 50 to be stably driven at the target revolving speed Ne*. When the engine 50 is stationarily driven at the driving point defined by the target revolving speed Ne* and the target torque Te*, the torque command value Tc* of the clutch motor 30 is set equal to the target engine torque Te*. Since the torque Tc of the clutch motor 30 corresponds to the loading torque of the engine 50, the torque command value Tc* of the clutch motor 30 is set equal to the target engine torque Te* in the stationary state.

$$Tc^* \leftarrow previous Tc^* + K1(Ne^* - Ne) + K2 \int (Ne^* - Ne) dt \quad (1)$$

The control CPU 90 reads the rotational angle θd of the drive shaft 22 from the resolver 48 and the rotational angle θe of the crankshaft 56 of the engine 50 from the resolver 39 at steps S134 and S136, respectively. The control CPU 90 subsequently computes an electrical angle θc of the clutch motor 30 from the input rotational angles θe and θd at step S138. A synchronous motor having four pairs of poles is used as the clutch motor 30 in this embodiment, and the electrical angle θc is thus obtained by an equation of θc=4(θe−θd).

At step S140, the control CPU 90 reads the clutch motor currents Iuc and Ivc, which respectively flow through the U phase and V phase of the three-phase coils 36 in the clutch motor 30 and are measured by the ammeters 95 and 96. Although electric current naturally flows through all the three phases U, V, and W, measurement is required only for the electric currents passing through the two phases since the sum of the currents is equal to zero. At subsequent step S144, the control CPU 90 executes transformation of coordinates (three-phase to two-phase transformation) using the values of three-phase electric currents obtained at step S140. The transformation of coordinates maps the values of electric currents flowing through the three phases to the values of electric currents passing through d and q axes of the permanent magnet-type synchronous motor and is implemented by the operation of Equation (2) given below. The transformation of coordinates is carried out because the electric currents flowing through the d and q axes are essential quantities for the torque control in the permanent magnet-type synchronous motor. Alternatively, the torque control may be executed directly with the electric currents flowing through the three phases.

$$\begin{bmatrix} Idc \\ Iqc \end{bmatrix} = \sqrt{2} \begin{bmatrix} -\sin(\theta c - 120) & \sin \theta c \\ -\cos(\theta c - 120) & \cos \theta c \end{bmatrix} \begin{bmatrix} Iuc \\ Ivc \end{bmatrix} \quad (2)$$

After the transformation to the electric currents of two axes, the control CPU 90 computes deviations of electric currents Idc and Iqc actually flowing through the d and q axes from electric current command values Idc* and Iqc* of the respective axes, which are calculated from the torque command value Tc* of the clutch motor 30, and subsequently determines voltage command values Vdc and Vqc with respect to the d and q axes at step S146. In accordance with a concrete procedure, the control CPU 90 executes arithmetic operations of Equations (3) and Equations (4) given below. In Equations (3) and (4), Kp1, Kp2, Ki1, and Ki2 represent coefficients, which are adjusted to be suited to the characteristics of the motor applied. Each voltage command value Vdc (Vqc) includes a part in proportion to the deviation ΔI from the current command value I* (the first term in the right side of Equation (4)) and a summation of historical data of the deviations ΔI for 'i' times (the second term in the right side).

$$\Delta Idc = Idc^* - Idc \quad \Delta Iqc = Iqc^* - Iqc \quad (3)$$

$$Vdc = Kp1 \cdot \Delta Idc + \Sigma Ki1 \cdot \Delta Idc \quad Vqc = Kp2 \cdot \Delta Iqc + \Sigma Ki2 \cdot \Delta Iqc \quad (4)$$

The control CPU 90 then re-transforms the coordinates of the voltage command values thus obtained (two-phase to three-phase transformation) at step S148. This corresponds to an inverse of the transformation executed at step S144. The inverse transformation determines voltages Vuc, Vvc, and Vwc actually applied to the three-phase coils 34 as expressed by Equations (5) given below:

$$\begin{bmatrix} Vuc \\ Vvc \end{bmatrix} = \sqrt{\frac{2}{3}} \begin{bmatrix} \cos \theta c & -\sin \theta c \\ \cos(\theta c - 120) & -\sin(\theta c - 120) \end{bmatrix} \begin{bmatrix} Vdc \\ Vqc \end{bmatrix} \quad (5)$$

$$Vwc = -Vuc - Vvc$$

The actual voltage control is accomplished by on-off operation of the transistors Tr1 through Tr6 in the first driving circuit 91. At step S149, the on- and off-time of the transistors Tr1 through Tr6 in the first driving circuit 91 is PWM (pulse width modulation) controlled in order to attain the voltage command values Vuc, Vvc, and Vwc determined by Equations (5) above.

The torque command value Tc* of the clutch motor 30 is positive when a positive torque is applied to the drive shaft 22 in the direction of rotation of the crankshaft 56. By way of example, it is assumed that a positive value is set to the torque command value Tc*. When the revolving speed Ne of the engine 50 is higher than the revolving speed Nd of the drive shaft 22 on this assumption, that is, when the revolving speed difference Nc (=Ne−Nd) is positive, the clutch motor 30 is controlled to carry out the regenerative operation and produce a regenerative electric current according to the revolving speed difference Nc. When the revolving speed Ne of the engine 50 is lower than the revolving speed Nd of the drive shaft 22, that is, when the revolving speed difference Nc (=Ne−Nd) is negative, on the contrary, the clutch motor 30 is controlled to carry out the power operation and rotate relative to the crankshaft 56 in the direction of rotation of the drive shaft 22 at a revolving speed defined by the absolute value of the revolving speed difference Nc. For the positive torque command value Tc*, both the regenerative operation and the power operation of the clutch motor 30 implement the identical switching control. In accordance with a concrete procedure, the transistors Tr1 through Tr6 in the first driving circuit 91 are controlled to enable a positive torque to be applied to the drive shaft 22 by the combination of the magnetic field generated by the permanent magnets 35 set on the outer rotor 32 with the revolving magnetic field generated by the electric currents flowing through the three-phase coils 36 wound on the inner rotor 34 of the clutch motor 30. The identical switching control is executed for both the regenerative operation and the power operation of the clutch motor 30 as long as the sign of the torque command value Tc* is not changed. The clutch motor control routine of FIG. 8 is thus applicable to both the regenerative operation and the power operation. Under the condition of braking the drive shaft 22 or moving the vehicle in reverse, the torque command value Tc* has the negative sign. The clutch motor control routine of FIG. 8 is also applicable to the control procedure under such conditions, when the electrical angle θc of the clutch motor 30 obtained at step S138 is varied in the reverse direction.

Figure 9:
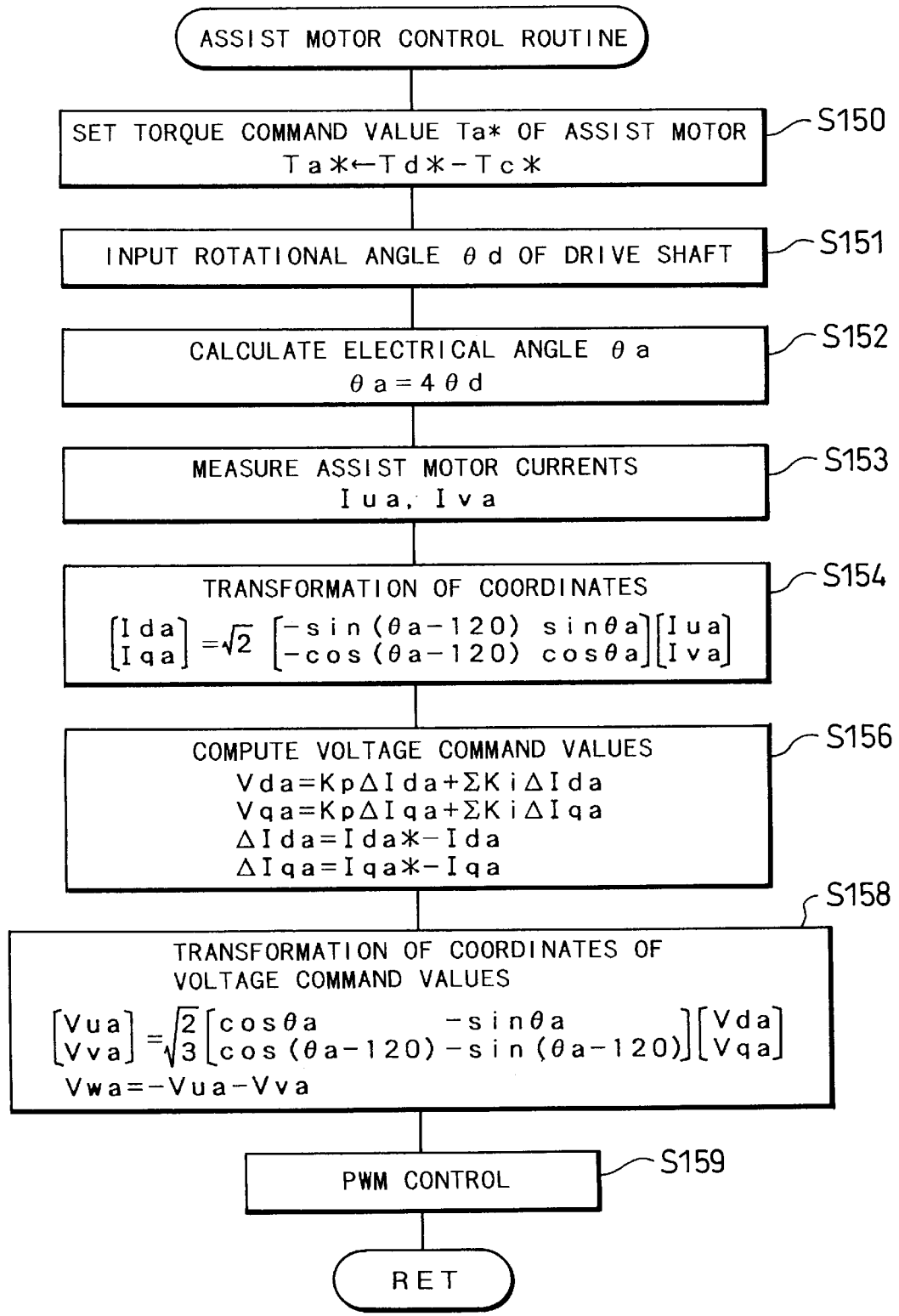
FIG. 9 is a flowchart showing an assist motor control routine executed by the control CPU 90 of the controller 80 in the second embodiment.

The control procedure of the assist motor 40 executed at step S128 in the flowchart of FIG. 4 follows an assist motor control routine shown in the flowchart of FIG. 9. When the program enters the assist motor control routine, the control CPU 90 of the controller 80 first sets a torque command value Ta* of the assist motor 40 at step S150 by subtracting the torque command value Tc* of the clutch motor 30 from the torque command value Td* to be output to the drive shaft 22. The control CPU 90 then reads the rotational angle θd of the drive shaft 22 from the resolver 48 at step S151, and calculates an electrical angle θa of the assist motor 40 from the measured rotational angle θd at step S152. In this embodiment, a synchronous motor having four pairs of poles is used as the assist motor 40, and the electrical angle θa is thus obtained by an equation of θa=4θd. The control CPU 90 subsequently receives data of assist motor currents Iua and Iva at step S153, which respectively flow through the U phase and V phase of the three-phase coils 44 in the assist motor 40 and are measured with the ammeters 97 and 98. The control CPU 90 executes transformation of coordinates for the electric currents of the three phases at step S154, computes voltage command values Vda and Vqa at step S156, and executes inverse transformation of coordinates for the voltage command values at step S158. At subsequent step S159, the control CPU 90 determines the on-and off-time of the transistors Tr11 through Tr16 in the second driving circuit 92 for PWM (pulse width modulation) control. The processing executed at steps S154 through S159 is similar to the processing executed at steps S144 through S149 in the clutch motor control routine shown in the flowchart of FIG. 8.

The torque command value Ta* of the assist motor 40 is obtained at step S150 by subtracting the torque command value Tc* of the clutch motor 30 from the torque command value Td* as discussed above, and thereby may be positive or negative. When a positive value is set to the torque command value Ta*, the assist motor 40 carries out the power operation. When a negative value is set to the torque command value Ta*, on the other hand, the assist motor 40 carries out the regenerative operation. Like the control of the clutch motor 30, the assist motor control routine shown in the flowchart of FIG. 9 is applicable to both the power operation and the regenerative operation of the assist motor 40. This is also true when the drive shaft 22 rotates in reverse of the rotation of the crankshaft 56. It is here assumed that the torque command value Ta* of the assist motor 40 is positive when a positive torque is applied to the drive shaft 22 in the direction of rotation of the crankshaft 56.

The control of the engine 50 (step S129 in the flowchart of FIG. 4) is executed in the following manner. In order to enable the engine 50 to be stationarily driven at the driving point defined by the target engine torque Te* and the target engine speed Ne* set at step S122 in the flowchart of FIG. 4, the control CPU 90 regulates the torque Te and the revolving speed Ne of the engine 50. In accordance with a concrete procedure, the control CPU 90 of the controller 80 controls the torque Tc of the clutch motor 30 as the loading torque of the engine 50, while transmitting the target engine torque Te* and the target engine speed Ne* to the EFIECU 70 through communication and enabling the EFIECU 70 to regulate the position of the throttle valve 66, fuel injection from the fuel injection valve 51, and ignition with the ignition plug 62 based on the target engine torque Te* and the target engine speed Ne*. This procedure enables the engine 50 to be driven at the driving point defined by the target torque Te* and the target revolving speed Ne*. Since the output torque Te and the revolving speed Ne of the engine 50 depend upon the loading torque, the control by the EFIECU 70 is not sufficient to cause the engine 50 to be driven at the driving point of the target torque Te* and the target revolving speed Ne*. It is accordingly required to control the torque Tc of the clutch motor 30 or the loading torque. The concrete procedure of controlling the torque Tc of the clutch motor 30 has been described above in the clutch motor control routine.

When the target value Pb* of the charge-discharge electric power is positive, part of the energy Pe output from the engine 50 is subjected to torque conversion by the clutch motor 30 and the assist motor 40 and output to the drive shaft 22 as the power expressed as the product of the revolving speed Nd and the torque command value Td*. The residue of the energy Pe is converted by the clutch motor 30 or the assist motor 40 to electric power corresponding to the target value Pb*, and the battery 94 is charged with this converted electric power. When the target value Pb* of the charge-discharge electric power is negative, on the contrary, the sum of the energy Pe output from the engine 50 and the electric power that is discharged from the battery 94 and corresponds to the target value Pb* is subjected to torque conversion by the clutch motor 30 and the assist motor 40 and output to the drive shaft 22 as the power expressed as the product of the revolving speed Nd and the torque command value Td*. When the target value Pb* of the charge-discharge electric power is equal to zero, the required energy Pn is identical with the energy Pd to be output to the drive shaft 22. In this case, all the energy Pe output from the engine 50 is subjected to torque conversion by the clutch motor 30 and the assist motor 40 and output to the drive shaft 22 as the power expressed as the product of the revolving speed Nd and the torque command value Td*.

As discussed previously in the prior art, however, the driving state and the efficiency of the engine 50 depend upon the working temperature of the engine 50, the properties of the fuel supplied, the atmospheric temperature, and the atmospheric pressure. The control with the above preset values may accordingly cause the energy Pe output from the engine 50 not to correspond to the required energy Pn. This results in a deviation of the charge-discharge electric power Pb of the battery 94 from its target value Pb*. The following describes the processing of steps S114 through S124 in the output control routine of FIG. 4 carried out to correct such a deviation.

When it is determined at step S106 that the revolving speed Nd of the drive shaft 22 and the accelerator pedal position AP are identical with the previous data obtained in the previous cycle of this routine, the program proceeds to step S114 to read the charge-discharge electric power Pb of the battery 94 detected by the wattmeter 99b. The control CPU 90 subtracts the target value Pb* from the input charge-discharge electric power Pb to calculate a deviation ΔPb at step S116, and compares the absolute value of the deviation ΔPb with a predetermined threshold value Pref at step S118. The deviation ΔPb represents a difference between the energy actually output from the engine 50 and the energy to be output from the engine 50. The threshold value Pref is set to define an allowable range of the deviation of the charge-discharge electric power Pb of the battery 94 from the target value Pb* and depends upon the response of the engine 50, the time interval of repetition of this routine, and the characteristics of the clutch motor 30 and the assist motor 40.

In case that the deviation ΔPb is within the allowable range, the program determines that the energy actually output from the engine 50 is substantially equal to the energy to be output from the engine 50 and proceeds to step S124 to write the current combination of the energy Pn and the energy Pe into the map used for the determination of the energy Pe at step S112. The program then carries out the control operations of the clutch motor 30, the assist motor

40, and the engine 50 with the current preset values at steps S126 through S129. Writing the combination of the energy Pn and the energy Pe under such conditions into the map allows the processing of step S112 to determine the energy Pe more precisely.

In case that the deviation ΔPb is out of the allowable range, on the other hand, the program proceeds to step S 120 to recalculate and reset the energy Pe to be output from the engine 50 based on the deviation ΔPb (Pe←Pe−Kb×ΔPb), where Kb denotes a proportional constant. When the deviation ΔPb is a positive value, that is, when the charge-discharge electric power Pb is out of the allowable range to be greater than the target value Pb*, this procedure decreases the energy Pe. When the deviation ΔPb is a negative value, that is, when the charge-discharge electric power Pb is out of the allowable range to be smaller than the target value Pb*, on the contrary, this procedure increases the energy Pe. After resetting the target revolving speed Ne* and the target torque Te* of the engine 50 based on the recalculated and reset energy Pe at step S122, the program carries out the control operations of the clutch motor 30, the assist motor 40, and the engine 50 with the newly set values at steps S126 through S129. This procedure keeps the deviation ΔPb of the charge-discharge electric power Pb from the target value Pb* within the allowable range and enables the battery 94 to be charged with or discharge the required electric power, while outputting the required power to the drive shaft 22.

External factors, such as the working temperature of the engine 50, the properties of the fuel supplied, the atmospheric temperature, and the atmospheric pressure, may cause the energy actually output from the engine 50 to be different from the energy to be output from the engine 50. In the power output apparatus 20 of the first embodiment, the energy Pe to be output from the engine 50 varies depending upon the deviation ΔPb of the charge-discharge electric power Pb of the battery 94 from the target value Pb*. This structure enables the battery 94 to be charged with or discharge a desired electric power, while outputting a desired power to the drive shaft 22. The process of setting the target value Pb* of the charge-discharge electric power Pb of the battery 94 equal to zero and making the threshold value Pref sufficiently small ensures that the power output from the engine 50 is subjected to torque conversion and output to the drive shaft 22 without causing charge or discharge of the battery 94. No unexpected charge or discharge of the battery 94 effectively improves the energy efficiency of the whole power output apparatus 20.

In the power output apparatus 20 of the first embodiment, upon condition that the deviation ΔPb of the charge-discharge electric power Pb from the target value Pb* is within the allowable range, the current combination of the required energy Pn and the output energy Pe is written into the map for the purpose of learning in the process of determining the energy Pe based on the required energy Pn. This structure enables the energy Pe to be determined more precisely corresponding to the required energy Pn, thereby preventing unexpected charge and discharge of the battery 94.

The power output apparatus 20 of the first embodiment sets the target revolving speed Ne* and the target torque Te* of the engine 50, in order to attain the highest possible efficiency when the energy Pe output from the engine 50 is constant. This structure further improves the energy efficiency of the whole power output apparatus 20.

Although the power output apparatus 20 of the first embodiment carries out the output control with charging and discharging the battery 94, the principle of the first embodiment is also applicable to the output control without charging and discharging the battery 94, which is realized by setting the target value Pb* equal to zero. As discussed above, in the power output apparatus 20 of the first embodiment, upon condition that the deviation ΔPb of the charge-discharge electric power Pb from the target value Pb* is within the allowable range, the current combination of the required energy Pn and the output energy Pe is written into the map for the purpose of learning in the process of determining the energy Pe based on the required energy Pn. The power output apparatus 20 may, however, not be provided with such a learning function.

In the power output apparatus 20 of the first embodiment, the required energy Pn is calculated as the sum of the energy to be output to the drive shaft 22 and the target value Pb* of the charge-discharge electric power of the battery 94. When the power output apparatus 20 has auxiliary machines, such as an air-conditioner and a pump, which are driven by the energy output from the engine 50 or the electric power discharged from the battery 94 as power source, the required energy Pn may be calculated as the sum of the energy to be output to the drive shaft 22, the target value Pb* of the charge-discharge electric power of the battery 94, and the energy required for driving the auxiliary machines.

Figure 10:
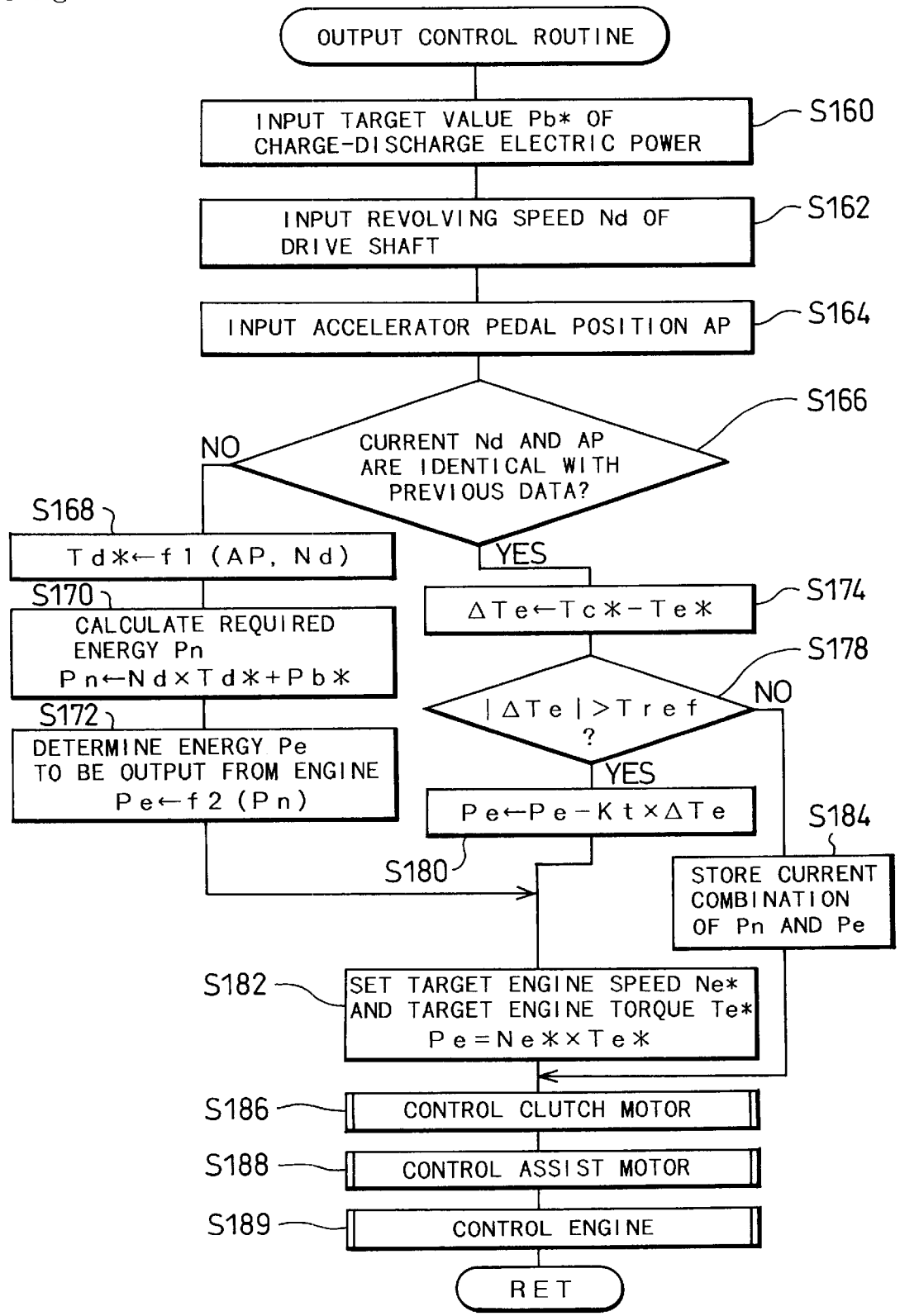
FIG. 10 is a flowchart showing another output control routine.

The power output apparatus 20 of the first embodiment corrects the energy actually output from the engine 50 to the energy to be output from the engine 50, based on the charge-discharge electric power Pb of the battery 94. Another possible structure corrects the deviation, based on the torque Te which the engine 50 actually outputs. FIG. 10 is a flowchart showing an output control routine of this structure. The processing of steps S160 through S172 and the processing of steps S182 through S189 in the output control routine of FIG. 10 are respectively identical with the processing of steps S100 through S112 and the processing of steps S122 through S129 in the output control routine of FIG. 4, and are thereby not specifically described here. The following describes the processing of steps S174 through S189 carried out when the revolving speed Nd of the drive shaft 22 and the accelerator pedal position AP are identical with the previous data input in the previous cycle of the output control routine of FIG. 10.

When it is determined at step S166 that the revolving speed Nd of the drive shaft 22 and the accelerator pedal position AP are identical with the previous data, the program proceeds to step S174 to subtract the target torque Te* of the engine 50 from the torque command value Tc* of the clutch motor 30 to calculate a difference ΔTe. As discussed previously, under the stationary driving conditions, the torque command value Tc* of the clutch motor 30 is equivalent to the loading torque Te of the engine 50. The difference ΔTe accordingly implies the deviation of the torque Te actually output from the engine 50 from the target torque Te*. The control CPU 90 then compares the absolute value of the difference ΔTe with a predetermined threshold value Tref at step S178. The threshold value Tref is set to define an allowable range of the deviation of the torque Te actually output from the engine 50 from the target torque Te*.

In case that the difference ΔTe is within the allowable range, the program determines that the energy actually output from the engine 50 is substantially equal to the energy to be output from the engine 50 and proceeds to step S184 to write the current combination of the energy Pn and the energy Pe into the map used for the determination of the energy Pe at step S172. The program then carries out the control operations of the clutch motor 30, the assist motor 40, and the engine 50 with the current preset values at steps S186 through S189.

In case that the difference ΔTe is out of the allowable range, on the other hand, the program proceeds to step S180 to recalculate and reset the energy Pe to be output from the engine 50 based on the difference ΔTe (Pe←Pe−Kt×ΔTe), where Kt denotes a proportional constant. When the difference ΔTe is a positive value, that is, when the torque Te actually output from the engine 50 is greater than the target torque Te*, this procedure decreases the energy Pe. When the difference ΔTe is a negative value, that is, when the torque Te actually output from the engine 50 is smaller than the target torque Te*, on the contrary, this procedure increases the energy Pe. After resetting the target revolving speed Ne* and the target torque Te* of the engine 50 based on the recalculated and reset energy Pe at step S182, the program carries out the control operations of the clutch motor 30, the assist motor 40, and the engine 50 with the newly set values at steps S186 through S189. The above processing enables the energy actually output from the engine 50 to be substantially equal to the energy to be output from the engine 50.

External factors, such as the working temperature of the engine 50, the properties of the fuel supplied, the atmospheric temperature, and the atmospheric pressure, may cause the energy actually output from the engine 50 to be different from the energy to be output from the engine 50. The output control routine of FIG. 10 varies the energy Pe to be output from the engine 50 depending upon the difference ΔTe between the torque Te actually output from the engine 50 and the target torque Te*. This structure enables the battery 94 to be charged with or discharge a desired electric power, while outputting a desired power to the drive shaft 22. The process of setting the target value Pb* of the charge-discharge electric power Pb of the battery 94 equal to zero and making the threshold value Tref sufficiently small ensures that the power output from the engine 50 is subjected to torque conversion and output to the drive shaft 22 without causing charge or discharge of the battery 94. No unexpected charge or discharge of the battery 94 effectively improves the energy efficiency of the whole power output apparatus 20.

Figure 11:
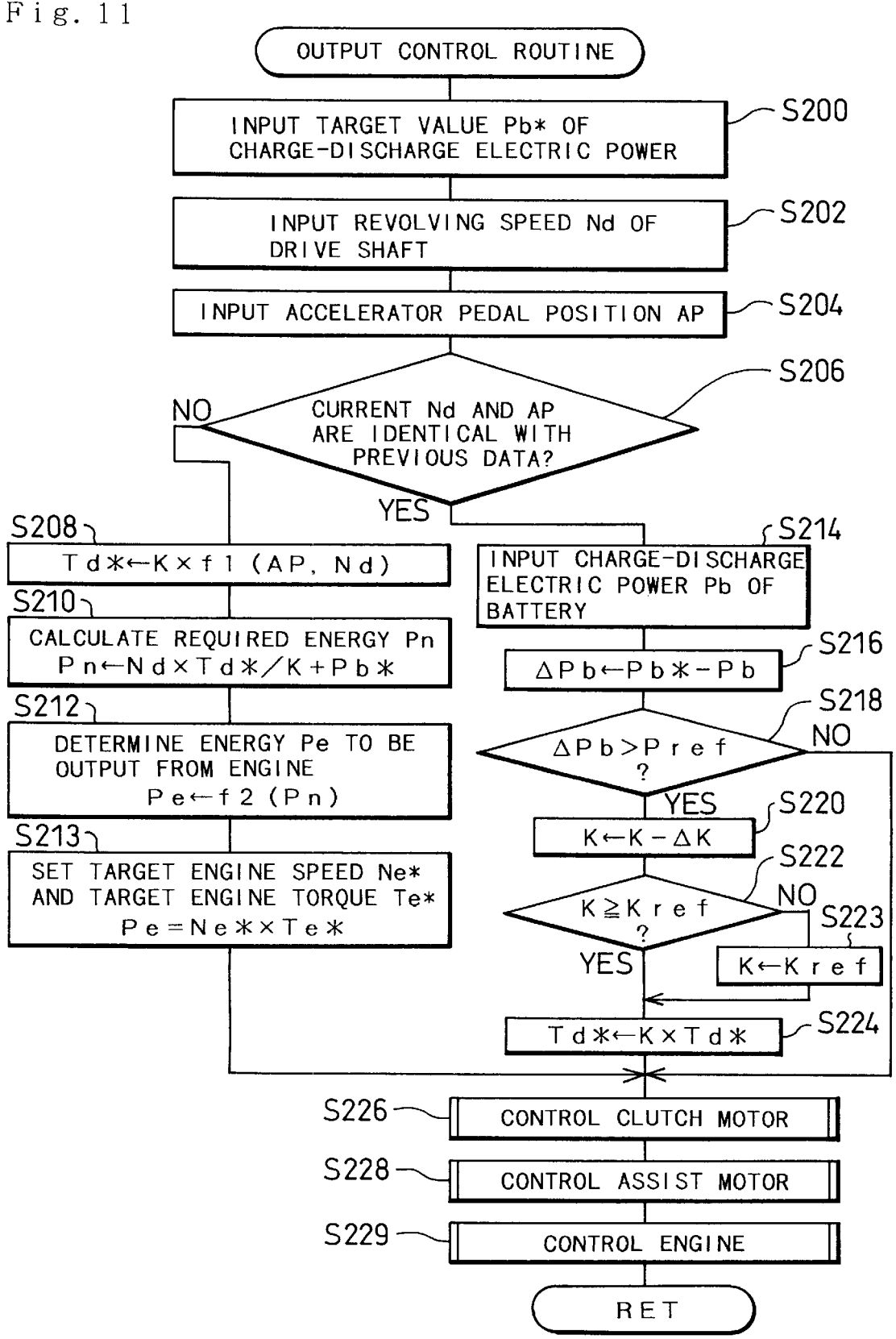
FIG. 11 is a flowchart showing still another output control routine.
Figure 12:
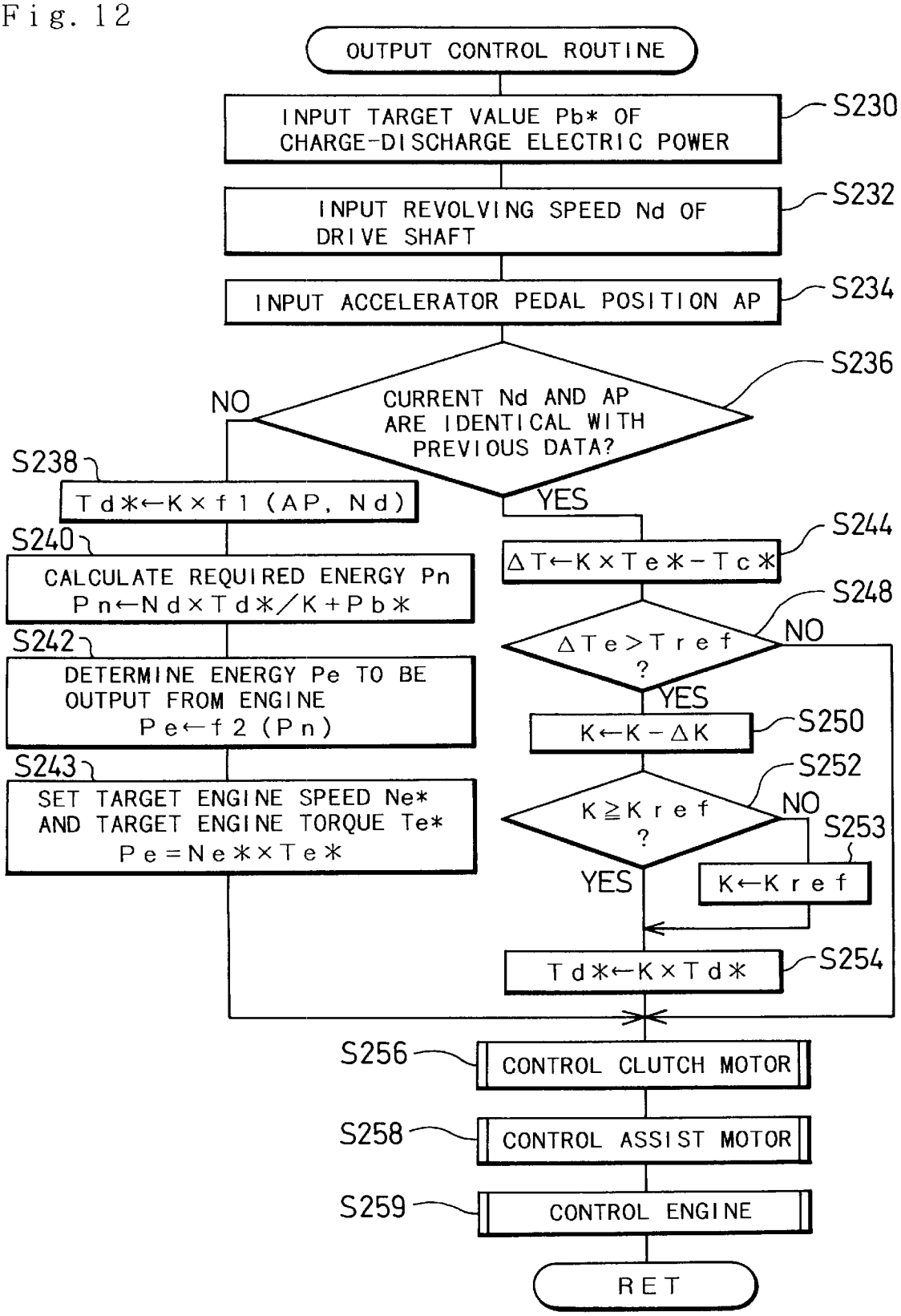
FIG. 12 is a flowchart showing another available output control routine.

When the energy actually output from the engine 50 is different from the energy to be output from the engine 50, both the output control routine of FIG. 4 in the power output apparatus 20 of the first embodiment and the output control routine of FIG. 10 in the modified structure correct the energy actually output from the engine 50 to the energy to be output from the engine 50. In some cases, for example, in the case of misfire of one cylinder in the engine 50 or in the case of driving at heights, however, the engine 50 may not output sufficient energy. Namely the procedure of correcting the energy actually output from the engine 50 to the energy to be output from the engine 50 is not applicable. Another possible structure corrects the torque command value Td*, that is, the torque to be output to the drive shaft 22, and the target torque Te* of the engine 50 to the energy actually output from the engine 50. FIGS. 11 and 12 are flowcharts showing output control routines of such modified applications. The flowchart of FIG. 11 shows an output control routine for correcting the torque command value Td* to the energy actually output from the engine 50, based on the charge-discharge electric power Pb of the battery 94. The flowchart of FIG. 12 shows an output control routine for correcting the torque command value Td* and the target torque Te* of the engine 50 to the energy actually output from the engine 50, based on the torque Te actually output from the engine 50. The output control routine of FIG. 11 is discussed first.

The processing of steps S200 through S206 in the output control routine of FIG. 11 is identical with the processing of steps S100 through S106 in the output control routine of FIG. 4, and is thereby not specifically described here. When it is determined at step S206 that either of the revolving speed Nd of the drive shaft 22 and the accelerator pedal position AP is different from the previous data input in the previous cycle of this routine, the control CPU 90 sets the torque command value Td* or the torque to be output to the drive shaft 22, based on the input accelerator pedal position AP, the input revolving speed Nd of the drive shaft 22, and a predetermined correction coefficient K at step S208. The torque command value Td* is obtained at step S208 by multiplying the value read from the map of FIG. 5 (that is, the torque command value Td* set at step S108 in the output control routine of FIG. 4) by the correction coefficient K. The correction coefficient K is initialized to one by an initialization routine (not shown) at the time of activating the power output apparatus 20, and varies in the range of the initial value '1' and a predetermined threshold value Kref discussed later.

The control CPU 90 then calculates required energy Pn according to an equation of Pn=Nd×Td*/K+Pb* at step S210, and determines energy Pe to be output from the engine 50 based on the required energy Pn at step S212. In the equation of calculating the required energy Pn, the first term on the right side is divided by the correction coefficient K, so that the required energy Pn calculated at step S210 is identical with the required energy Pn calculated at step S110 in the output control routine of FIG. 4. With respect to the given accelerator pedal position AP, the given revolving speed Nd of the drive shaft 22, and the given target value Pb* of the charge-discharge electric power of the battery 94, the required energy Pn and the energy Pe to be output from the engine 50 obtained in the output control routine of FIG. 11 are identical with those obtained in the output control routine of FIG. 4, irrespective of the value of the correction coefficient K. After determining the energy Pe to be output from the engine 50, the program sets the target revolving speed Ne* and the target torque Te* of the engine 50 based on the energy Pe at step S213 and carries out the control operations of the clutch motor 30, the assist motor 40, and the engine 50 with these preset values at steps S226 through S229. Multiplication by the correction coefficient K makes the torque command value Td* smaller than the value based on the accelerator pedal position AP and the revolving speed Nd of the drive shaft 22. Regardless of the value of the correction coefficient K, the target revolving speed Ne* and the target torque Te* of the engine 50 are set to the values based on the torque command value Td* and the target value Pb* of the charge-discharge electric power of the battery 94 in the case of the correction coefficient K equal to one. When the correction coefficient K is equal to one, this processing is identical with the processing in the output control routine of FIG. 4. The control operations of the clutch motor 30, the assist motor 40, and the engine 50 carried out at steps S226 through S229 in the output control routine of FIG. 11 are identical with those carried out at steps S126 through S129 in the output control routine of FIG. 4.

When it is determined at step S206 that the revolving speed Nd of the drive shaft 22 and the accelerator pedal position AP are identical with the previous data input in the previous cycle of this routine, the control CPU 90 reads the charge-discharge electric power Pb of the battery 94 detected by the wattmeter 99b at step S214, subtracts the input charge-discharge electric power Pb from its target value Pb* to calculate a deviation ΔPb at step S216, and compares the deviation ΔPb with a predetermined threshold value Pref at step S218. The threshold value Pref used here is identical with that used in the output control routine of FIG. 4. In case that the deviation ΔPb is not greater than the threshold value Pref, the program carries out the control operations of the clutch motor 30, the assist motor 40, and the engine 50 with the current preset values at steps S226 through S229.

In case that the deviation ΔPb is greater than the threshold value Pref, on the other hand, the control CPU 90 subtracts a predetermined value ΔK from the correction coefficient K to set a new correction coefficient K at step S220, and limits the newly set correction coefficient K to be not less than the threshold value Kref at steps S222 and S223. The predetermined value ΔK is a variation that gradually varies the correction coefficient K. In this embodiment, for example, the predetermined value ΔK is set to vary the correction coefficient K by 0.01 per second. The restriction of the correction coefficient K to be not less than the threshold value Kref prevents the correction coefficient K from decreasing to an extremely small value. In this embodiment, the threshold value Kref is set equal to 0.7. After multiplying the torque command value Td* by the correction coefficient K to set a new torque command value Td* at step S224, the program carries out the control operations of the clutch motor 30, the assist motor 40, and the engine 50 with the preset values at steps S226 through S229.

Even when the energy actually output from the engine 50 is different from the energy to be output from the engine 50, for example, due to the misfire of one cylinder in the engine 50, the output control routine of FIG. 11 varies the torque command value Td* or the torque to be output to the drive shaft 22 based on the deviation ΔPb of the charge-discharge electric power Pb of the battery 94 from its target value Pb*. This structure enables the power expressed as the product of the varied torque command value Td* and the revolving speed Nd to be output to the drive shaft 22, while charging the battery 94 with a desired electric power or discharging the battery 94 to supplement a desired electric power. The process of setting the target value Pb* of the charge-discharge electric power Pb of the battery 94 equal to zero and making the threshold value Pref sufficiently small ensures that the power output from the engine 50 is subjected to torque conversion and output to the drive shaft 22 without causing charge or discharge of the battery 94. No excessive discharge of the battery 94 effectively prevents untimely death of the battery 94.

Although the output control routine of FIG. 11 refers to the output control with charging and discharging the battery 94, the same principle is applicable to the output control without charging and discharging the battery 94, which is realized by setting the target value Pb* equal to zero. In the output control routine of FIG. 11, the required energy Pn is calculated as the sum of the energy to be output to the drive shaft 22 and the target value Pb* of the charge-discharge electric power of the battery 94. When the power output apparatus has auxiliary machines, such as an air-conditioner and a pump, which are driven by the energy output from the engine 50 or the electric power discharged from the battery 94 as power source, the required energy Pn may be calculated as the sum of the energy to be output to the drive shaft 22, the target value Pb* of the charge-discharge electric power of the battery 94, and the energy required for driving the auxiliary machines.

The output control routine of FIG. 12 is another example of modified application as mentioned above. The processing of steps S230 through S243 and the processing of steps S250 through S259 in the output control routine of FIG. 12 are respectively identical with the processing of steps S200 through S213 and the processing of steps S220 through S229 in the output control routine of FIG. 11, and are thereby not specifically described here. The following describes the processing of steps S244 through S248 carried out when the revolving speed Nd of the drive shaft 22 and the accelerator pedal position AP are identical with the previous data input in the previous cycle of the output control routine of FIG. 12.

When it is determined at step S236 that the revolving speed Nd of the drive shaft 22 and the accelerator pedal position AP are identical with the previous data, the program proceeds to step S244 to calculate a difference ΔTe according to an equation of ΔTe=K×Te*−Tc*. The target engine torque Te* is multiplied by the correction coefficient K, in order to enable the target torque Te* to approach the torque Te actually output from the engine 50. As discussed previously, the torque command value Tc* of the clutch motor 30 corresponds to the torque Te actually output from the engine 50, and the difference ΔTe implies the deviation of the torque Te actually output from the engine 50 from the target torque Te*.

In case that the difference ΔTe is not greater than the threshold value Tref at step S248, the program carries out the control operations of the clutch motor 30, the assist motor 40, and the engine 50 with the current preset values at steps S256 through S259. In case that the difference ΔTe is greater than the threshold value Tref at step S248, on the other hand, the control CPU 90 subtracts the predetermined value ΔK from the correction coefficient K to set a new correction coefficient K at step S250, limits the newly set correction coefficient K to be not less than the threshold value Kref at steps S252 and S253, and multiplies the torque command value Td* by the correction coefficient K to set a new torque command value Td* at step S254. The program then carries out the control operations of the clutch motor 30, the assist motor 40, and the engine 50 with the preset values at steps S256 through S259.

Even when the energy actually output from the engine 50 is different from the energy to be output from the engine 50, for example, due to the misfire of one cylinder in the engine 50, the output control routine of FIG. 12 varies the torque command value Td* by multiplying it by the gradually decreasing correction coefficient K. The output control also multiplies the target torque Te* used for the determination by the correction coefficient K. This structure enables the power expressed as the product of the varied torque command value Td* and the revolving speed Nd to be output to the drive shaft 22, while charging the battery 94 with a desired electric power or discharging the battery 94 to supplement a desired electric power. The process of setting the target value Pb* of the charge-discharge electric power Pb of the battery 94 equal to zero and making the threshold value Tref sufficiently small ensures that the power output from the engine 50 is subjected to torque conversion and output to the drive shaft 22 without causing charge or discharge of the battery 94. No excessive discharge of the battery 94 effectively prevents untimely death of the battery 94.

The output control routine of FIG. 4 may be combined with any one of the output control routines of FIGS. 10 through 12. By way of example, in case that the battery 94 is still either in the charging state or in the discharging state even after the output control routine of FIG. 4 has been repeatedly executed for a certain time period, the output control may be switched to any one of the output control routines of FIGS. 10 through 12. Such combination enables the power output from the engine 50 to be subjected to torque conversion and output to the drive shaft 22 without causing charge or discharge of the battery 94, while the target revolving speed Nd* and the target torque Td* of the drive shaft 22 are realized to the possible extent. This results in improving the energy efficiency of the whole power output apparatus. No excessive discharge of the battery 94 effectively prevents untimely death of the battery 94.

Figure 13:
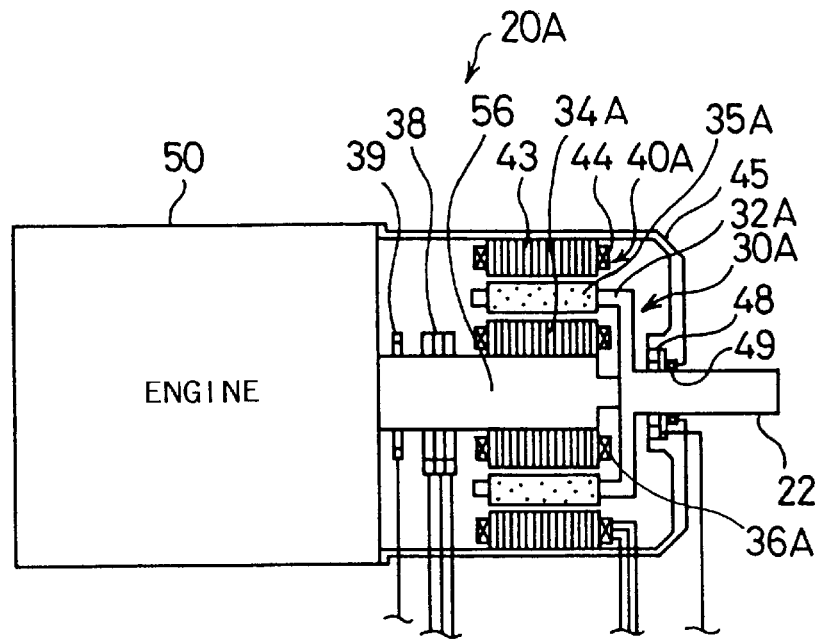
FIG. 13 schematically illustrates structure of a power output apparatus 20A as a modified example of the first embodiment.

In the power output apparatus 20 of the first embodiment and its modified applications, the clutch motor 30 and the assist motor 40 are separately attached to the different positions of the drive shaft 22. Like another power output apparatus 20A illustrated in FIG. 13 as a modified example, however, the clutch motor and the assist motor may be joined integrally with each other. A clutch motor 30A of the power output apparatus 20A includes an inner rotor 34A connecting with the crankshaft 56 and an outer rotor 32A linked with the drive shaft 22. Three-phase coils 36A are attached to the inner rotor 34A, and permanent magnets 35A are set on the outer rotor 32A in such a manner that the outer surface and the inner surface thereof have different magnetic poles. A non-magnetic member (not shown) is interposed between the magnetic pole on the outer surface and the magnetic pole on the inner surface in the permanent magnets 35A. An assist motor 40A includes the outer rotor 32A of the clutch motor 30A and a stator 43 with three-phase coils 44 mounted thereon. In this structure, the outer rotor 32A of the clutch motor 30A also works as the rotor of the assist motor 40A. Since the three-phase coils 36A are mounted on the inner rotor 34A linked with the crankshaft 56, the slip ring 38 for supplying electric power to the three-phase coils 36A of the clutch motor 30A is attached to the crankshaft 56.

In the power output apparatus 20A of this modified structure, the voltage applied to the three-phase coils 36A on the inner rotor 34A is controlled against the inner-surface magnetic pole of the permanent magnets 35A set on the outer rotor 32A. This enables the clutch motor 30A to work in the same manner as the clutch motor 30 of the power output apparatus 20 of the first embodiment having the clutch motor 30 and the assist motor 40 separately attached to the drive shaft 22. The voltage applied to the three-phase coils 44 on the stator 43 is controlled against the outer-surface magnetic pole of the permanent magnets 35A set on the outer rotor 32A. This enables the assist motor 40A to work in the same manner as the assist motor 40 of the power output apparatus 20. The power output apparatus 20A of the modified structure accordingly works in the same manner as the power output apparatus 20 of the first embodiment.

The outer rotor 32A functions concurrently as one of the rotors in the clutch motor 30A and as the rotor of the assist motor 40A, thereby effectively reducing the size and weight of the power output apparatus 20A.

Figure 14:
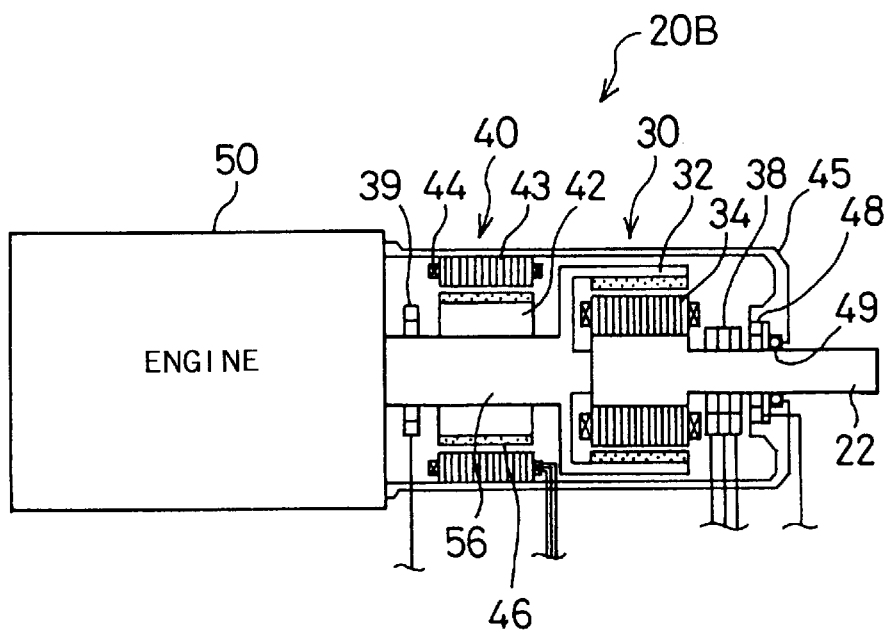
FIG. 14 schematically illustrates structure of another power output apparatus 20B as another modified example of the first embodiment.

In the power output apparatus 20 of the first embodiment, the assist motor 40 is attached to the drive shaft 22. Like still another power output apparatus 20B shown in FIG. 14 as another modified example, the assist motor 40 may be attached to the crankshaft 56 between the engine 50 and the clutch motor 30. The power output apparatus 20B of this modified structure works in the following manner. By way of example, it is assumed that the engine 50 is driven at the driving point P1 of the revolving speed Ne=N1 and the torque Te=T1 on the constant output energy curve shown in FIG. 3 and that the drive shaft 22 is rotated at the revolving speed Nd=N2. When the assist motor 40 attached to the crankshaft 56 outputs the torque Ta (=T2−T1) to the crankshaft 56, energy expressed as the sum of the areas G2 and G3 in FIG. 3 is supplied to the crankshaft 56, which accordingly has the torque T2 (=T1+Ta). When the torque Tc of the clutch motor 30 is controlled to the value T2, the clutch motor 30 outputs the torque Tc (=T2=T1+Ta) to the drive shaft 22 while regenerating electric power corresponding to the revolving speed difference Nc between the revolving speed Ne of the engine 50 and the revolving speed Nd of the drive shaft 22 (that is, energy expressed as the sum of the areas G1 and G3). The torque Ta of the assist motor 40 is set to be substantially equivalent to the electric power regenerated by the clutch motor 30, and this regenerative electric power is supplied to the second driving circuit 92 via the power lines L1 and L2. The assist motor 40 is then driven by this regenerative electric power.

In another example, it is assumed that the engine 50 is driven at the driving point P2 of the revolving speed Ne=N2 and the torque Te=T2 in FIG. 3 and that the drive shaft 22 is rotated at the revolving speed Nd=N1. When the torque Ta of the assist motor 40 is controlled to the value (T2−T1), the assist motor 40 carries out the regenerative operation and regenerates energy (electric power) expressed as the area G2 in FIG. 3 from the crankshaft 56. In the clutch motor 30, the inner rotor 34 rotates relative to the outer rotor 32 at the revolving speed difference Nc (=N1−N2) in the direction of rotation of the drive shaft 22. The clutch motor 30 accordingly functions as a normal motor and supplies energy expressed as the area G1 corresponding to the revolving speed difference Nc to the drive shaft 22 as energy of rotation. The torque Ta of the assist motor 40 is set, in order to enable the electric power regenerated by the assist motor 40 to be substantially equivalent to the electric power consumed by the clutch motor 30. This structure enables the clutch motor 30 to be driven by the electric power regenerated by the assist motor 40.

Like the power output apparatus 20 of the first embodiment, the power output apparatus 20B of the modified structure controls the torque Ta of the assist motor 40 and the torque Tc of the clutch motor 30 to satisfy Equations (6) and (7) given below. The energy output from the engine 50 is then freely subjected to torque conversion and given to the drive shaft 22. In the same manner as the power output apparatus 20 of the first embodiment, the power output apparatus 20B carries out other applicable processes, in addition to the basic process that enables all the power output from the engine 50 to be subjected to torque conversion and output to the drive shaft 22. One applicable process makes the power output from the engine 50 (that is, the product of the torque Te and the revolving speed Ne) greater than the power required to the drive shaft 22 (that is, the product of the torque Td and the revolving speed Nd) and charges the battery 94 with the surplus electric power. Another applicable process makes the power output from the engine 50 smaller than the power required to the drive shaft 22 and discharges the battery 94 to supplement the shortage of electric power.

$$Te \times Ne = Tc \times Nd \qquad (6)$$

$$Te + Ta = Tc = Td \qquad (7)$$

Figure 15:
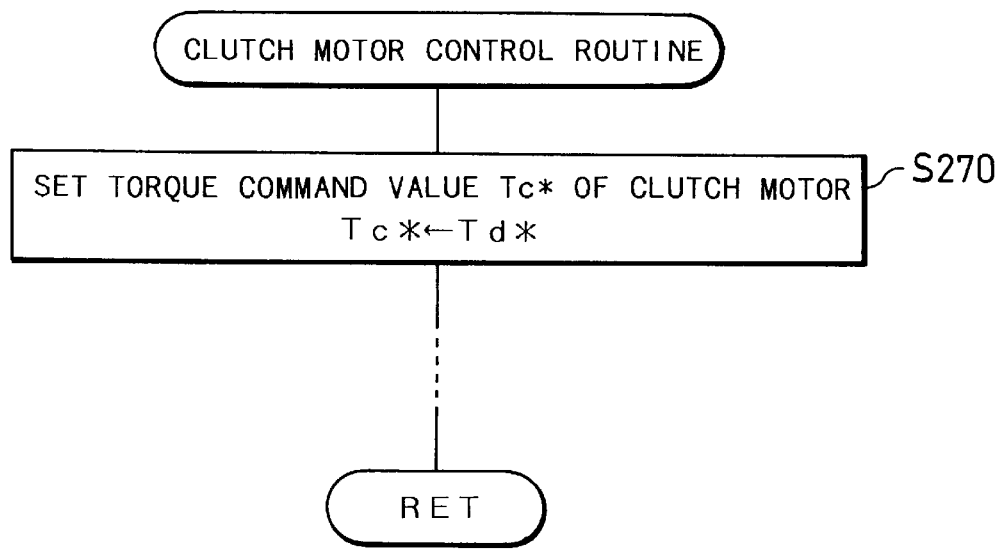
FIG. 15 is a flowchart showing part of a clutch motor control routine carried out by the power output apparatus 20B given as the modified example of the first embodiment.
Figure 16:
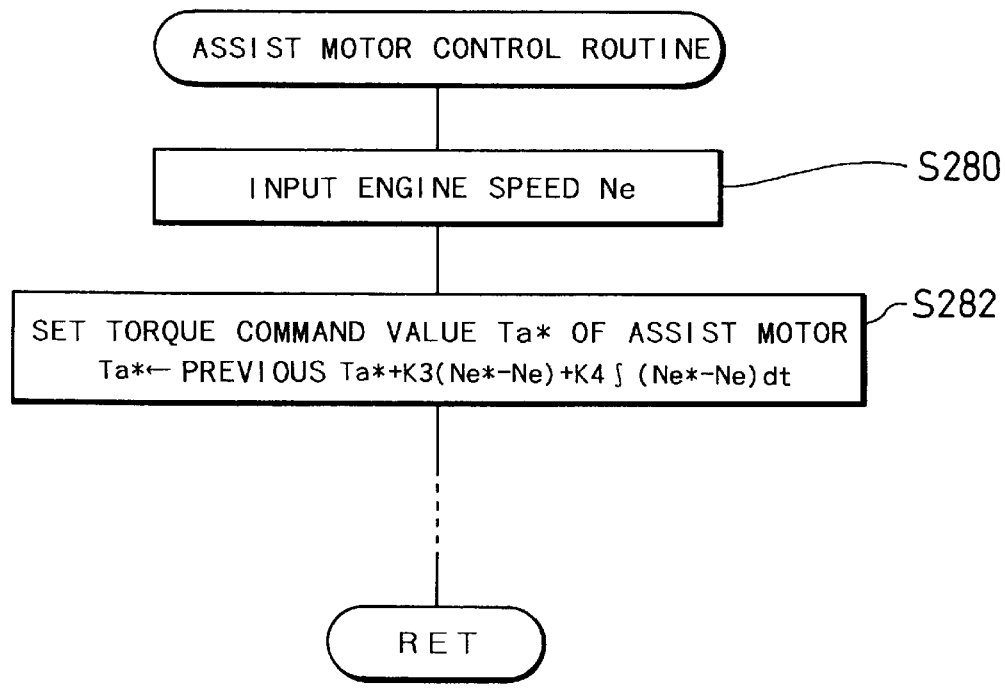
FIG. 16 is a flowchart showing part of an assist motor control routine carried out by the power output apparatus 20B given as the modified example of the first embodiment.

The power output apparatus 20B of the modified structure can thus execute the output control routines of FIG. 4 and FIGS. 10 through 12 and exert the similar effects to those of the power output apparatus 20 of the first embodiment or its modified applications. Since the assist motor 40 is attached to the crankshaft 56 in the power output apparatus 20B, the processes of steps S130 and S132 in the clutch motor control routine of FIG. 8 are replaced by the process of step S270 in the clutch motor control routine of FIG. 15. The processing of step S270 sets the torque command value Td* to the torque command value Tc* of the clutch motor 30. The process of step S150 in the assist motor control routine of FIG. 9 is replaced by the processes of steps S280 and S282 in the assist motor control routine of FIG. 16. The processing of steps S280 and S282 reads the revolving speed Ne of the engine 50 and calculates the torque command value Ta* of the assist motor 40 from the input revolving speed Ne according to Equation (8) given below:

$$Ta^* \leftarrow previousTa^* + K3(Ne^* - Ne) + K4 \int (Ne^* - Ne) dt \qquad (8)$$

Figure 17:
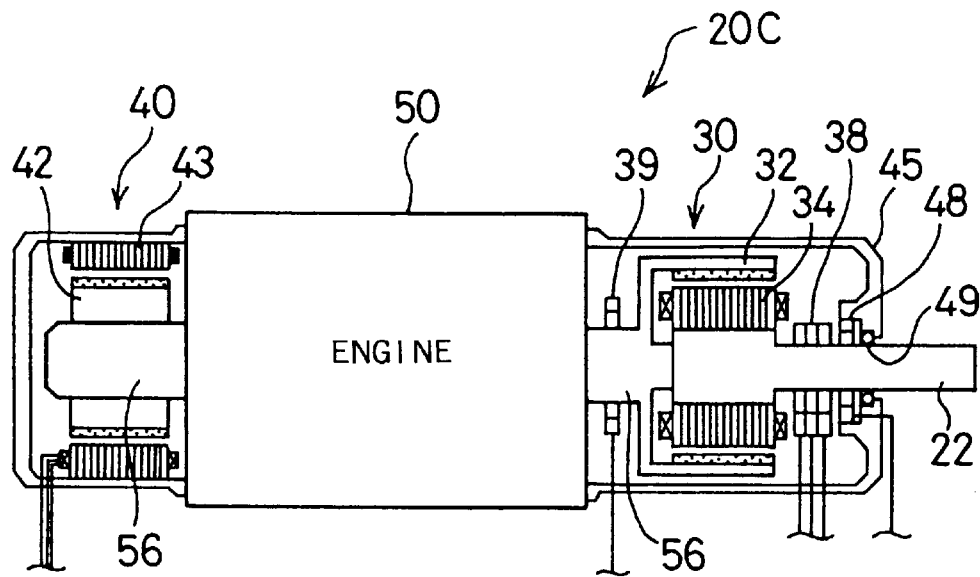
FIG. 17 schematically illustrates structure of another power output apparatus 20C as another modified example of the first embodiment.

In the power output apparatus 20B, the assist motor 40 is attached to the crankshaft 56 between the engine 50 and the clutch motor 30. Like another power output apparatus 20C shown in FIG. 17, however, the engine 50 may be interposed between the assist motor 40 and the clutch motor 30.

Figure 18:
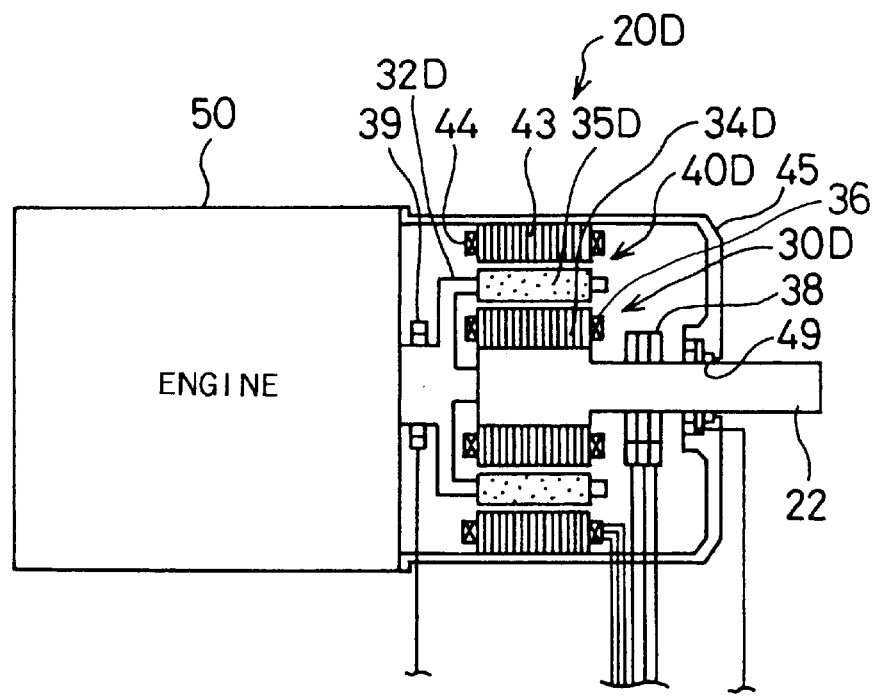
FIG. 18 schematically illustrates structure of still another power output apparatus 20D as another modified example of the first embodiment.

The power output apparatus 20B may further be modified to include the clutch motor and the assist motor that are joined integrally with each other, like another power output apparatus 20D shown in FIG. 18. In the power output apparatus 20D of this modified structure, an outer rotor 32D of a clutch motor 30D also works as a rotor of an assist motor 40D. The voltage applied to the three-phase coils 36 on an inner rotor 34D is controlled against the inner-surface magnetic pole of permanent magnets 35D set on the outer rotor 32D. This enables the clutch motor 30D to work in the same manner as the clutch motor 30 of the power output apparatus 20B. The voltage applied to the three-phase coils 44 on the stator 43 is controlled against the outer-surface magnetic pole of the permanent magnets 35D set on the outer rotor 32D. This enables the assist motor 40D to work in the same manner as the assist motor 40 of the power output apparatus 20B. The power output apparatus 20D of the modified structure accordingly works in the same manner as the power output apparatus 20B. The power output apparatus 20D has the advantage of reduced size and weight, in addition to the same effects as those of the power output apparatus 20B or the power output apparatus 20 of the first embodiment.

Figure 19:
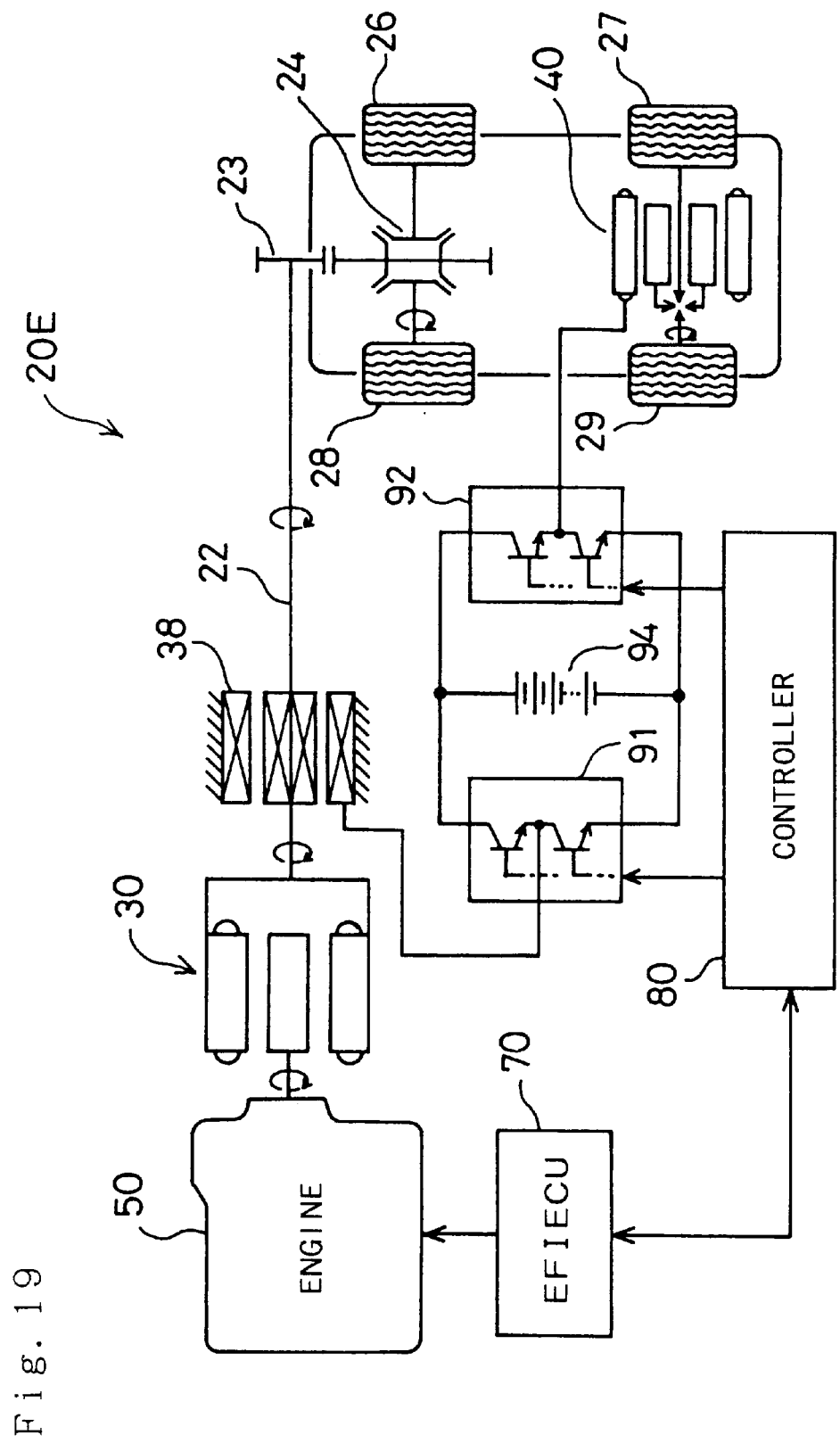
FIG. 19 schematically illustrates structure of a four-wheel-drive vehicle with a power output apparatus 20E, which is equivalent to the power output apparatus 20 of the first embodiment.

The power output apparatus 20 of the first embodiment and its modified examples discussed above are applied to the FR-type or FF-type two-wheel-drive vehicle. In another modified example, however, a power output apparatus 20E may be applied to a four-wheel-drive vehicle as shown in FIG. 19. In this structure, the assist motor 40, which is mechanically connected to the drive shaft 22 in the first embodiment, is separated from the drive shaft 22 and independently arranged in the rear-wheel portion of the vehicle, so as to drive the rear driving wheels 27 and 29. The drive shaft 22 is, on the other hand, connected to the differential gear 24 via a gear 23, in order to drive the front driving wheels 26 and 28. The output control of the first embodiment is applicable to this structure with some modification.

In the power output apparatus 20 of the first embodiment, the slip ring 38 consisting of the rotary rings 38a and the brushes 38b is used as the transmission means of the electric power to the clutch motor 30. The slip ring 38 may, however, be replaced by a rotary ring-mercury contact, a semiconductor coupling of magnetic energy, a rotary transformer, or the like.

Figure 20:
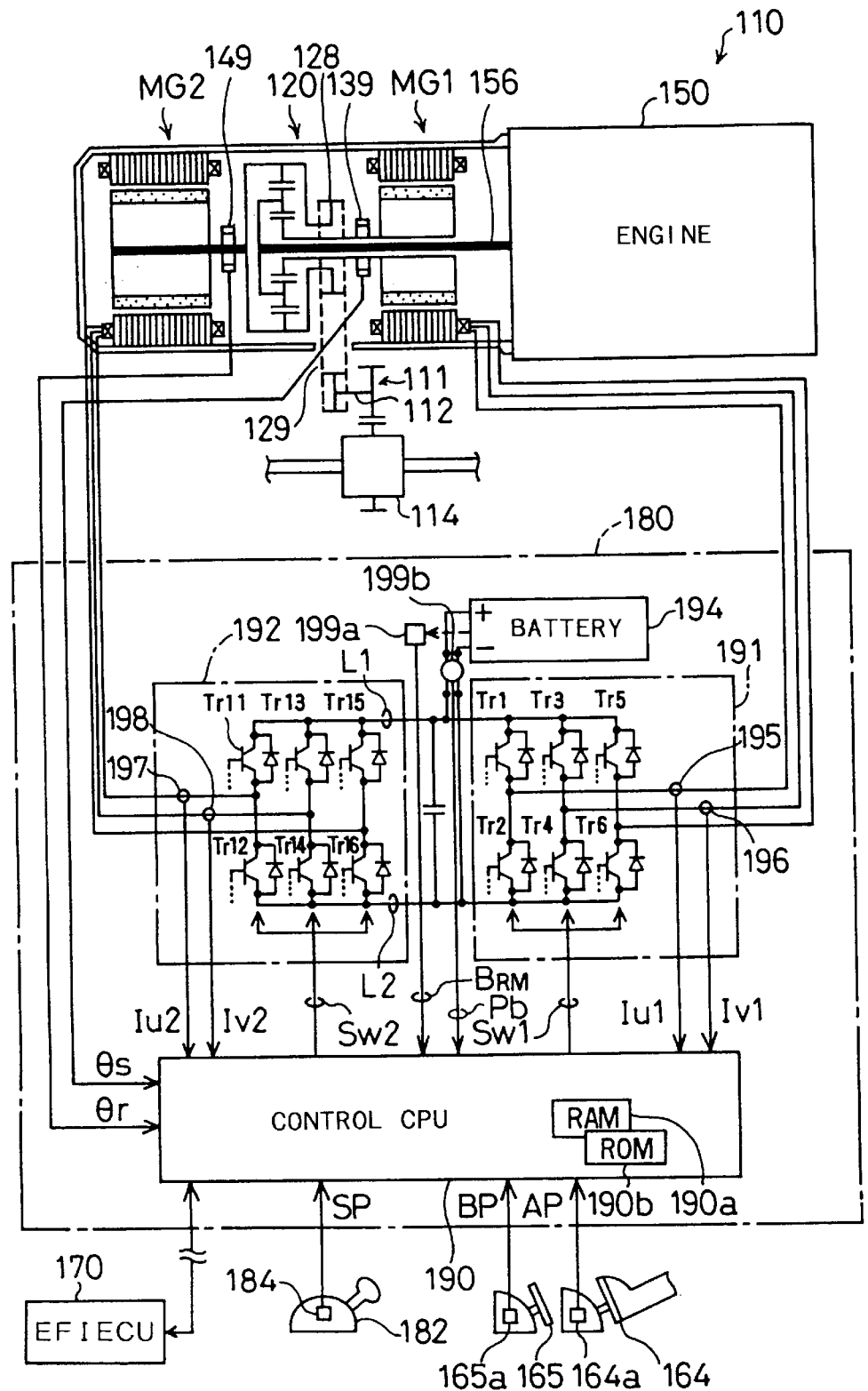
FIG. 20 schematically illustrates structure of a power output apparatus 110 as a second embodiment according to the present invention.

The following describes a power output apparatus 110 as a second embodiment according to the present invention. FIG. 20 schematically illustrates structure of the power output apparatus 110 of the second embodiment, FIG. 21 is an enlarged view illustrating an essential part of the power output apparatus 110 of the second embodiment, and FIG. 3 schematically illustrates general structure of a vehicle with the power output apparatus 110 of the second embodiment incorporated therein.

Figure 22:
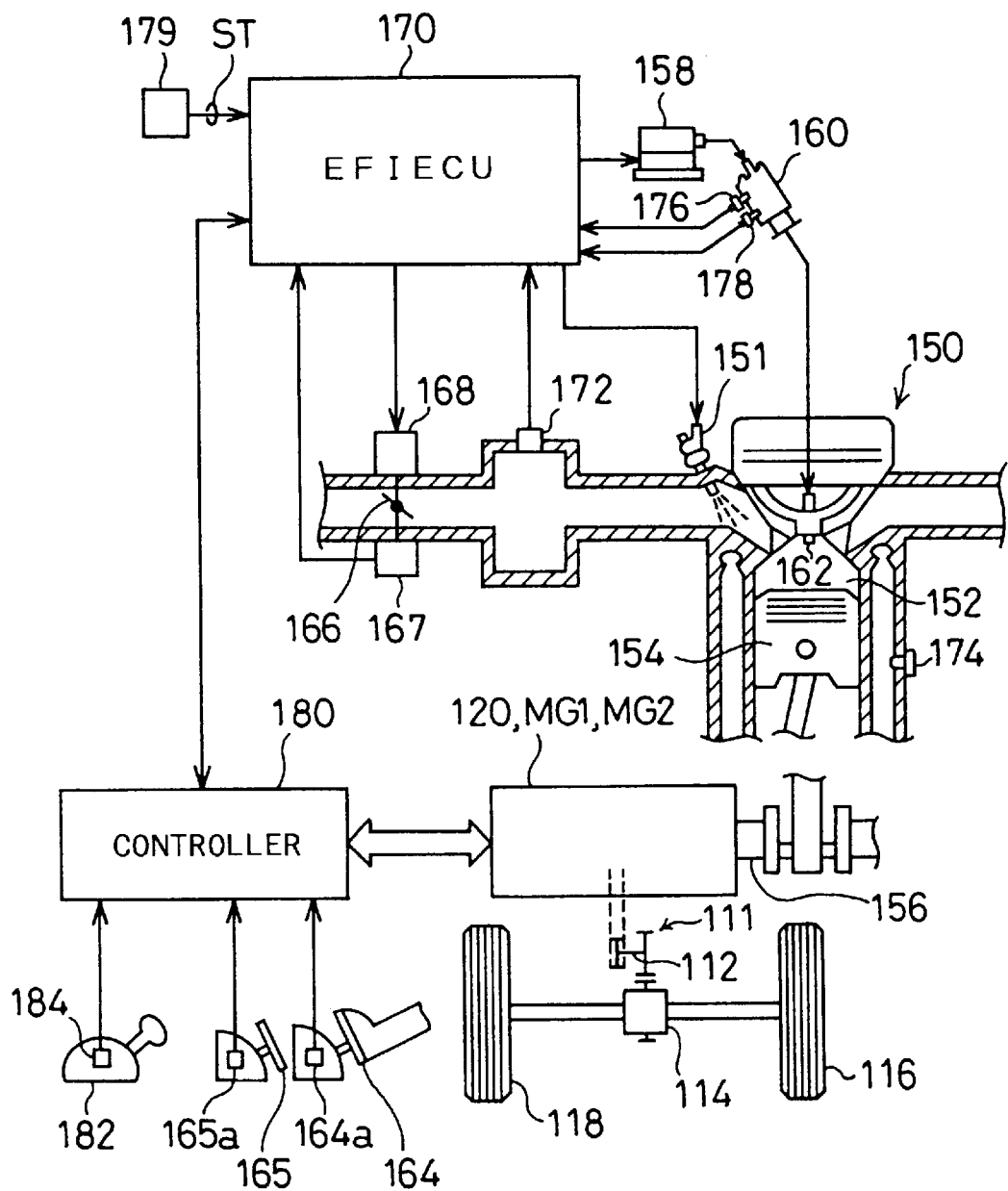
FIG. 22 schematically illustrates general structure of a vehicle with the power output apparatus 110 of the second embodiment incorporated therein.

The vehicle with the power output apparatus 110 of the second embodiment shown in FIG. 22 has a similar structure to that of the vehicle with the power output apparatus 20 of the first embodiment shown in FIG. 2, except that the clutch motor 30 and the assist motor 40 attached to the crankshaft 56 are replaced by a planetary gear 120, a first motor MG1, and a second motor MG2 attached to a crankshaft 156. The constituents of the power output apparatus 110 of the second embodiment that are identical with those of the power output apparatus 20 of the first embodiment are shown by like numerals +100 and not specifically described here. The numerals and symbols used in the description of the power output apparatus 20 of the first embodiment have the same meanings in the description of the power output apparatus 110 of the second embodiment, unless otherwise specified.

Referring to FIG. 20, the power output apparatus 110 of the second embodiment primarily includes an engine 150, the planetary gear 120 having a planetary carrier 124 mechanically linked with the crankshaft 156 of the engine 150, the first motor MG1 linked with a sun gear 121 of the planetary gear 120, the second motor MG2 linked with a ring gear 122 of the planetary gear 120, and a controller 180 for driving and controlling the first and the second motors MG1 and MG2.

Figure 21:
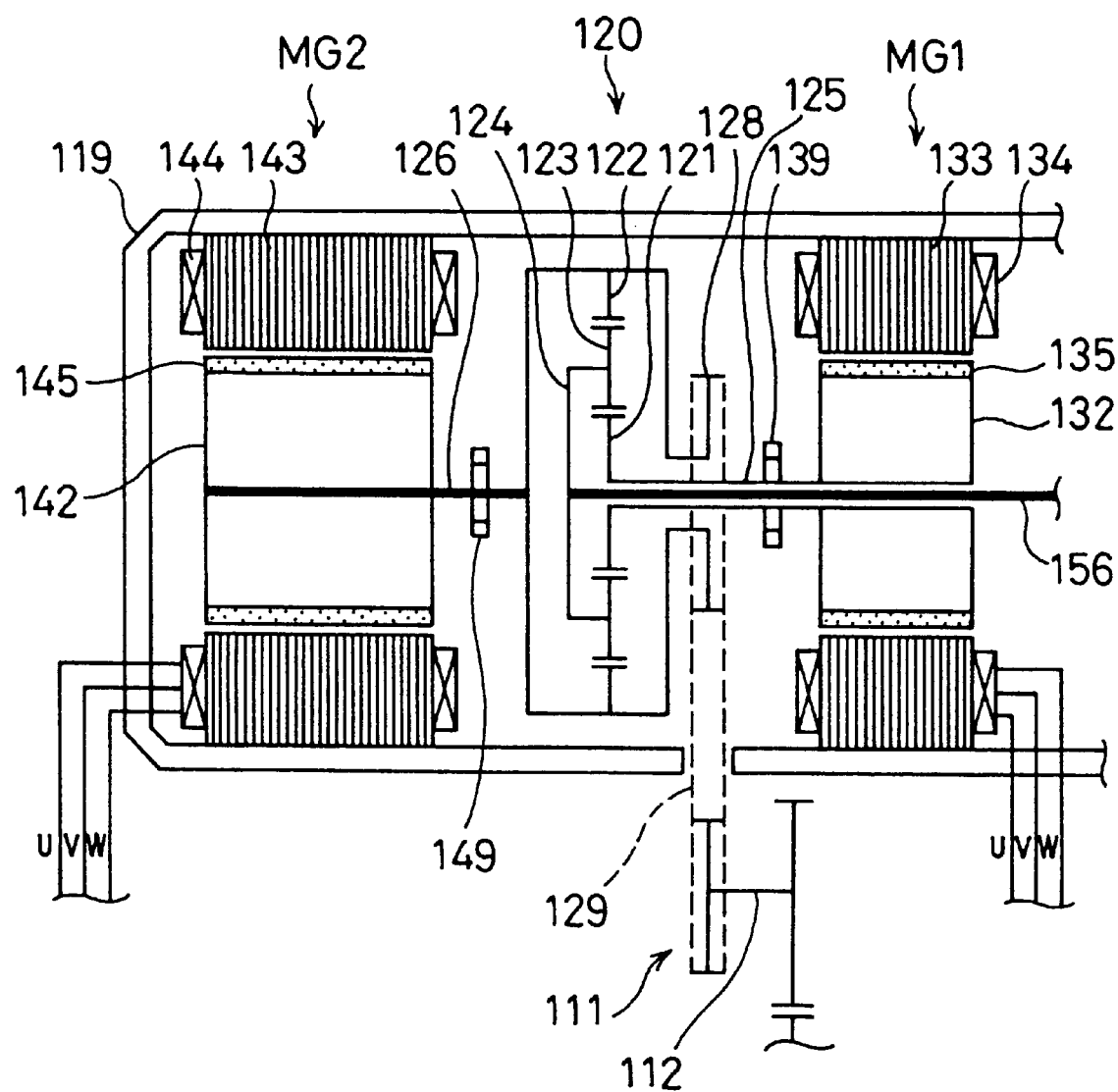
FIG. 21 is an enlarged view illustrating an essential part of the power output apparatus 110 of the second embodiment.

As shown in FIG. 21, the planetary gear 120 includes the sun gear 121 linked with a hollow sun gear shaft 125 which the crankshaft 156 passes through, the ring gear 122 linked with a ring gear shaft 126 coaxial with the crankshaft 156, a plurality of planetary pinion gears 123 arranged between the sun gear 121 and the ring gear 122 to revolve around the sun gear 121 while rotating on its axis, and the planetary carrier 124 connecting with one end of the crankshaft 156 to support the rotating shafts of the planetary pinion gears 123. In the planetary gear 120, three shafts, that is, the sun gear shaft 125, the ring gear shaft 126, and the crankshaft 156 respectively connecting with the sun gear 121, the ring gear 122, and the planetary carrier 124, work as input and output shafts of the power. Determination of the powers input to and output from any two shafts among the three shafts automatically determines the power input to and output from the residual one shaft. The details of the input and output operations of the power into and from the three shafts of the planetary gear 120 will be discussed later.

A power feed gear 128 for taking out the power is linked with the ring gear 122 and arranged on the side of the first motor MG1. The power feed gear 128 is further connected to a power transmission gear 111 via a chain belt 129, so that the power is transmitted between the power feed gear 128 and the power transmission gear 111. As shown in FIG. 22, the power transmission gear 111 is further linked with a differential gear 114. The power output from the power output apparatus 110 is thus eventually transmitted to left and right driving wheels 116 and 118.

The first motor MG1 is constructed as a synchronous motor-generator and includes a rotor 132 having a plurality of permanent magnets 135 (four N poles and four S poles in this embodiment) on its outer surface and a stator 133 having three-phase coils 134 wound thereon to form a revolving magnetic field. The rotor 132 is linked with the sun gear shaft 125 connecting with the sun gear 121 of the planetary gear 120. The stator 133 is prepared by laying thin plates of non-directional electromagnetic steel one upon another and is fixed to a casing 119. The first motor MG1 works as a motor for rotating the rotor 132 through the interaction between a magnetic field produced by the permanent magnets 135 and a magnetic field produced by the three-phase coils 134, or as a generator for generating an electromotive force on either ends of the three-phase coils 134 through the interaction between the magnetic field produced by the permanent magnets 135 and the rotation of the rotor 132. The sun gear shaft 125 is further provided with a resolver 139 for measuring its rotational angle θs.

Like the first motor MG1, the second motor MG2 is also constructed as a synchronous motor-generator and includes a rotor 142 having a plurality of permanent magnets 145 (four N poles and four S poles in this embodiment) on its outer surface and a stator 143 having three-phase coils 144 wound thereon to form a revolving magnetic field. The rotor 142 is linked with the ring gear shaft 126 connecting with the ring gear 122 of the planetary gear 120, whereas the stator 14 is fixed to the casing 119. The stator 143 of the motor MG2 is also produced by laying thin plates of non-directional electromagnetic steel one upon another. Like the first motor MG1, the second motor MG2 also works as a motor or a generator. The ring gear shaft 126 is further provided with a resolver 149 for measuring its rotational angle θr.

Referring back to FIG. 20, the controller 180 included in the power output apparatus 110 of the second embodiment is constructed in the same manner as the controller 80 included in the power output apparatus 20 of the first embodiment. The controller 180 includes a first driving circuit 191 for driving the first motor MG1, a second driving circuit 192 for driving the second motor MG2, a control CPU 190 for controlling both the first and the second driving circuits 191 and 192, and a battery 194 including a number of secondary cells. Like the control CPU 90 of the first embodiment, the control CPU 190 includes a RAM 190a used as a working memory, a ROM 190b in which various control programs are stored, an input/output port (not shown), and a serial communication port (not shown) through which data are sent to and received from the EFIECU 170. The control CPU 190 receives a variety of data via the input port. The input data include a rotational angle θs of the sun gear shaft 125 measured with the resolver 139, a rotational angle θr of the ring gear shaft 126 measured with the resolver 149, an accelerator pedal position AP (step-on amount of an accelerator pedal 164) output from an accelerator pedal position sensor 164a, a brake pedal position BP (step-on amount of a brake pedal 165) output from a brake pedal position sensor 165a, a gearshift position SP output from a gearshift position sensor 184, values of currents Iu1 and Iv1 from two ammeters 195 and 196 disposed in the first driving circuit 191, values of currents Iu2 and Iv2 from two ammeters 197 and 198 disposed in the second driving circuit 192, a remaining charge BRM of the battery 194 measured with a remaining charge meter 199a, and a charge-discharge electric power Pb of the battery 194 measured with a wattmeter 199b attached to an output terminal of the battery 194.

The control CPU 190 outputs a first control signal SW1 for driving six transistors Tr1 through Tr6 working as switching elements of the first driving circuit 191 and a second control signal SW2 for driving six transistors Tr11 through Tr16 working as switching elements of the second driving circuit 192. The six transistors Tr1 through Tr6 in the first driving circuit 191 (the six transistors Tr11 through Tr16 in the second driving circuit 192) constitute a transistor inverter and are arranged in pairs to work as a source and a drain with respect to a pair of power lines L1 and L2. The three-phase coils (U,V,W) 134 of the first motor MG1 (the three-phase coils 144 of the second motor MG2) are connected to the respective contacts of the paired transistors in the first driving circuit 191 (in the second driving circuit 192). The power lines L1 and L2 are respectively connected to plus and minus terminals of the battery 194. The control signal SW1 (the control signal SW2) output from the control CPU 190 thus successively controls the power-on time of the paired transistors Tr1 through Tr6 (the power-on time of the paired transistors Tr11 through Tr16). The electric currents flowing through the three-phase coils 134 (the three-phase coils 144) undergo PWM (pulse width modulation) control to give quasi-sine waves, which enable the three-phase coils 134 (the three-phase coils 144) to form a revolving magnetic field.

Figure 23:
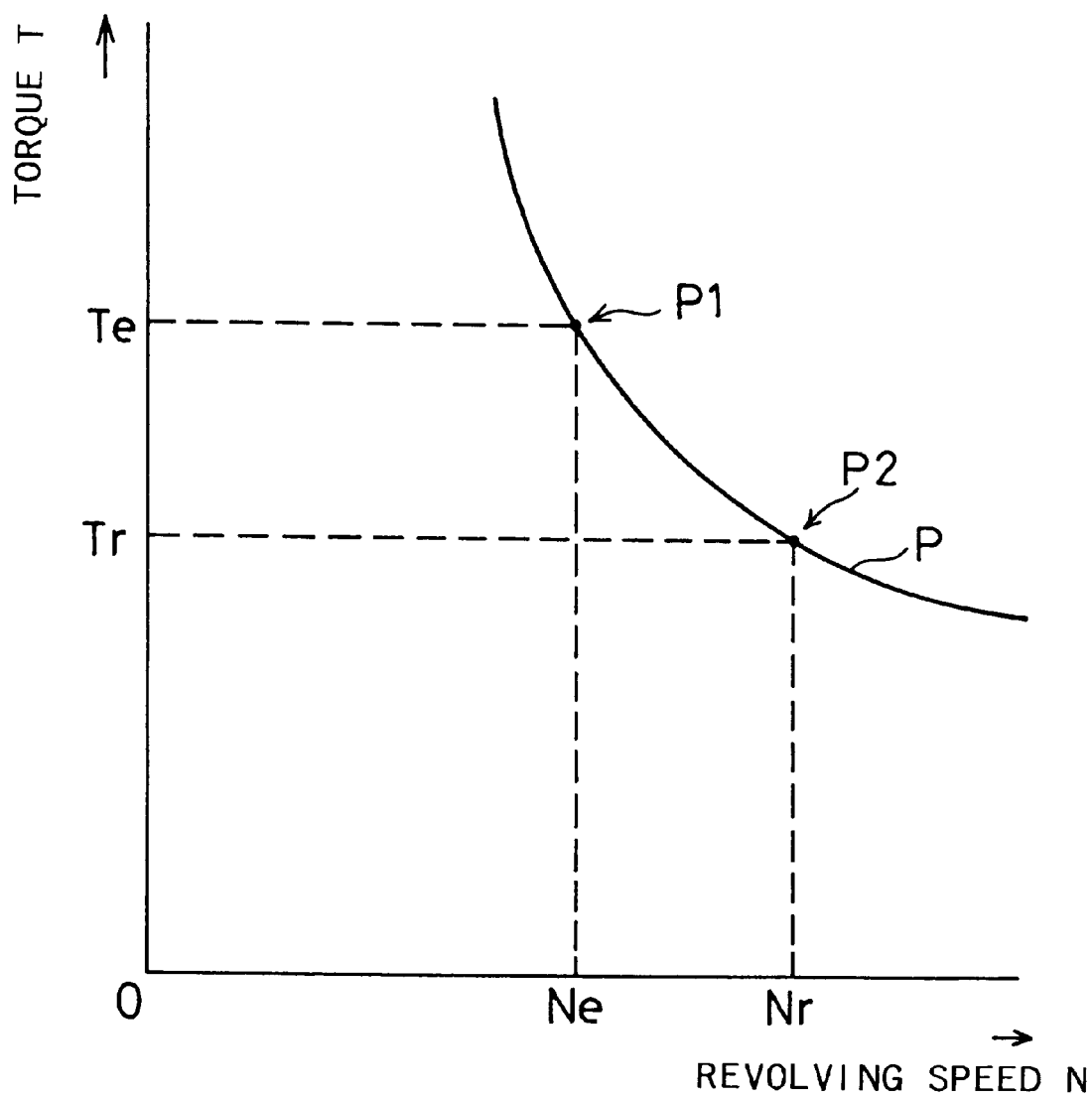
FIG. 23 is a graph showing the operation principle of the power output apparatus 110 of the second embodiment.

The power output apparatus 110 of the second embodiment thus constructed works in accordance with the operation principles discussed below, especially with the principle of torque conversion. By way of example, it is assumed that the engine 150 is driven at a driving point P1 defined by the revolving speed Ne and the torque Te and that the ring gear shaft 126 is driven at another driving point P2, which is defined by another revolving speed Nr and another torque Tr but gives the same energy as energy Pe output from the engine 150. This means that the power output from the engine 150 is subjected to torque conversion and applied to the ring gear shaft 126. The relationship between the torque and the revolving speed of the engine 150 and the ring gear shaft 126 under such conditions is shown in the graph of FIG. 23.

Figure 24:
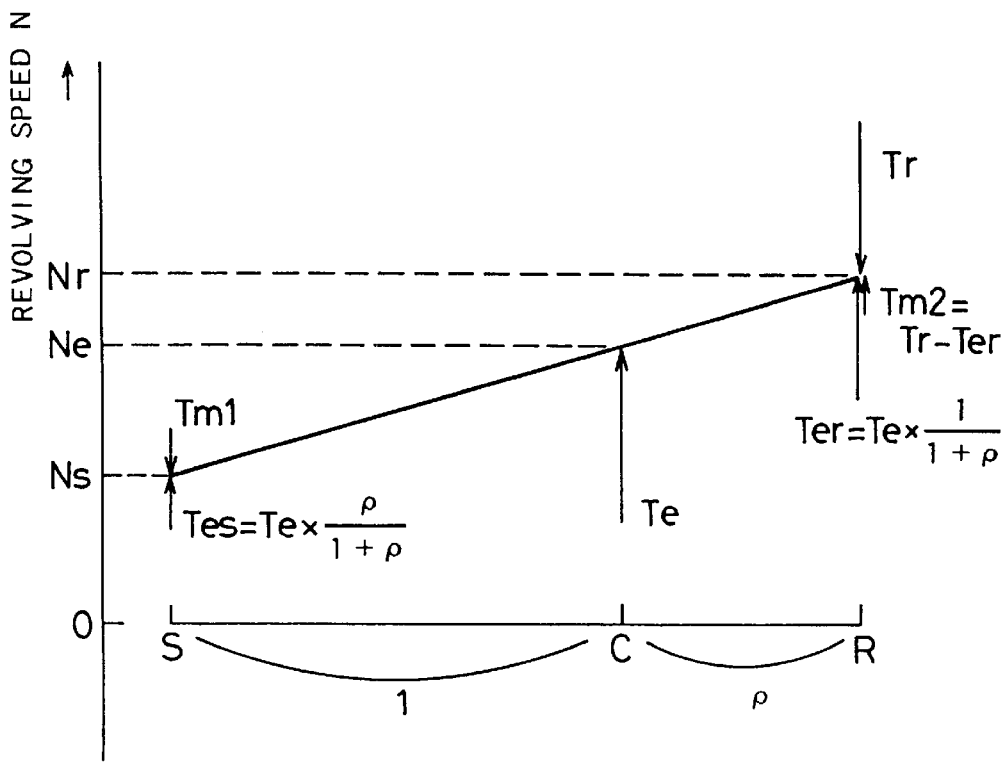
FIG. 24 is a nomogram showing the relationship between the revolving speed and the torque on the three shafts linked with the planetary gear 120 in the power output apparatus 110 of the second embodiment.
Figure 25:
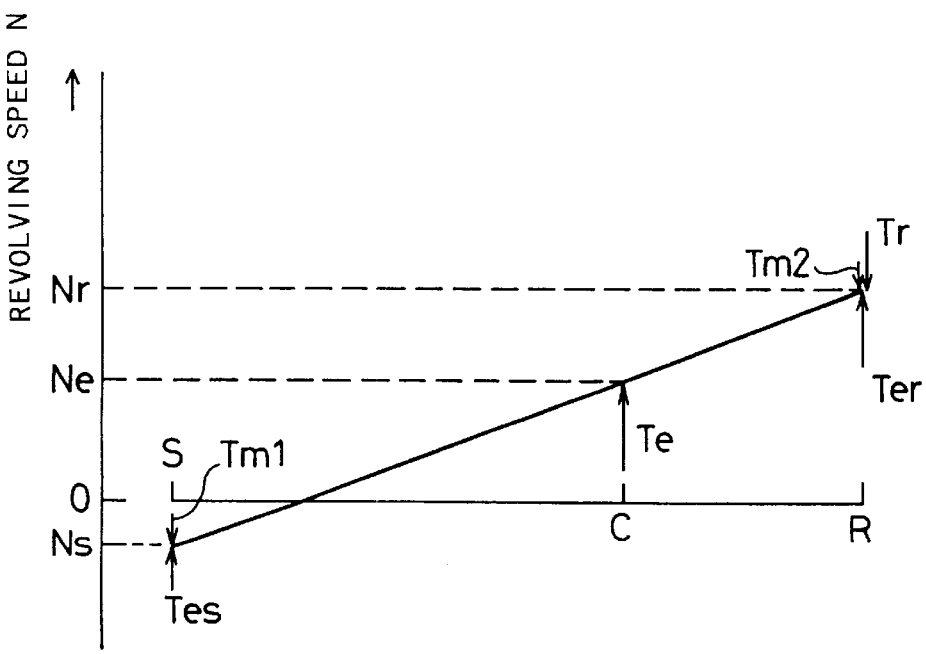
FIG. 25 is a nomogram showing the relationship between the revolving speed and the torque on the three shafts linked with the planetary gear 120 in the power output apparatus 110 of the second embodiment.

According to the mechanics, the relationship between the revolving speed and the torque of the three shafts in the planetary gear 120 (that is, the sun gear shaft 125, the ring gear shaft 126, and the planetary carrier 124 (crankshaft 156)) can be expressed as nomograms illustrated in FIGS. 24 and 25 and solved geometrically. The relationship between the revolving speed and the torque of the three shafts in the planetary gear 120 may be analyzed numerically through calculation of energies of the respective shafts, without using the nomograms. For the clarity of explanation, the nomograms are used in this embodiment.

In the nomogram of FIG. 24, the revolving speed of the three shafts is plotted as ordinate and the positional ratio of the coordinate axes of the three shafts as abscissa. When a coordinate axis S of the sun gear shaft 125 and a coordinate axis R of the ring gear shaft 126 are positioned on either ends of a line segment, a coordinate axis C of the planetary carrier 124 is given as an interior division of the axes S and R at the ratio of 1 to ρ, where ρ represents a ratio of the number of teeth of the sun gear 121 to the number of teeth of the ring gear 122 and expressed as Equation (9) given below:

$$\rho = \text{number of teeth of sun gear/number of teeth of ring gear} \quad (9)$$

As mentioned above, the engine 150 is driven at the revolving speed Ne, while the ring gear shaft 126 is driven at the revolving speed Nr. The revolving speed Ne of the engine 150 can thus be plotted on the coordinate axis C of the planetary carrier 124 linked with the crankshaft 156 of the engine 150, and the revolving speed Nr of the ring gear shaft 126 on the coordinate axis R of the ring gear shaft 126. A straight line passing through both the points is drawn, and a revolving speed Ns of the sun gear shaft 125 is then given as the intersection of this straight line and the coordinate axis S. This straight line is hereinafter referred to as a dynamic collinear line. The revolving speed Ns of the sun gear shaft 125 can be calculated from the revolving speed Ne of the engine 150 and the revolving speed Nr of the ring gear shaft 126 according to a proportional expression given as Equation (10) below. In the planetary gear 120, the determination of the rotations of the two gears among the sun gear 121, the ring gear 122, and the planetary carrier 124 results in automatically setting the rotation of the residual one gear.

$$Ns = Nr - (Nr - Ne)\frac{1+\rho}{\rho} \tag{10}$$

The torque Te of the engine 150 is then applied (upward in the drawing) to the dynamic collinear line on the coordinate axis C of the planetary carrier 124 functioning as a line of action. The dynamic collinear line against the torque can be regarded as a rigid body to which a force is applied as a vector. Based on the technique of dividing the force into two different but parallel lines of action, the torque Te acting on the coordinate axis C is divided into a torque Tes on the coordinate axis S and a torque Ter on the coordinate axis R. The magnitudes of the torques Tes and Ter are given by Equations (11) and (12) below:

$$Tes = Te \times \frac{\rho}{1+\rho} \tag{11}$$

$$Ter = Te \times \frac{1}{1+\rho} \tag{12}$$

The equilibrium of forces on the dynamic collinear line is essential for the stable state of the dynamic collinear line. In accordance with a concrete procedure, a torque Tm1 having the same magnitude as but the opposite direction to the torque Tes is applied to the coordinate axis S, whereas a torque Tm2 having the same magnitude as but the opposite direction to a resultant force of the torque Ter and the torque Tr that has the same magnitude as but the opposite direction to the torque output to the ring gear shaft 126 is applied to the coordinate axis R. The torque Tm1 is given by the first motor MG1, and the torque Tm2 by the second motor MG2. The first motor MG1 applies the torque Tm1 in reverse of its rotation and thereby works as a generator to regenerate an electric power Pm1, which is given as the product of the torque Tm1 and the revolving speed Ns, from the sun gear shaft 125. The second motor MG2 applies the torque Tm2 in the direction of its rotation and thereby works as a motor to output an electric power Pm2, which is given as the product of the torque Tm2 and the revolving speed Nr, as a power to the ring gear shaft 126.

In case that the electric power Pm1 is identical with the electric power Pm2, all the electric power consumed by the second motor MG2 can be regenerated and supplied by the first motor MG1. In order to attain such a state, all the input energy should be output; that is, the energy Pe output from the engine 150 should be equal to energy Pr output to the ring gear shaft 126. Namely the energy Pe expressed as the product of the torque Te and the revolving speed Ne is made equal to the energy Pr expressed as the product of the torque Tr and the revolving speed Nr. Referring to FIG. 23, the power that is expressed as the product of the torque Te and the revolving speed Ne and output from the engine 150 driven at the driving point P1 is subjected to torque conversion and output to the ring gear shaft 126 as the power of the same energy but expressed as the product of the torque Tr and the revolving speed Nr. As discussed previously, the power output to the ring gear shaft 126 is transmitted to a drive shaft 112 via the power feed gear 128 and the power transmission gear 111, and further transmitted to the driving wheels 116 and 118 via the differential gear 114. A linear relationship is accordingly held between the power output to the ring gear shaft 126 and the power transmitted to the driving wheels 116 and 118. The power transmitted to the driving wheels 116 and 118 can thus be controlled by adjusting the power output to the ring gear shaft 126.

Although the revolving speed Ns of the sun gear shaft 125 is positive in the nomogram of FIG. 24, it may be negative according to the revolving speed Ne of the engine 150 and the revolving speed Nr of the ring gear shaft 126 as shown in the nomogram of FIG. 25. In the latter case, the first motor MG1 applies the torque in the direction of its rotation and thereby works as a motor to consume the electric power Pm1 given as the product of the torque Tm1 and the revolving speed Ns. The second motor MG2, on the other hand, applies the torque in reverse of its rotation and thereby works as a generator to regenerate the electric power Pm2, which is given as the product of the torque Tm2 and the revolving speed Nr, from the ring gear shaft 126. In case that the electric power Pm1 consumed by the first motor MG1 is made equal to the electric power Pm2 regenerated by the second motor MG2 under such conditions, all the electric power consumed by the first motor MG1 can be supplied by the second motor MG2.

Figure 29:
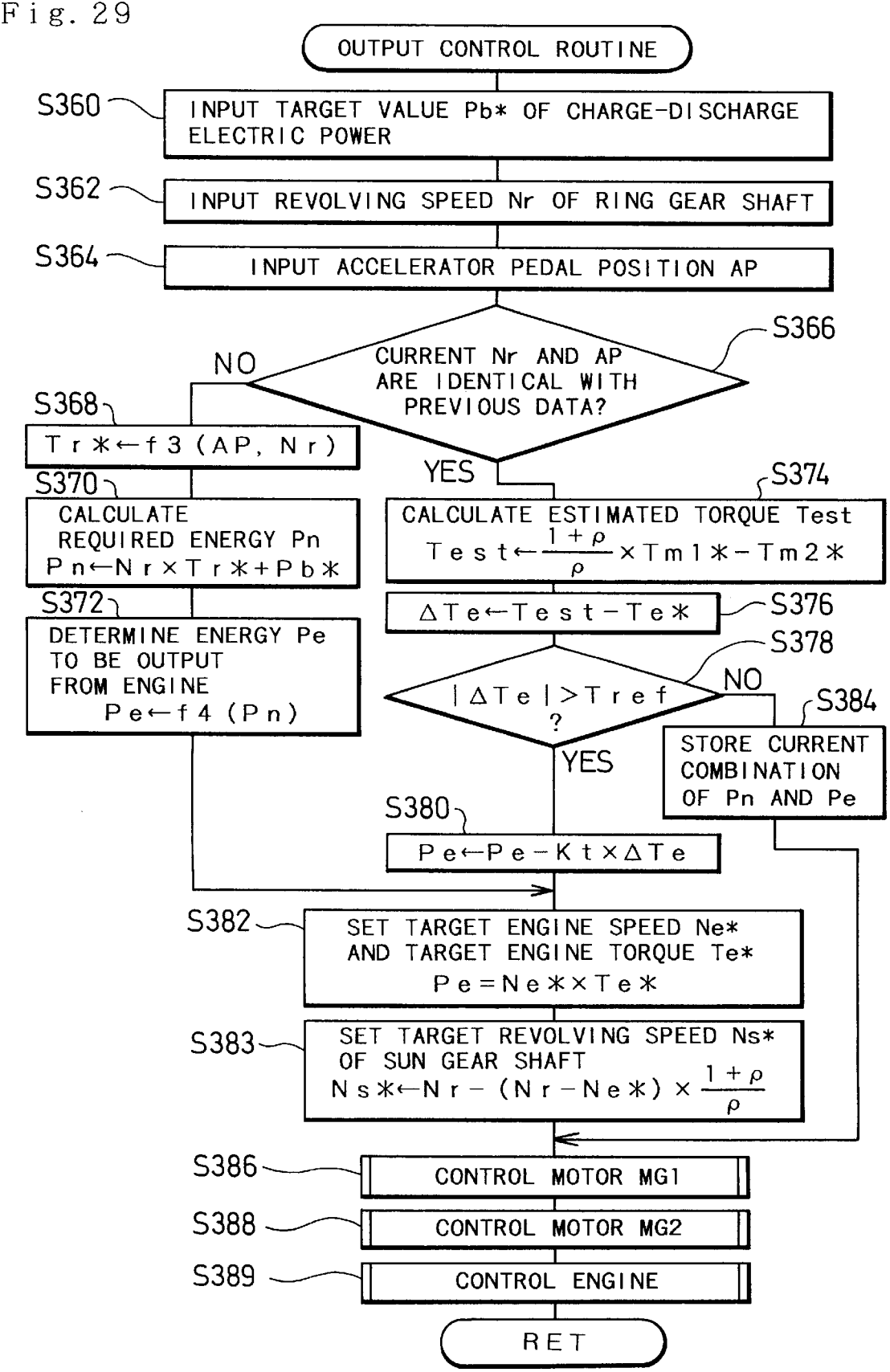
FIG. 29 is a flowchart showing another output control routine.
Figure 30:
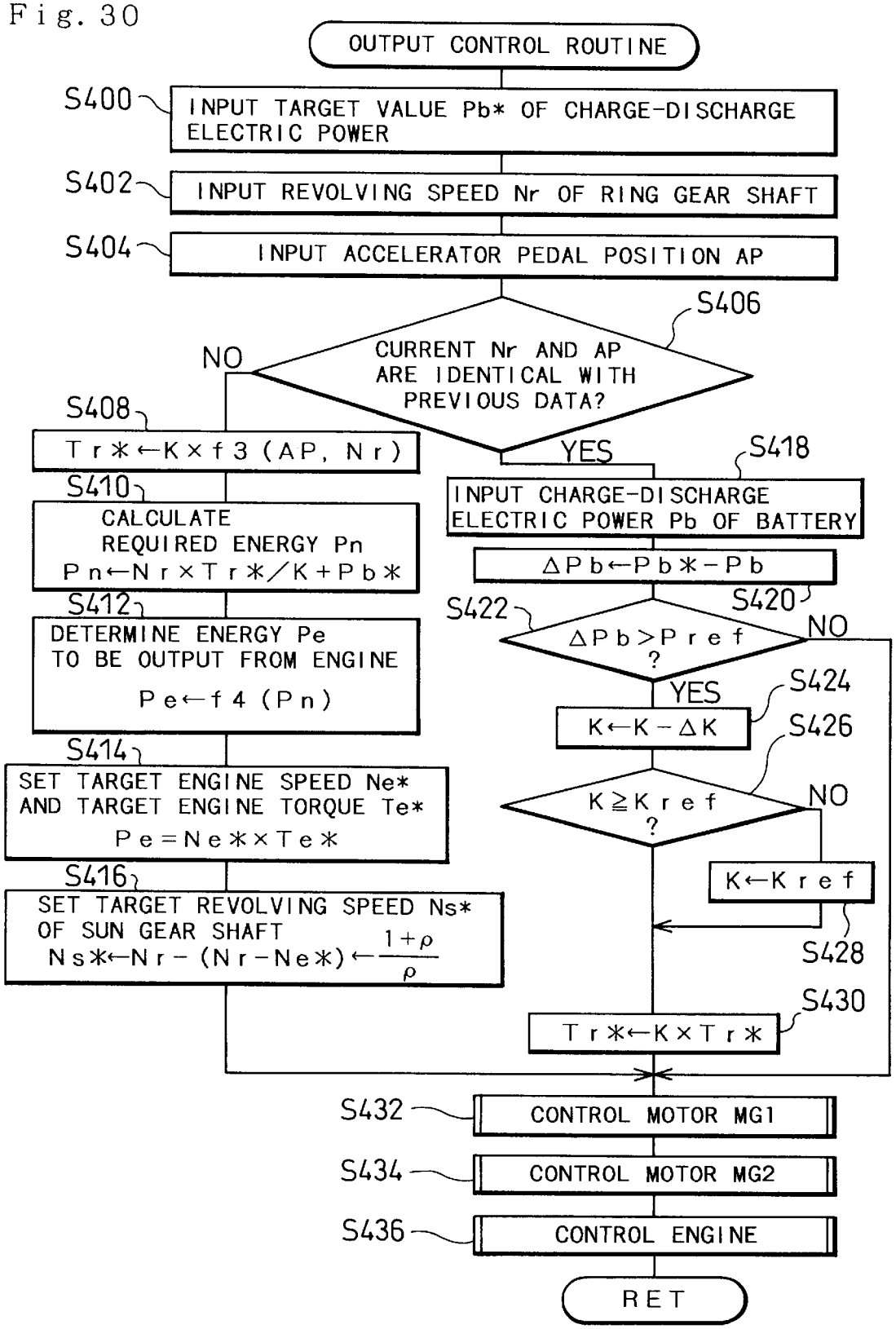
FIG. 30 is a flowchart showing still another output control routine.

The power output apparatus 110 of the second embodiment can set the driving point of the engine 150 independently of the driving point of the ring gear shaft 126 by taking into account the operation of the planetary gear 120. The power output apparatus 110 of the second embodiment accordingly carries out processes similar to the output control routines of FIGS. 4 and 10 through 12, which are carried out by the power output apparatus 20 of the first embodiment and its modified applications. The flowcharts of FIGS. 26 and 29 through 31 executed by the power output apparatus 110 of the second embodiment correspond to the output control routines of FIGS. 4 and 10 through 12. The following describes the output control routines of FIGS. 26 and 31, while those of FIGS. 29 and 30 are not specifically described here since they are combinations of FIGS. 26 and 31.

Figure 26:
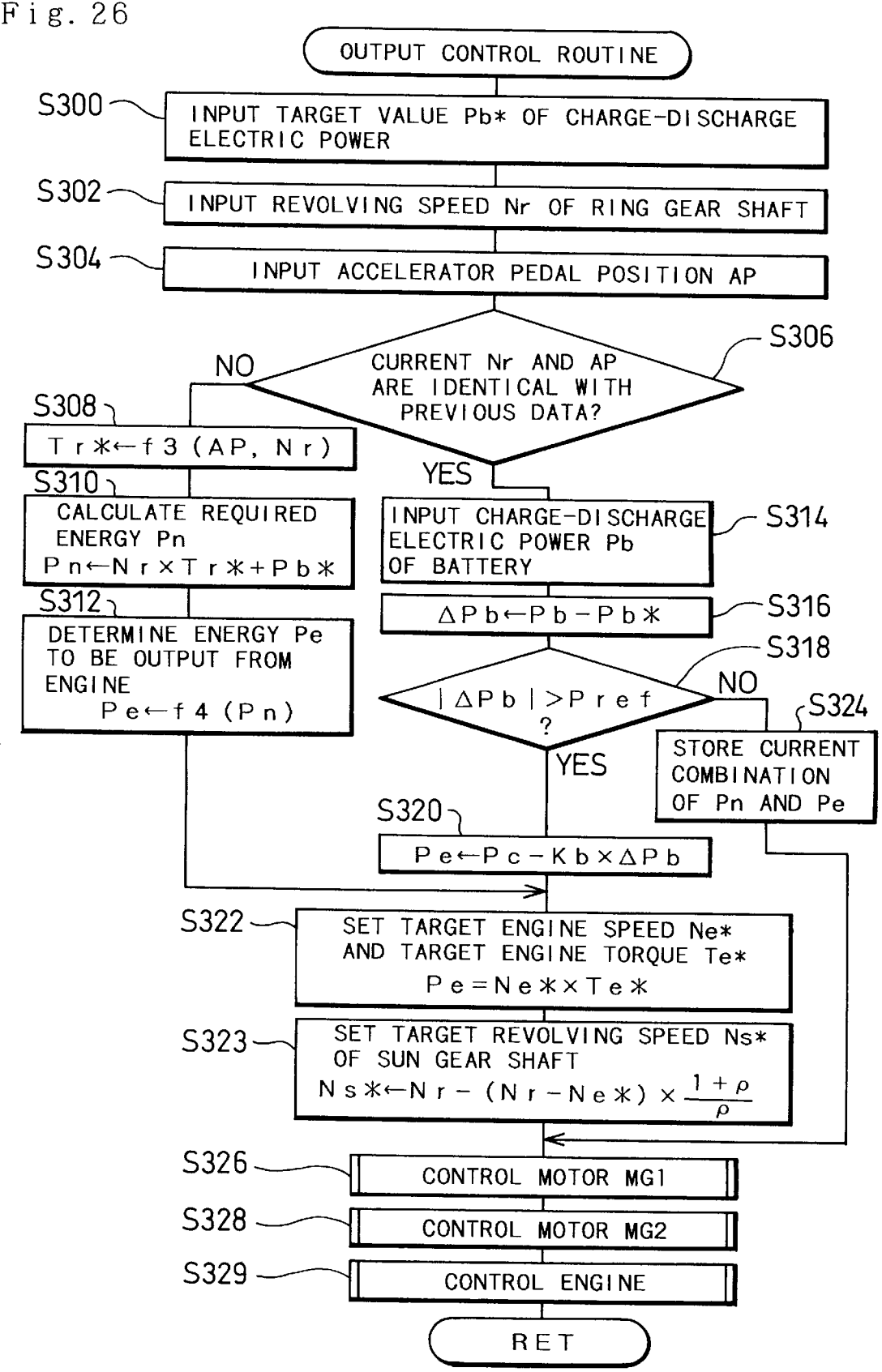
FIG. 26 is a flowchart showing an output control routine executed by the control CPU 190 of the controller 180 in the second embodiment.

The output control routine of FIG. 26 executed by the power output apparatus 110 of the second embodiment is similar to the output control routine of FIG. 4, except the following differences. The output control of FIG. 26 uses the revolving speed Nr of the ring gear shaft 126 and a torque command value Tr* (the torque to be output to the ring gear shaft 126) at steps S302 through S310, in place of the revolving speed Nd of the drive shaft 22 and the torque command value Td* (the torque to be output to the drive shaft 22). A target revolving speed Ns* of the sun gear shaft 125 is calculated from a target revolving speed Ne* of the engine 150, instead of the revolving speed Ne of the engine 150, according to Equation (10) given above at step S323. The output control of FIG. 26 controls the first motor MG1 and the second motor MG2 at steps S326 and S328, while the output control of FIG. 4 controls the clutch motor 30 and the assist motor 40 at steps S126 and S128. The ring gear shaft 126 is mechanically linked with the driving wheels 116 and 118 via the power feed gear 128, the power transmission gear 111, and the differential gear 114, and substantially corresponds to the drive shaft 22 in the first embodiment. Like the control operations of the clutch motor 30, the assist motor 40, and the engine 50 in the first embodiment, the control operations of the first motor MG1, the second motor MG2, and the engine 150 in the second embodiment, which are illustrated as separate steps in FIG. 26, are carried out in parallel with but independently of one another at a different timing from the output control routine.

Figure 27:
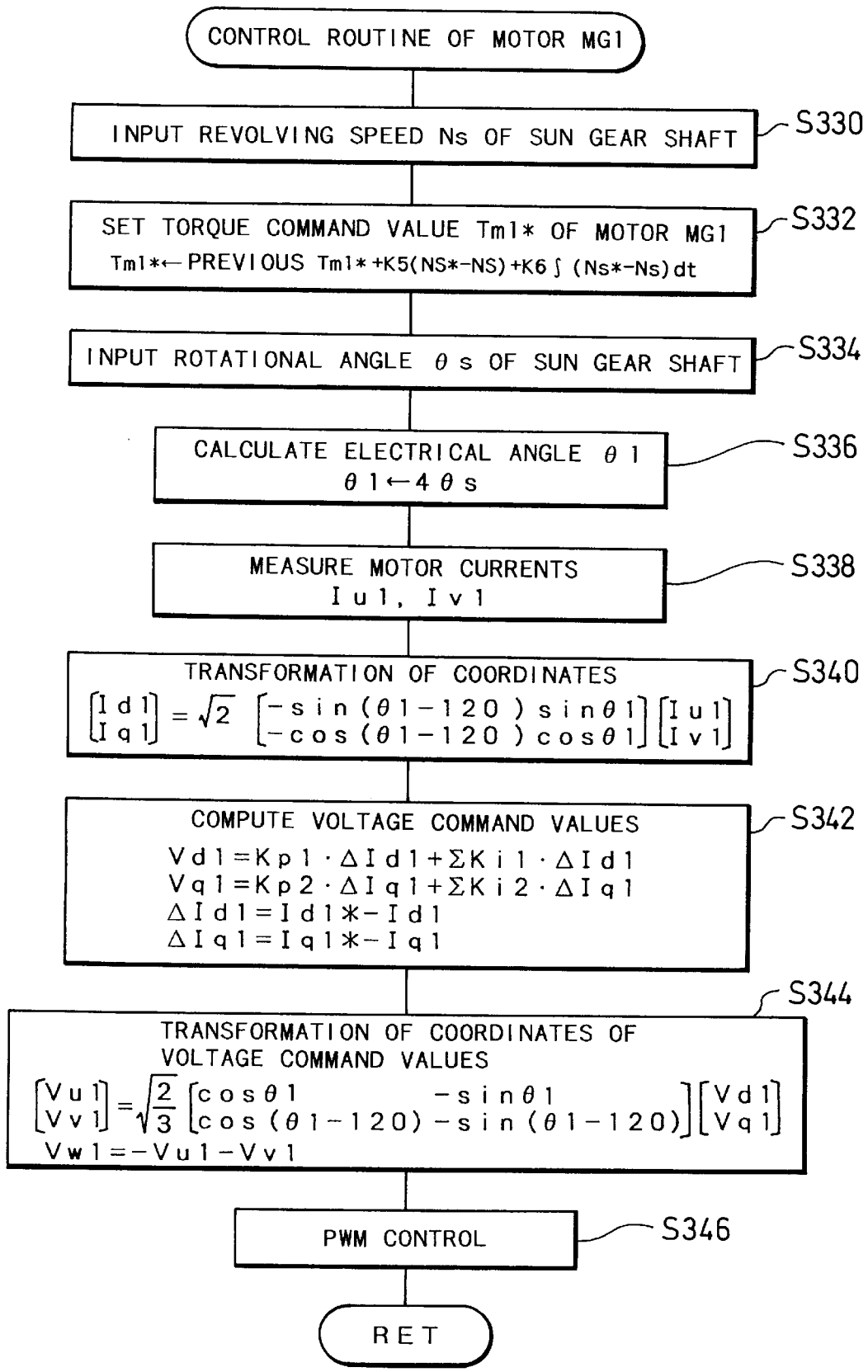
FIG. 27 is a flowchart showing a control routine of the first motor MG1 executed by the controller 180 in the second embodiment.
Figure 28:
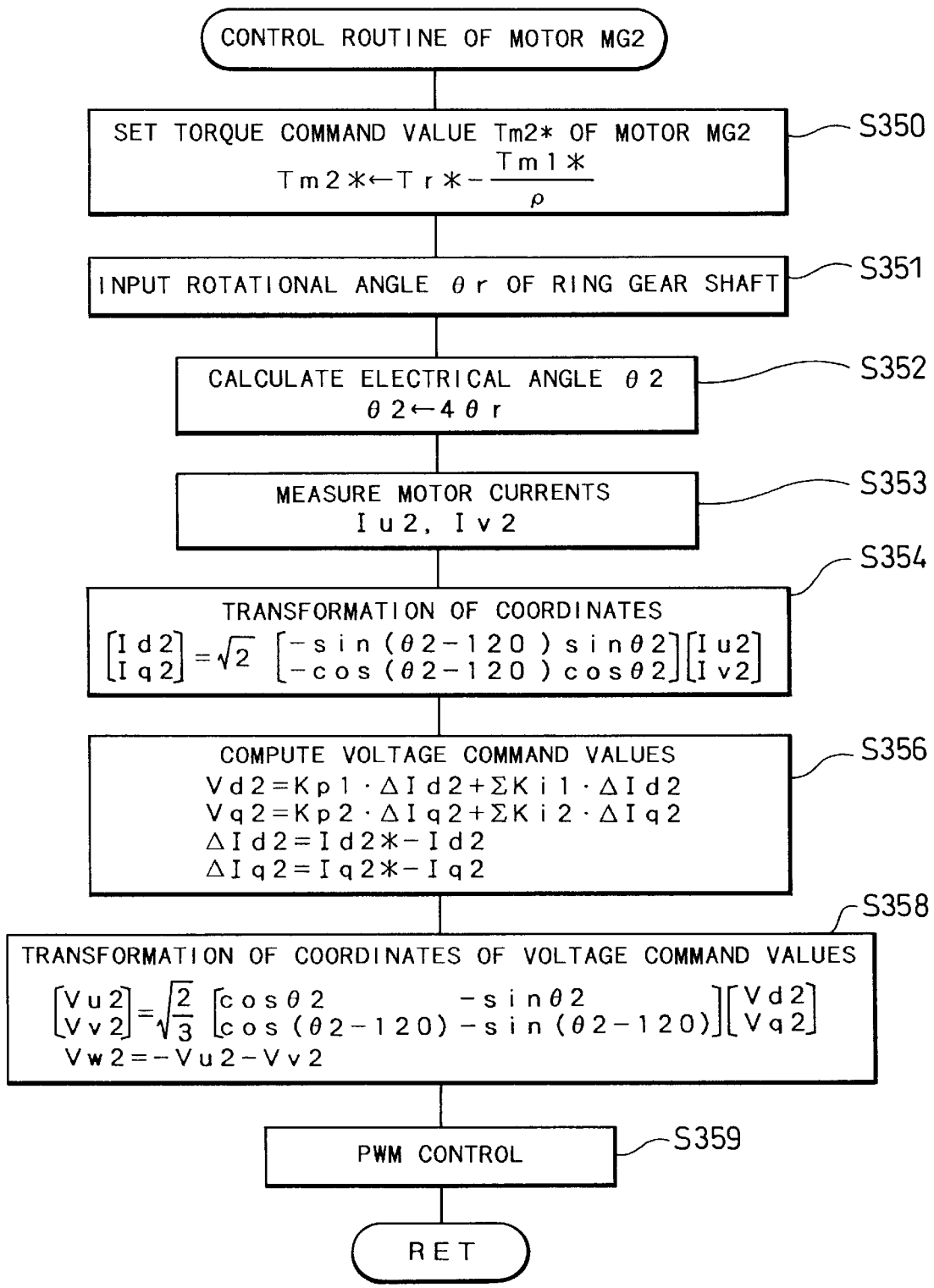
FIG. 28 is a flowchart showing a control routine of the second motor MG2 executed by the controller 180 in the second embodiment.

The control operation of the first motor MG1 at step S326 and the control operation of the second motor MG2 at step S328 in the output control routine of FIG. 26 respectively follow a control routine of the first motor MG1 shown in the flowchart of FIG. 27 and a control routine of the second motor MG2 shown in the flowchart of FIG. 28. The control routine of the first motor MG1 shown in FIG. 27 and the control routine of the second motor MG2 shown in FIG. 28 are similar to the assist motor control routine shown in the flowchart of FIG. 9, except the processes for setting a torque command value Tm1* of the first motor MG1 and a torque command value Tm2* of the second motor MG2 (steps S330 and S332 in FIG. 27 and step S350 in FIG. 28). The torque command value Tm1* of the first motor MG1 is calculated from the revolving speed Ns of the sun gear shaft 125 according to Equation (13) given below, whereas the torque command value Tm2* of the second motor MG2 is set according to Equation (14). In Equation (13) for setting the torque command value Tm1* of the first motor MG1, the second term on the right side is a proportional term to cancel the deviation of the actual revolving speed Ns from the target revolving speed Ns*, and the third term on the right side is an integral term to cancel the stationary deviation. Setting the torque command value Tm1* of the first motor MG1 in this manner enables the sun gear shaft 125 to be stably rotated at the target revolving speed Ns*. The target revolving speed Ns* of the sun gear shaft 125 is calculated from the target revolving speed Ne* of the engine 150 according to Equation (10), so that rotating the sun gear shaft 125 at the target revolving speed Ns* corresponds to rotating the engine 150 at the target revolving speed Ne*. The planetary gear 120 and the first motor MG1 thus function like the clutch motor 30 in the power output apparatus 20 of the first embodiment. Equation (14) for calculating the torque command value Tm2* of the second motor MG2 is obtained from the equilibrium on the dynamic collinear line in FIG. 24 or 25.

$$Tm1^* \leftarrow \text{previous } Tm1^* + K5(Ns^* - Ns) + K6 \int (Ns^* - Ns)dt \quad (13)$$

$$Tm2^* \leftarrow Tr^* - \frac{Tm1^*}{\rho} \quad (14)$$

The power output apparatus 110 of the second embodiment carries out the output control routine of FIG. 26 and exerts the similar effects to those of the power output apparatus 20 of the first embodiment. External factors, such as the working temperature of the engine 150, the properties of the fuel supplied, the atmospheric temperature, and the atmospheric pressure, may cause the energy actually output from the engine 150 to be different from the energy to be output from the engine 150. In the power output apparatus 110, the energy Pe to be output from the engine 150 varies depending upon the deviation ΔPb of the charge-discharge electric power Pb of the battery 194 from the target value Pb*. This structure enables the battery 194 to be charged with or discharge a desired electric power, while outputting a desired power to the sun gear shaft 125. The process of setting the target value Pb* of the charge-discharge electric power Pb of the battery 194 equal to zero effectively prevents unexpected charge or discharge of the battery 194 and thereby improves the energy efficiency of the whole power output apparatus 110. The structure of the second embodiment learns the combination of the required energy Pn and the energy Pe to be output from the engine 150 upon condition that the deviation ΔPb of the charge-discharge electric power Pb of the battery 194 from the target value Pb* is within an allowable range, thereby depressing charge or discharge of the battery 194.

Figure 31:
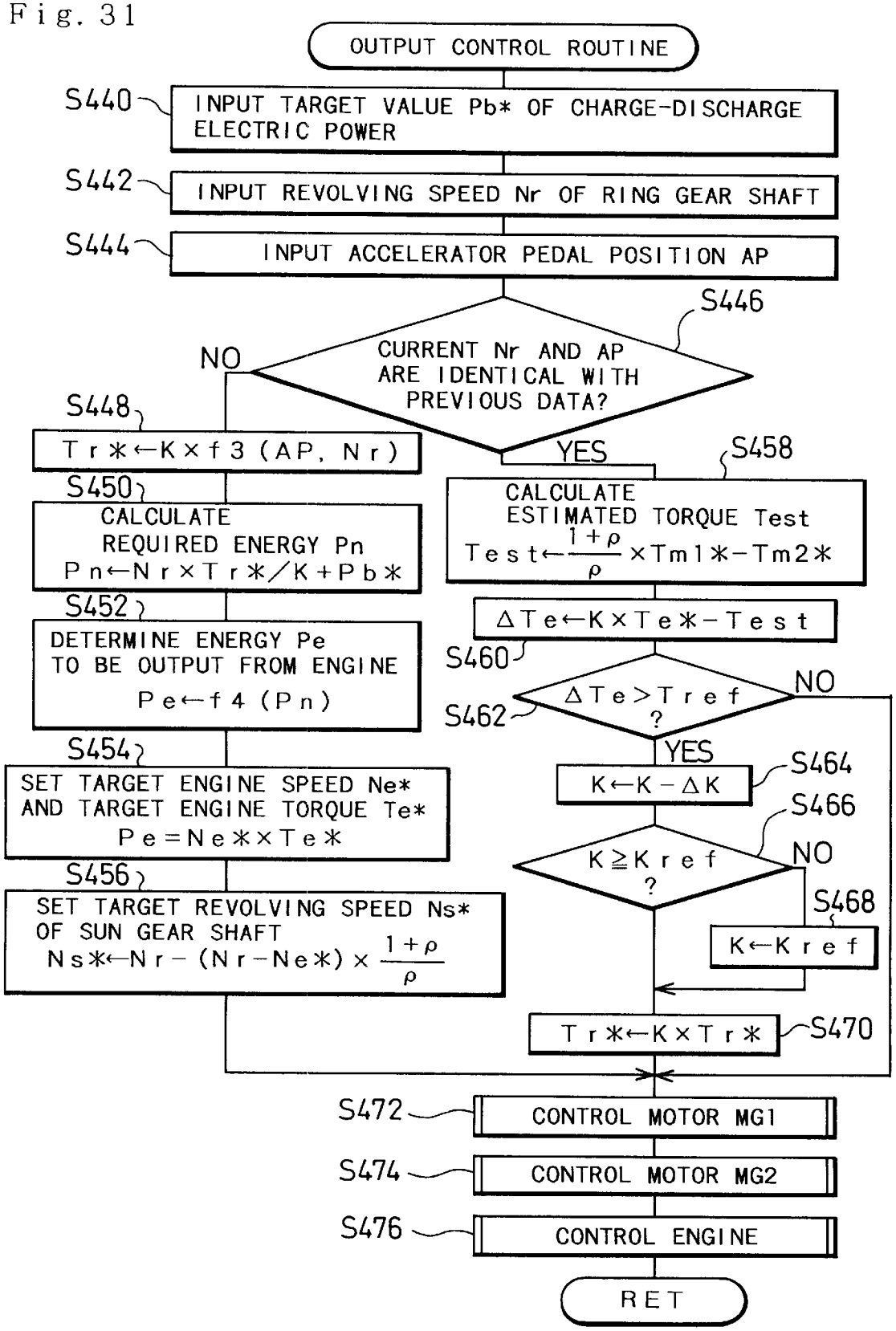
FIG. 31 is a flowchart showing another available output control routine.

The following describes the output control routine of FIG. 31, which corresponds to the output control routine of FIG. 12 in the first embodiment except the following differences. The output control of FIG. 31 uses the revolving speed Nr of the ring gear shaft 126 and the torque command value Tr* (the torque to be output to the ring gear shaft 126) at steps S440 through S452, in place of the revolving speed Nd of the drive shaft 22 and the torque command value Td* (the torque to be output to the drive shaft 22). The target revolving speed Ns* of the sun gear shaft 125 is calculated from the target revolving speed Ne* of the engine 150, instead of the revolving speed Ne of the engine 150, according to Equation (10) given above at step S456. The output control of FIG. 26 applies a different procedure to determine the difference ΔTe at steps S458 and S460. The output control of FIG. 26 controls the first motor MG1 and the second motor MG2 at steps S472 and S474, while the output control of FIG. 12 controls the clutch motor 30 and the assist motor 40 at steps S256 and S258. As mentioned above, the ring gear shaft 126 substantially corresponds to the drive shaft 22 in the first embodiment, and the planetary gear 120 and the first motor MG1 function like the clutch motor 30. The following describes the processing of steps S458 through S476 including the determination of the difference ΔTe.

In case that the revolving speed Nr of the ring gear shaft 126 and the accelerator pedal position AP are identical with the previous data input in the previous cycle of this routine at step S446, the control CPU 190 of the controller 180 calculates an estimated torque Test according to Equation (15) given below at step S458. The estimated torque Test implies an estimated value of the torque Te actually output from the engine 150. Since the revolving speed Nr of the ring gear shaft 126 and the accelerator pedal position AP are identical with the previous data, it is fair to assume that the power output apparatus 110 is in the stationary driving state. The torque Te output from the engine 150 can thus be estimated from the torque command value Tm1* of the first motor MG1 and the torque command value Tm2* of the second motor MG2 by Equation (15), which is obtained from the equilibrium on the dynamic collinear line in FIG. 24 or FIG. 25.

$$Test \leftarrow \frac{1+\rho}{\rho} \times Tm1^* - Tm2^* \quad (15)$$

After setting the estimated torque Test, the control CPU 190 subtracts the estimated torque Test from the target engine torque Te* multiplied by a correction coefficient K to calculate a difference ΔTe at step S460. Like in the output control routine of FIG. 12, the target engine torque Te* is multiplied by the correction coefficient K, in order to enable the target torque Te* to approach the torque Te actually output from the engine 150. The difference ΔTe thus calculated is compared with a threshold value Tref at step S462. In case that the difference ΔTe is greater than the threshold value Tref, the control CPU 190 subtracts a predetermined value ΔK from the correction coefficient K to set a new correction coefficient K at step S464 and limits the newly set correction coefficient K to be not less than a threshold value Kref at steps S466 and S468. The control CPU 190 subsequently multiplies the torque command value Tr* by the new correction efficient K to set a new torque command value Tr* or torque to be output to the ring gear shaft 126 at step S470. The program then controls the first motor MG1, the second motor MG2, and the engine 150 with the preset values at steps S472 through S476.

Even when the energy actually output from the engine 150 is different from the energy to be output from the engine 150, for example, due to the misfire of one cylinder in the engine 150, the output control routine of FIG. 31 varies the torque command value Tr* by multiplying it by the gradually decreasing correction coefficient K. The output control also multiplies the target torque Te* used for the determination by the correction coefficient K. This structure enables the power expressed as the product of the varied torque command value Tr* and the revolving speed Nr to be output to the ring gear shaft 126, while charging the battery 194 with a desired electric power or discharging the battery 194 to supplement a desired electric power. The process of setting the target value Pb* of the charge-discharge electric power Pb of the battery 194 equal to zero and making the threshold value Tref sufficiently small ensures that the power output from the engine 150 is subjected to torque conversion and output to the ring gear shaft 126 without causing charge or discharge of the battery 194. No excessive discharge of the battery 194 effectively prevents untimely death of the battery 194.

Figure 32:
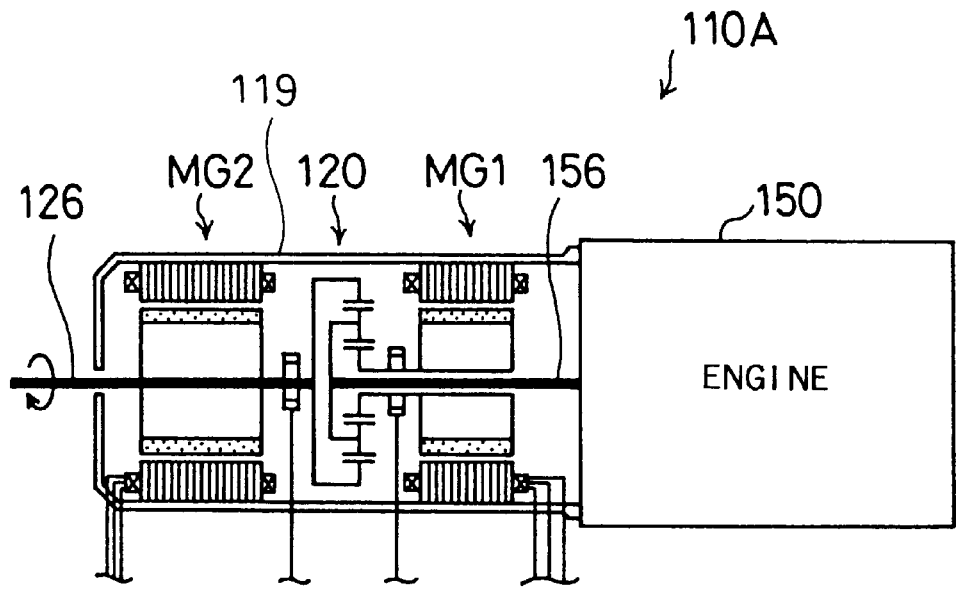
FIG. 32 schematically illustrates structure of another power output apparatus 110A as a modified example of the second embodiment.
Figure 33:
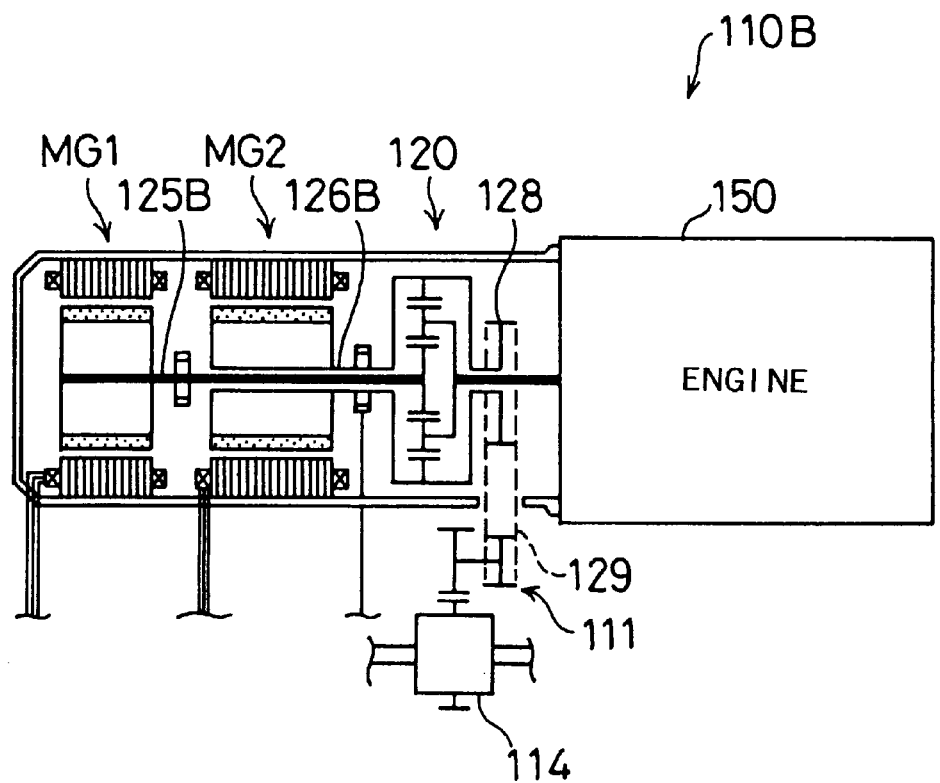
FIG. 33 schematically illustrates structure of still another power output apparatus 110B as another modified example of the second embodiment.

In the power output apparatus 110 of the second embodiment, the power output to the ring gear shaft 126 is taken out of the arrangement between the first motor MG1 and the second motor MG2 via the power feed gear 128 linked with the ring gear 122. Like another power output apparatus 110A shown in FIG. 32 as a modified example, however, the power may be taken out of the casing 119, from which the ring gear shaft 126 is extended. FIG. 33 shows still another power output apparatus 110B given as another modified example, wherein the engine 150, the planetary gear 120, the second motor MG2, and the first motor MG1 are arranged in this sequence. In this case, a sun gear shaft 125B may not have a hollow structure, whereas a hollow ring gear shaft 126B is required. This modified structure enables the power output to the ring gear shaft 126B to be taken out of the arrangement between the engine 150 and the second motor MG2.

Figure 34:
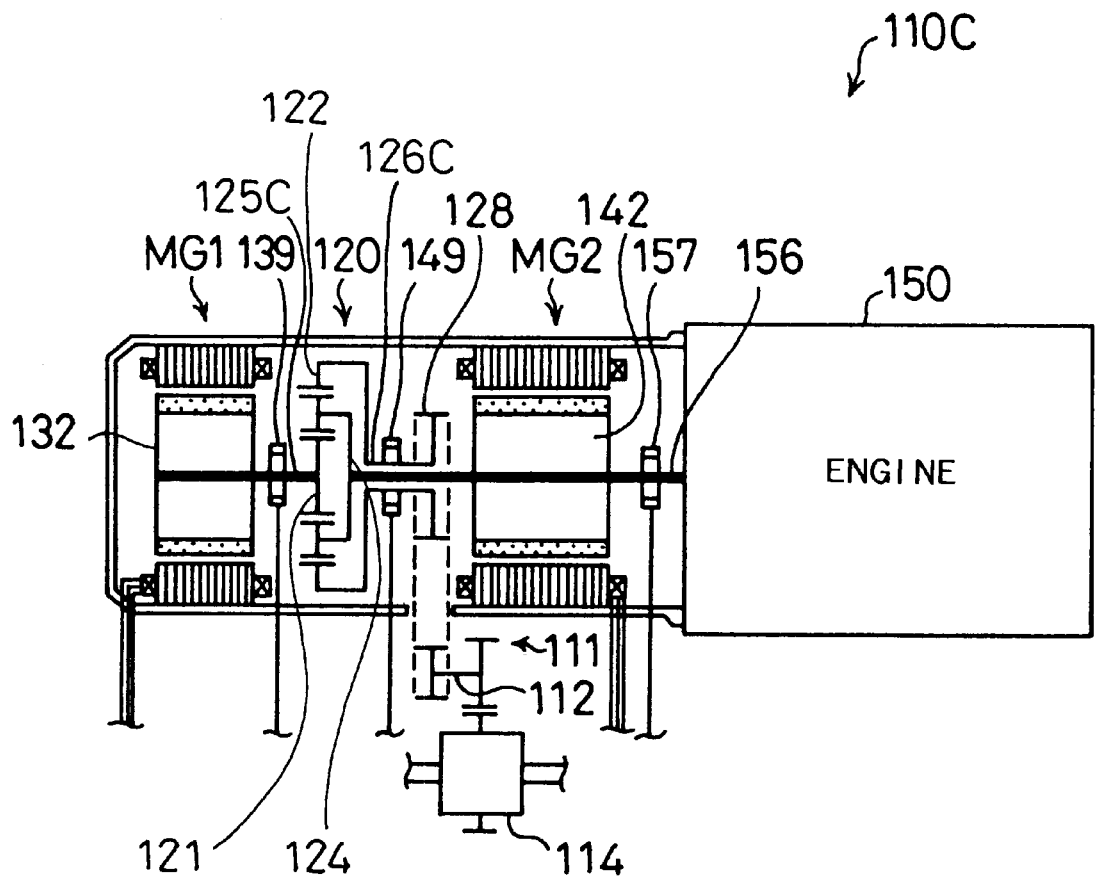
FIG. 34 schematically illustrates structure of another power output apparatus 110C as still another modified example of the second embodiment.

In the power output apparatus 110 of the second embodiment, the second motor MG2 is attached to the ring gear shaft 126. The second motor MG2 may, however, be attached to the crankshaft 156 like another power output apparatus 110C shown in FIG. 34 as a modified example. In the power output apparatus 110C of this modified structure, the rotor 132 of the first motor MG1 is attached to a sun gear shaft 125C connecting with the sun gear 121 of the planetary gear 120, whereas the planetary carrier 124 is linked with the crankshaft 156 of the engine 150. The rotor 142 of the second motor MG2 and a resolver 157 for measuring the rotational angle θe of the crankshaft 156 are mounted on the crankshaft 156. A ring gear shaft 126C linked with the ring gear 122 of the planetary gear 120 is connected to the power feed gear 128. The resolver 149 for measuring the rotational angle θr of the ring gear shaft 126C is mounted on the ring gear shaft 126C.

Figure 35:
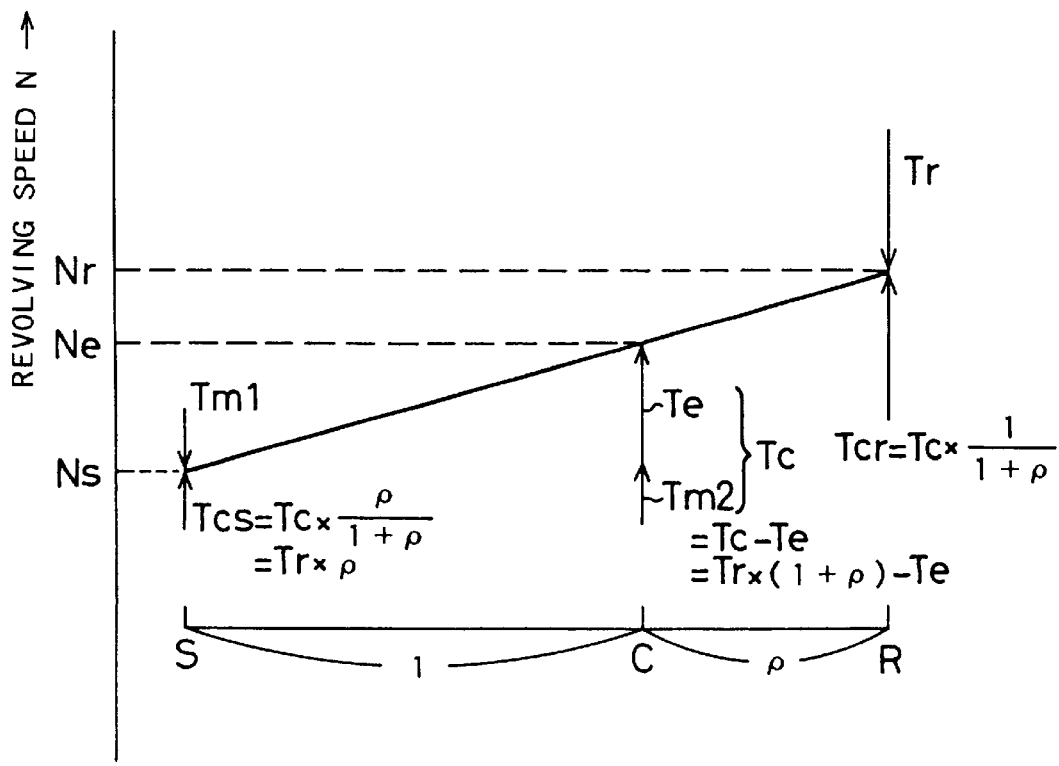
FIG. 35 is a nomogram showing the relationship between the revolving speed and the torque on the three shafts linked with the planetary gear 120 in the power output apparatus 110C of the modified structure.
Figure 36:
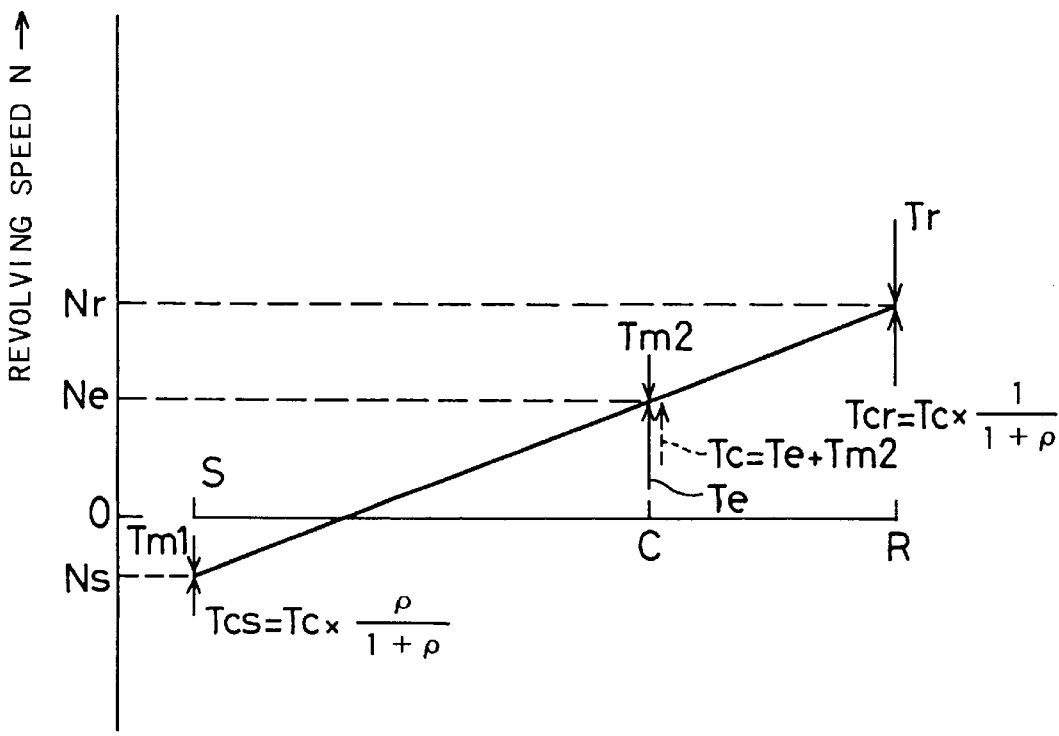
FIG. 36 is a nomogram showing the relationship between the revolving speed and the torque on the three shafts linked with the planetary gear 120 in the power output apparatus 110C of the modified structure.

The power output apparatus 110C of the modified structure works in the following manner. By way of example, it is assumed that the engine 150 is driven at a driving point P1 defined by the revolving speed Ne and the torque Te and outputs energy Pe (Pe=Ne×Te) and that the ring gear shaft 126C is driven at another driving point P2 defined by the revolving speed Nr and the torque Tr and outputs energy Pr (Pr=Nr×Tr) that is identical with the energy Pe. This means that the power output from the engine 150 is subjected to torque conversion and applied to the ring gear shaft 126C. FIGS. 35 and 36 are nomograms in this state.

Equations (16) through (19) given below are obtained from the equilibrium on the dynamic collinear line in the nomogram of FIG. 35. Equation (16) is obtained from the equilibrium of the energy Pe output from the engine 150 with the energy Pr output to the ring gear shaft 126C, and Equation (17) as the total energy input to the planetary carrier 124 via the crankshaft 156. Equations (18) and (19) are led by dividing a torque Tc acting on the planetary carrier 124 into divisional torques Tcs and Tcr acting on the coordinate axes S and R.

$$Te \times Ne = Tr \times Nr \tag{16}$$

$$Tc = Te + Tm2 \tag{17}$$

$$Tcs = Tc \times \frac{\rho}{1+\rho} \tag{18}$$

$$Tcr = Tc \times \frac{1}{1+\rho} \tag{19}$$

The equilibrium of forces on the dynamic collinear line is essential for the stable state of the dynamic collinear line. It is accordingly required to set the torque Tm1 equal to the divisional torque Tcs and the torque Tr equal to the divisional torque Tcr. The torques Tm1 and Tm2 are thus expressed by Equations (20) and (21) given below:

$$Tm1 = Tr \times \rho \tag{20}$$

$$Tm2 = Tr \times (1+\rho) - Te \tag{21}$$

The power output from the engine 150 and defined by the torque Te and the revolving speed Ne is converted to the power defined by the torque Tr and the revolving speed Nr and output to the ring gear shaft 126C by allowing the first motor MG1 to apply the torque Tm1 expressed by Equation (20) to the sun gear shaft 125C and allowing the second motor MG2 to apply the torque Tm2 expressed by Equation (21) to the crankshaft 156. In the state of the nomogram of FIG. 35, the direction of the torque output from the first motor MG1 is opposite to the direction of the rotation of the rotor 132. The first motor MG1 accordingly functions as a generator and regenerates the electric power Pm1 expressed as the product of the torque Tm1 and the revolving speed Ns. The direction of the torque output from the second motor MG2 is, on the other hand, identical with the direction of the rotation of the rotor 142. The second motor MG2 accordingly functions as a motor and consumes the electric power Pm2 expressed as the product of the torque Tm2 and the revolving speed Nr.

Although the revolving speed Ns of the sun gear shaft 125C is positive in the nomogram of FIG. 35, it may be negative according to the revolving speed Ne of the engine 150 and the revolving speed Nr of the ring gear shaft 126C as shown in the nomogram of FIG. 36. In the latter case, the first motor MG1 applies the torque in the direction of rotation of the rotor 132 and thereby works as a motor to consume the electric power Pm1 given as the product of the torque Tm1 and the revolving speed Ns. The second motor MG2, on the other hand, applies the torque in reverse of the rotation of the rotor 142 and thereby works as a generator to regenerate the electric power Pm2, which is given as the product of the torque Tm2 and the revolving speed Nr, from the ring gear shaft 126C.

Like the power output apparatus 110 of the second embodiment, the power output apparatus 110C of the modified structure controls the first motor MG1 and the second motor MG2 to output the torques calculated by Equations (20) and (21) given above. The energy output from the engine 150 is then freely subjected to torque conversion and given to the ring gear shaft 126C. In the same manner as the power output apparatus 110 of the second embodiment, the power output apparatus 110C carries out other applicable processes, in addition to the basic process that enables all the power output from the engine 150 to be subjected to torque conversion and output to the ring gear shaft 126C. One applicable process makes the power output from the engine 150 (that is, the product of the torque Te and the revolving speed Ne) greater than the power required to the ring gear shaft 126C (that is, the product of the torque Tr and the revolving speed Nr) and charges the battery 194 with the surplus electric power. Another applicable process makes the power output from the engine 150 smaller than the power required to the ring gear shaft 126C and discharges the battery 194 to supplement the shortage of electric power.

Figure 37:
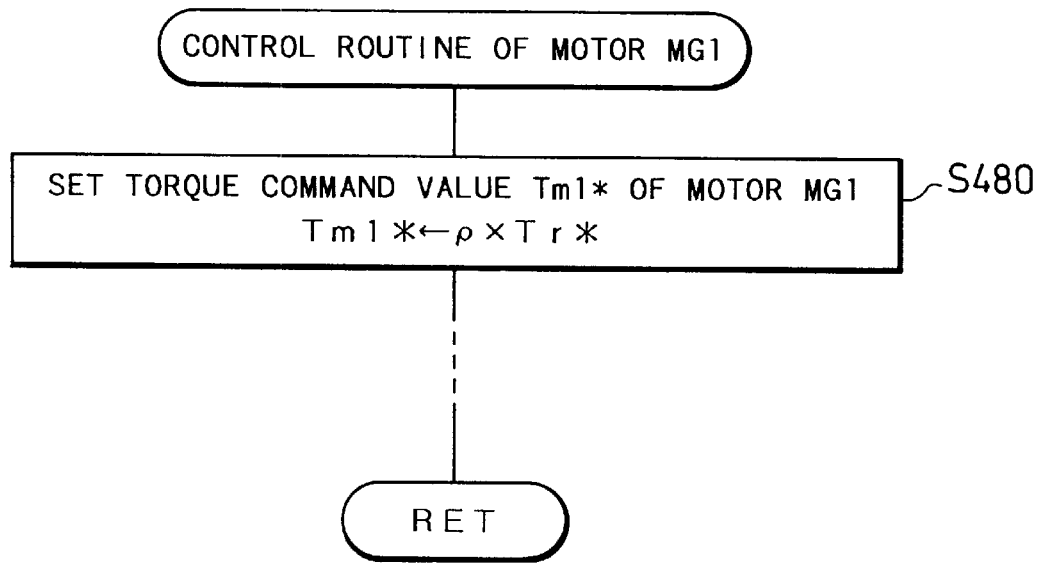
FIG. 37 is a flowchart showing part of a control routine of the first motor MG1 carried out by the power output apparatus 110C of the modified structure.
Figure 38:
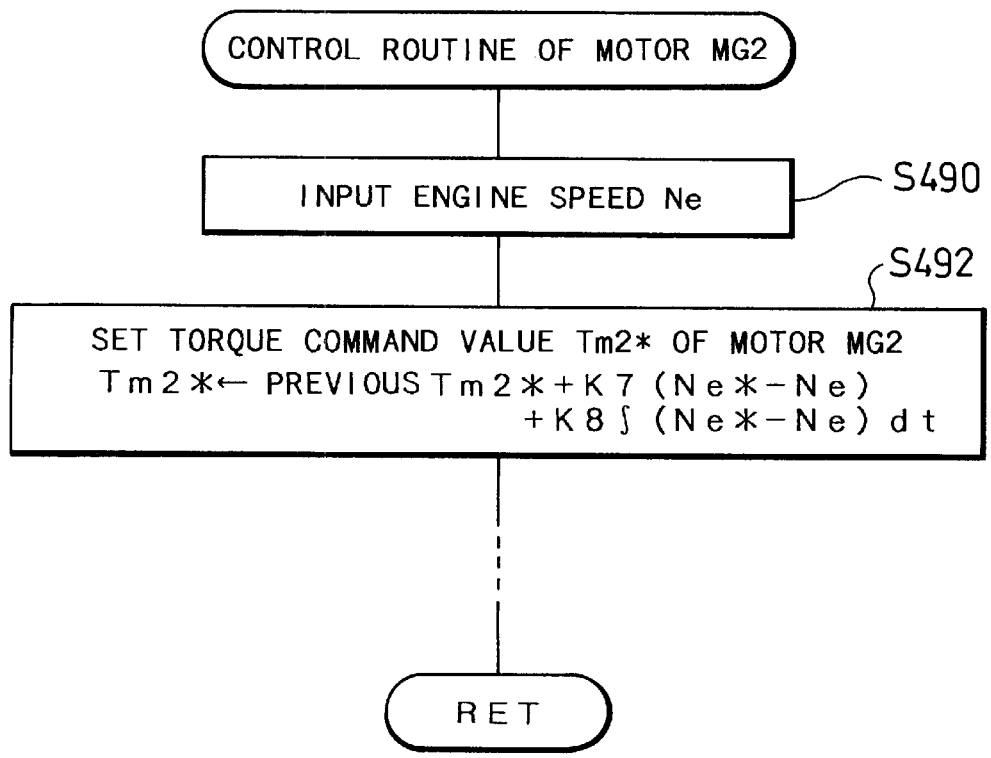
FIG. 38 is a flowchart showing part of a control routine of the second motor MG2 carried out by the power output apparatus 110C of the modified structure.

The power output apparatus 110C of the modified structure can thus execute the output control routines of FIG. 26 and FIGS. 29 through 31 and exert the similar effects to those of the power output apparatus 110 of the second embodiment or its modified applications. Since the second motor MG2 is attached to the crankshaft 156 in the power output apparatus 110C, the processes of steps S330 and S332 in the control routine of the first motor MG1 shown in FIG. 27 are replaced by the process of step S480 in the control routine of the first motor MG1 shown in FIG. 37. The processing of step S480 sets the value calculated from the torque command value Tr* in place of the torque Tr in Equation (20) to the torque command value Tm1* of the first motor MG1. The process of step S350 in the control routine of the second motor MG2 shown in FIG. 28 is replaced by the processes of steps S490 and S492 in the control routine of the second motor MG2 shown in FIG. 38. The processing of steps S490 and S492 reads the revolving speed Ne of the engine 150 and calculates the torque command value Tm2* of the second motor MG2 from the input revolving speed Ne according to Equation (22) given below:

$$Tm2^* \leftarrow previous Tm2^* + K7(Ne^* - Ne) + K8 \int (Ne^* - Ne) dt \quad (22)$$

Figure 39:
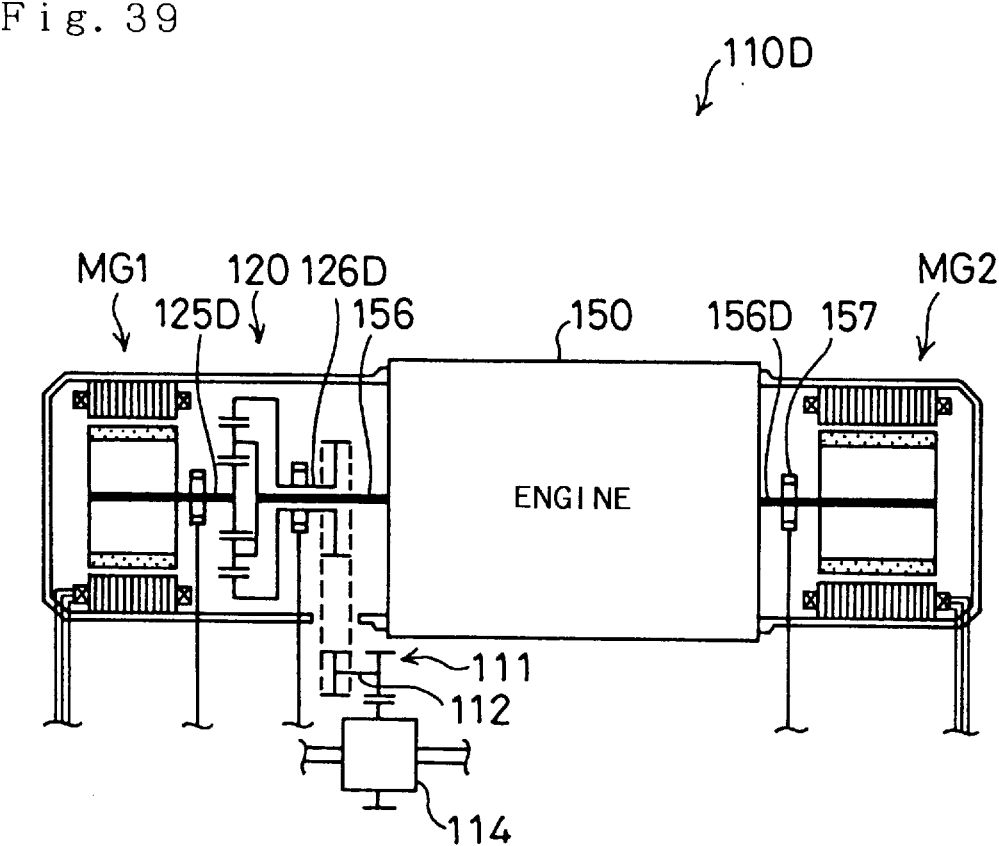
FIG. 39 schematically illustrates structure of another power output apparatus 110D as a modification of the power output apparatus 110C.
Figure 40:
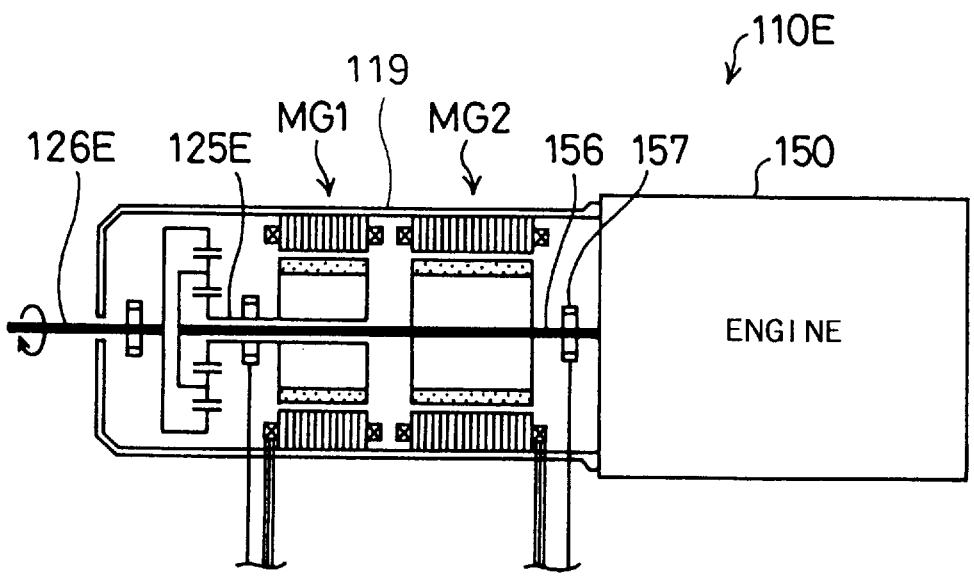
FIG. 40 schematically illustrates structure of still another power output apparatus 110E as another modification of the power output apparatus 110C.

In the power output apparatus 110C, the second motor MG2 is disposed between the engine 150 and the first motor MG1. Like another power output apparatus 110D shown in FIG. 39, however, the engine 150 may be interposed between the first motor MG1 and the second motor MG2. In the power output apparatus 110C, the power output to the ring gear shaft 126C is taken out of the arrangement between the first motor MG1 and the second motor MG2 via the power feed gear 128 linked with the ring gear 122. Like still another power output apparatus 110E shown in FIG. 40, however, the power may be taken out of the casing 119, from which a ring gear shaft 126E is extended.

Figure 41:
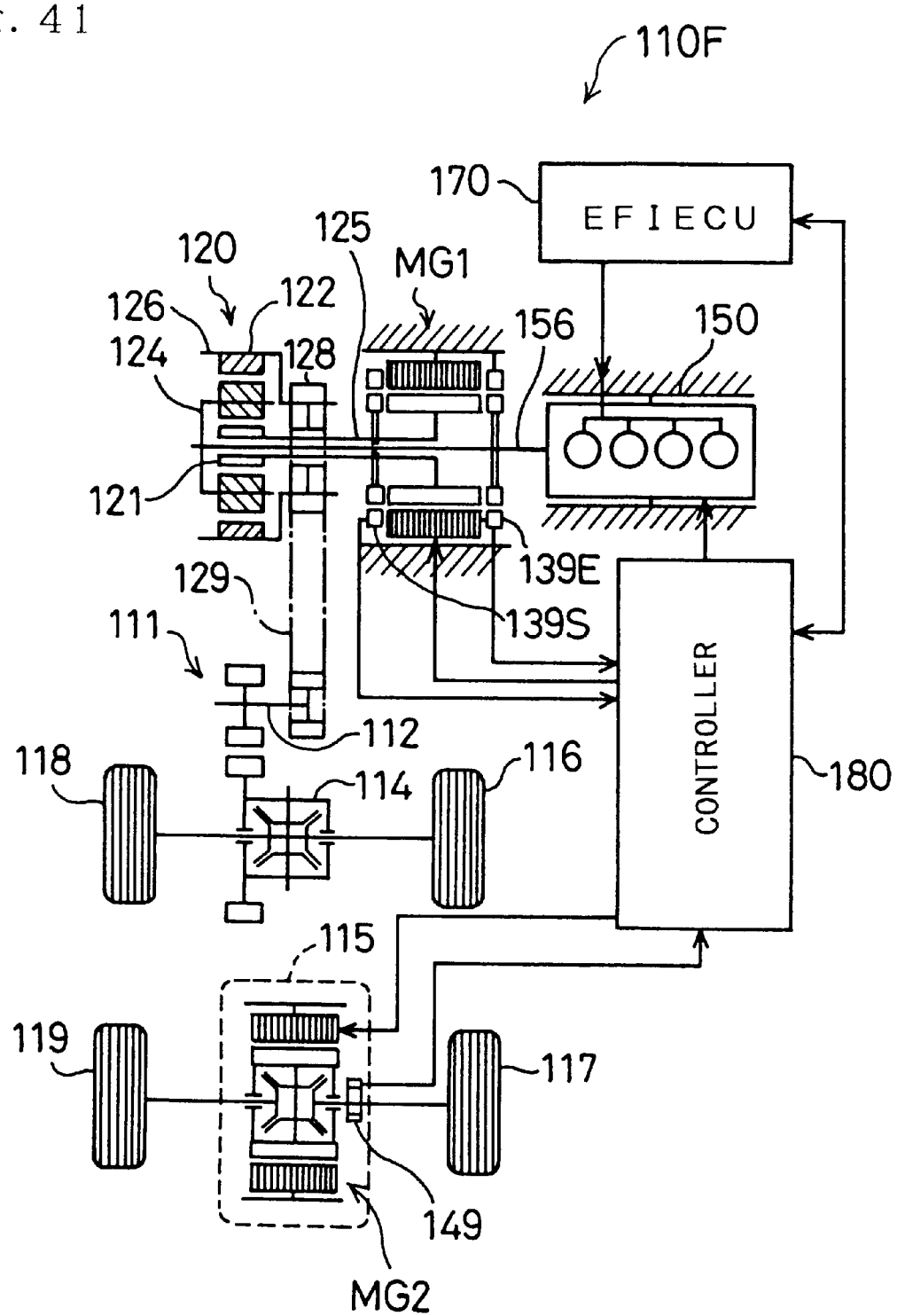
FIG. 41 schematically illustrates structure of a four-wheel-drive vehicle with a power output apparatus 110F, which is equivalent to the power output apparatus 110 of the second embodiment.

The power output apparatus 110 of the second embodiment and its modified examples discussed above are applied to the FR-type or FF-type two-wheel-drive vehicle. In another modified example, however, a power output apparatus 110F may be applied to a four-wheel-drive vehicle as shown in FIG. 41. In this structure, the second motor MG2 is separated from the ring gear shaft 126 and independently arranged in the rear-wheel portion of the vehicle, so as to drive the rear driving wheels 117 and 119. The ring gear shaft 126 is, on the other hand, connected to the differential gear 114 via the power feed gear 128 and the power transmission gear 111, in order to drive the front driving wheels 116 and 118. The output control of the second embodiment is applicable to this structure with some modification.

In the power output apparatus 110 of the second embodiment and its modified examples, the planetary gear 120 is used as the three shaft-type power input/output means. Another available example is a double-pinion planetary gear having plural sets of planetary pinion gears. One planetary pinion gear in each pair is linked with the sun gear while the other is linked with the ring gear, and the pair of planetary pinion gears are linked with each other to revolve around the sun gear while rotating on its axis. Any other device or gear unit, such as a differential gear, is also applicable for the three shaft-type power input/output means, as long as it can determine powers input to and output from the residual one shaft based on predetermined powers input to and output from any two shafts among the three shafts.

The present invention is not restricted to the above embodiments or their modified examples, but there may be many modifications, changes, and alterations without departing from the scope or spirit of the main characteristics of the present invention.

For example, although the gasoline engine is used as the engine 50 in the power output apparatus 20 of the first embodiment and its modified examples and as the engine 150 in the power output apparatus 110 of the second embodiment and its modified examples, the principle of the present invention is also applicable to other internal combustion engines and external combustion engines, such as Diesel engines, turbine engines, and jet engines.

Permanent magnet (PM)-type synchronous motors are used as the clutch motor 30 and the assist motor 40 in the power output apparatus 20 of the first embodiment and its modified examples and as the first motor MG1 and the second motor MG2 in the power output apparatus 110 of the second embodiment and its modified examples. Any other motors which can implement both the regenerative operation and the power operation, such as variable reluctance (VR)-type synchronous motors, vernier motors, d.c. motors, induction motors, superconducting motors, and stepping motors, may, however, be used according to the requirements.

Transistor inverters are used as the first and the second driving circuits 91 and 92 in the power output apparatus 20 of the first embodiment and its modified examples and as the first and the second driving circuits 191 and 192 in the power output apparatus 110 of the second embodiment and its modified examples. Other available examples include IGBT (insulated gate bipolar mode transistor) inverters, thyristor inverters, voltage PWM (pulse width modulation) inverters, square-wave inverters (voltage inverters and current inverters), and resonance inverters.

The battery 94 or 194 in the above embodiments may include Pb cells, NiMH cells, Li cells, or the like cells. A capacitor may be used in place of the battery 194.

Although the power output apparatus is mounted on the vehicle in all the above embodiments, it may be mounted on other transportation means like ships and airplanes as well as a variety of industrial machines.

It should be clearly understood that the above embodiments are only illustrative and not restrictive in any sense. The scope and spirit of the present invention are limited only by the terms of the appended claims.

What is claimed is:

1. A power output apparatus for outputting power to a drive shaft, said power output apparatus comprising:
   an engine having an output shaft linked therewith;
   power regulation means connected with said output shaft and said drive shaft for transmitting power output from said engine to said drive shaft and regulating magnitude of the transmitted power via transformation of electric power;

a motor linked with either one of said output shaft and said drive shaft for receiving and transmitting power from and to said linked shaft;

storage battery means electrically linked with said power regulation means and said motor for receiving and outputting electric power from and to said power regulation means and said motor;

first target power setting means for specifying a target power of said drive shaft, which is to be output to said drive shaft;

second target power setting means for specifying a target power of said engine, which is to be output from said engine, based on the target power of said drive shaft specified by said first target power setting means;

engine control means for driving said engine in a predetermined driving state according to the target power of said engine specified by said second target power setting means;

power control means for controlling said power regulation means and said motor, in order to enable a sum of the power output from said engine and charge-discharge electric power, which said storage battery means is charged with and which is discharged from said storage battery means, to be converted to the target power of said drive shaft and output to said drive shaft;

deviation detecting means for detecting a deviation of the power output from said engine from the target power of said engine; and correction means for correcting either one of the target power of said drive shaft and the target power of said engine, based on the deviation of the power detected by said deviation detecting means.

2. A power output apparatus in accordance with claim 1, said power output apparatus further comprising:

charge-discharge electric power detecting means for detecting the charge-discharge electric power, which said storage battery means is charged with and which is discharged from said storage battery means, wherein said deviation detecting means detects the deviation of the power, based on the charge-discharge electric power detected by said charge-discharge electric power detecting means.

3. A power output apparatus in accordance with claim 2, said power output apparatus further comprising:

target electric power setting means for specifying a target electric power, which said storage battery means is charged with and which is discharged from said storage battery means, wherein said deviation detecting means detects the deviation of the power, based on a deviation of the charge-discharge electric power detected by said charge-discharge electric power detecting means from the target electric power specified by said target electric power setting means.

4. A power output apparatus in accordance with claim 1, wherein said power regulation means comprises torque regulation means for regulating a torque applied to said output shaft, so as to cause said output shaft to be rotated at a target revolving speed corresponding to the target power of said engine, said deviation detecting means detecting the deviation of the power, based on a difference between the torque regulated by said torque regulation means and a target torque corresponding to the target power of said engine.

5. A power output apparatus in accordance with claim 1, wherein said power regulation means is a pair-rotor motor comprising a first rotor connecting with said output shaft and a second rotor connecting with said drive shaft to be rotatable relative to said first rotor, said pair-rotor motor transmitting the power output from said engine to said drive shaft via an electromagnetic coupling of said first rotor with said second rotor, said pair-rotor motor inputting and outputting electric power based on the electromagnetic coupling of said first rotor with said second rotor and a difference between a revolving speed of said first rotor and a revolving speed of said second rotor.

6. A power output apparatus in accordance with claim 1, wherein said power regulation means comprises:

three shaft-type power input/output means having a first rotating shaft connected with said output shaft, a second rotating shaft connected with said drive shaft, and a third rotating shaft which are different from said first rotating shaft and said second rotating shaft, said three shaft-type power input/output means determining powers input to and output from a residual one rotating shaft, based on predetermined powers input to and output from any two rotating shafts among said three rotating shafts; and a motor linked with said third rotating shaft for receiving and transmitting power from and to said third rotating shaft.

7. A power output apparatus in accordance with claim 1, wherein said correction means corrects the target power of said engine, in order to decrease the deviation of the power.

8. A power output apparatus in accordance with claim 7, said power output apparatus further comprising:

target electric power setting means for specifying a target electric power, which said storage battery means is charged with and which is discharged from said storage battery means, wherein said deviation detecting means detects the deviation of the power, based on a deviation of the charge-discharge electric power detected by said charge-discharge electric power detecting means from the target electric power specified by said target electric power setting means.

9. A power output apparatus in accordance with claim 7, wherein said power regulation means comprises torque regulation means for regulating a torque applied to said output shaft, so as to cause said output shaft to be rotated at a target revolving speed corresponding to the target power of said engine, said deviation detecting means detecting the deviation of the power, based on a difference between the torque regulated by said torque regulation means and a target torque corresponding to the target power of said engine.

10. A power output apparatus in accordance with claim 7, said power output apparatus further comprising:

memory means for storing data representing a relationship between the target power of said drive shaft and the target power of said engine; and data updating means for, when the deviation of the power detected by said deviation detecting means is not greater than a predetermined value, updating the data stored in said memory means in order to relate the target power of said engine corrected by said correction means to the target power of said drive shaft, wherein said second target power setting means specifies the target power of said engine, based on the data stored in said memory means.

11. A power output apparatus in accordance with claim 7, wherein said power regulation means is a pair-rotor motor comprising a first rotor connecting with said output shaft and a second rotor connecting with said drive shaft to be rotatable relative to said first rotor, said pair-rotor motor transmitting the power output from said engine to said drive shaft via an electromagnetic coupling of said first rotor with said second rotor, said pair-rotor motor inputting and outputting electric power based on the electromagnetic coupling of said first rotor with said second rotor and a difference between a revolving speed of said first rotor and a revolving speed of said second rotor.

12. A power output apparatus in accordance with claim 7, wherein said power regulation means comprises:

three shaft-type power input/output means having a first rotating shaft connected with said output shaft, a second rotating shaft connected with said drive shaft, and a third rotating shaft which are different from said first rotating shaft and said second rotating shaft, said three shaft-type power input/output means determining powers input to and output from a residual one rotating shaft, based on predetermined powers input to and output from any two rotating shafts among said three rotating shafts; and a motor linked with said third rotating shaft for receiving and transmitting power from and to said third rotating shaft.

13. A power output apparatus in accordance with claim 1, wherein said correction means corrects the target power of said drive shaft, in order to decrease the deviation of the power.

14. A power output apparatus in accordance with claim 13, said power output apparatus further comprising:

target electric power setting means for specifying a target electric power, which said storage battery means is charged with and which is discharged from said storage battery means, wherein said deviation detecting means detects the deviation of the power, based on a deviation of the charge-discharge electric power detected by said charge-discharge electric power detecting means from the target electric power specified by said target electric power setting means.

15. A power output apparatus in accordance with claim 13, wherein said power regulation means comprises torque regulation means for regulating a torque applied to said output shaft, so as to cause said output shaft to be rotated at a target revolving speed corresponding to the target power of said engine, said deviation detecting means detecting the deviation of the power, based on a difference between the torque regulated by said torque regulation means and a target torque corresponding to the target power of said engine.

16. A power output apparatus in accordance with claim 13, wherein said correction means corrects the target power of said drive shaft specified by said first target power setting means, in order to decrease the deviation of the power within a predetermined range of ratio to the target power of said drive shaft.

17. A power output apparatus in accordance with claim 13, wherein said power regulation means is a pair-rotor motor comprising a first rotor connecting with said output shaft and a second rotor connecting with said drive shaft to be rotatable relative to said first rotor, said pair-rotor motor transmitting the power output from said engine to said drive shaft via an electromagnetic coupling of said first rotor with said second rotor, said pair-rotor motor inputting and outputting electric power based on the electromagnetic coupling of said first rotor with said second rotor and a difference between a revolving speed of said first rotor and a revolving speed of said second rotor.

18. A power output apparatus in accordance with claim 13, wherein said power regulation means comprises:

three shaft-type power input/output means having a first rotating shaft connected with said output shaft, a second rotating shaft connected with said drive shaft, and a third rotating shaft which are different from said first rotating shaft and said second rotating shaft, said three shaft-type power input/output means determining powers input to and output from a residual one rotating shaft, based on predetermined powers input to and output from any two rotating shafts among said three rotating shafts; and a motor linked with said third rotating shaft for receiving and transmitting power from and to said third rotating shaft.

19. A controller comprising an engine, engine control means for controlling operation of said engine, generator means linked with said engine, a motor linked with a drive shaft, and storage battery means electrically connected with said motor and said generator means, said controller controlling operation of a power output apparatus for outputting power to said drive shaft via at least power generation by said generator means and consumption of electric power by said motor, said controller further comprising:

input means for inputting a target power of said drive shaft, which is required as power to be output to said drive shaft;

target power output means for specifying a target power of said engine, which is to be output from said engine, based on the target power of said drive shaft, so as to enable charge-discharge electric power, which said storage battery means is charged with and which is discharged from said storage battery means, to be within a predetermined range, and outputting the specified target power of said engine to said engine control means; and correction means for, when the target power of said engine output by said target power output means causes said storage battery means to be charged with and discharge electric power that is out of said predetermined range, correcting the target power of said engine according to the electric power that is out of said predetermined range.

20. A controller comprising an engine, engine control means for controlling operation of said engine, generator means linked with said engine, a motor linked with a drive shaft, and storage battery means electrically connected with said motor and said generator means, said controller controlling operation of a power output apparatus for outputting power to said drive shaft via at least power generation by said generator means and consumption of electric power by said motor, said controller further comprising:

input means for inputting a target power of said drive shaft, which is required as power to be output to said drive shaft;

target power output means for specifying a target power of said engine, which is to be output from said engine, based on the target power of said drive shaft, so as to enable charge-discharge electric power, which said storage battery means is charged with and which is discharged from said storage battery means, to be within a predetermined range, and outputting the specified target power of said engine to said engine control means; and correction means for, when the target power of said engine output by said target power output means causes said storage battery means to be charged with and discharge electric power that is out of said predetermined range, correcting the target power of said drive shaft according to the electric power that is out of said predetermined range.

21. A controller in accordance with claim 19, wherein said correction means comprises:

first correction means for correcting the target power of said engine; and second correction means for, when the target power of said engine corrected by said first correction means causes said storage battery means to be charged with and discharge electric power that is out of said predetermined range, correcting the target power of said drive shaft.

22. A method of controlling a power output apparatus, which comprises: an engine having an output shaft linked therewith; power regulation means connected with said output shaft and said drive shaft for transmitting power output from said engine to said drive shaft and regulating magnitude of the transmitted power via transformation of electric power; a motor linked with either one of said output shaft and said drive shaft for receiving and transmitting power from and to said linked shaft; and storage battery means electrically linked with said power regulation means and said motor for receiving and outputting electric power from and to said power regulation means and said motor, said method comprising the steps of:

(a) specifying a target power of said drive shaft, which is to be output to said drive shaft;

(b) specifying a target power of said engine, which is to be output from said engine, based on the target power of said drive shaft specified in said step (a);

(c) driving said engine in a predetermined driving state according to the target power of said engine specified in said step (b);

(d) controlling said power regulation means and said motor, in order to enable a sum of the power output from said engine and charge-discharge electric power, which said storage battery means is charged with and which is discharged from said storage battery means, to be converted to the target power of said drive shaft and output to said drive shaft;

(e) detecting a deviation of the power output from said engine from the target power of said engine; and (f) correcting either one of the target power of said drive shaft and the target power of said engine, based on the deviation of the power detected in said step (e).

23. A method in accordance with claim 22, said power output apparatus further comprising memory means for storing data representing a relationship between the target power of said drive shaft and the target power of said engine, wherein said step (b) specifies the target power of said engine, based on the data stored in said memory means, said step (f) correcting the target power of said engine, in order to decrease the deviation of the power, said method further comprising the step of:

(g) when the deviation of the power detected in said step (e) is not greater than a predetermined value, updating the data stored in said memory means in order to relate the target power of said engine corrected in said step (f) to the target power of said drive shaft.

24. A method in accordance with claim 22, wherein said step (f) corrects the target power of said drive shaft specified in said step (a), in order to decrease the deviation of the power within a predetermined range of ratio to the target power of said drive shaft.

* * * * *